United States Patent
Yang

(10) Patent No.: US 9,291,372 B2
(45) Date of Patent: Mar. 22, 2016

(54) CLOSED-LOOP TEMPERATURE EQUALIZATION DEVICE HAVING A HEAT RELEASING DEVICE AND MULTIPLE FLOWPATHS

(76) Inventor: Tai-Her Yang, Dzan-Hwa (TW)

( * ) Notice: Subject to any disclaimer, the term of this patent is extended or adjusted under 35 U.S.C. 154(b) by 929 days.

(21) Appl. No.: 13/216,475

(22) Filed: Aug. 24, 2011

(65) Prior Publication Data

US 2013/0025821 A1    Jan. 31, 2013

Related U.S. Application Data

(63) Continuation-in-part of application No. 13/189,819, filed on Jul. 25, 2011, now abandoned, and a continuation-in-part of application No. 13/195,230, filed on Aug. 1, 2011, now abandoned, and a continuation-in-part of application No. 13/209,579, filed on Aug. 15, 2011, now Pat. No. 9,200,850.

(51) Int. Cl.
| | |
|---|---|
| *F25B 29/00* | (2006.01) |
| *F24J 3/08* | (2006.01) |
| *F28D 15/00* | (2006.01) |
| *F28D 20/00* | (2006.01) |

(52) U.S. Cl.
CPC ............ *F24J 3/081* (2013.01); *F28D 15/00* (2013.01); *F28D 20/0052* (2013.01); *Y02E 10/12* (2013.01); *Y02E 60/142* (2013.01)

(58) Field of Classification Search
CPC ...... F24J 3/081; F28D 15/00; F28D 20/0052; Y02E 10/12; Y02E 60/142
USPC ............ 165/10, 11.1, 45, 96, 104.11, 104.19, 165/104.21, 104.26
See application file for complete search history.

(56) References Cited

U.S. PATENT DOCUMENTS

| | | | | |
|---|---|---|---|---|
| 3,648,767 | A * | 3/1972 | Balch .................... | 165/104.19 |
| 3,768,547 | A * | 10/1973 | Best ...................... | 165/45 |
| 3,788,389 | A * | 1/1974 | Waters ................... | 165/45 |
| 3,823,769 | A * | 7/1974 | Anderson et al. ....... | 165/104.21 |
| 3,828,845 | A * | 8/1974 | Waters ................... | 165/45 |
| 3,840,068 | A * | 10/1974 | Waters ................... | 165/45 |
| 3,857,244 | A * | 12/1974 | Faucette ................. | 165/45 |
| 3,898,851 | A * | 8/1975 | Wyant .................... | 165/45 |
| 3,935,900 | A * | 2/1976 | Waters ................... | 165/45 |

(Continued)

FOREIGN PATENT DOCUMENTS

JP         2005283014 A  * 10/2005  ............. F28D 21/00

*Primary Examiner* — Ljiljana Ciric
(74) *Attorney, Agent, or Firm* — Bacon & Thomas, PLLC

(57) ABSTRACT

A closed loop temperature equalization system includes multiple flowpaths utilizing a heat exchange fluid for transmitting thermal energy of a natural thermal energy storage body to an external temperature differentiation body. The closed-loop system includes at least a heat gaining device arranged to transfer heat between the natural thermal energy storage body and the heat exchange fluid, and a heat releasing device arranged to transfer heat between the heat exchange fluid and the temperature differentiation body and also includes at least one of an auxiliary pump 1 for selectively pumping the heat exchange fluid in a normal flow direction or in a reverse flow direction and of at least one auxiliary heating/cooling device disposed in the interior or in the exterior of the fluid flowpath. A first pipeline structure carries a part of the heat exchange fluid from the heat gaining device to the heat releasing device. A second pipeline structure carries the heat exchange fluid between the heat gaining device and the heat releasing device.

18 Claims, 29 Drawing Sheets

(56) References Cited

U.S. PATENT DOCUMENTS

| | | | | |
|---|---|---|---|---|
| 3,948,313 A | * | 4/1976 | Best | 165/45 |
| 3,990,502 A | * | 11/1976 | Best | 165/45 |
| 4,036,285 A | * | 7/1977 | Best | 165/45 |
| 4,040,480 A | * | 8/1977 | Richards | 165/104.26 |
| 4,042,012 A | * | 8/1977 | Perry et al. | 165/45 |
| 4,050,509 A | * | 9/1977 | Bienert et al. | 165/45 |
| 4,091,863 A | * | 5/1978 | Schroder | 165/104.11 |
| 4,099,556 A | * | 7/1978 | Roberts, Jr. | 165/96 |
| 4,142,576 A | * | 3/1979 | Perry et al. | 165/45 |
| 4,162,394 A | * | 7/1979 | Faccini | 165/104.21 |
| 4,194,856 A | * | 3/1980 | Jahns | 165/45 |
| 4,240,268 A | * | 12/1980 | Yuan | 165/10 |
| 4,258,780 A | * | 3/1981 | Suo | 165/45 |
| 4,269,539 A | * | 5/1981 | Hopke | 165/45 |
| 4,271,681 A | * | 6/1981 | Schertz | 165/104.11 |
| 4,279,294 A | * | 7/1981 | Fitzpatrick et al. | 165/45 |
| 4,339,929 A | * | 7/1982 | Fitzpatrick et al. | 165/45 |
| 4,346,569 A | * | 8/1982 | Yuan | 165/10 |
| 4,355,522 A | * | 10/1982 | Gorski et al. | 165/104.11 |
| 4,375,157 A | * | 3/1983 | Boesen | 165/104.21 |
| 4,408,657 A | * | 10/1983 | Pugh | 165/45 |
| 4,412,426 A | * | 11/1983 | Yuan | 165/45 |
| 4,444,249 A | * | 4/1984 | Cady | 165/45 |
| 4,448,237 A | * | 5/1984 | Riley | 165/45 |
| 4,505,326 A | * | 3/1985 | Hazen | 165/45 |
| 4,566,527 A | * | 1/1986 | Pell et al. | 165/45 |
| 4,577,679 A | * | 3/1986 | Hibshman | 165/45 |
| 4,644,750 A | * | 2/1987 | Lockett et al. | 165/104.26 |
| 4,693,301 A | * | 9/1987 | Baehrle et al. | 165/45 |
| 4,793,146 A | * | 12/1988 | Ryokai | 165/45 |
| 4,798,239 A | * | 1/1989 | Persohn et al. | 165/45 |
| 4,836,275 A | * | 6/1989 | Sakaya et al. | 165/104.21 |
| 4,930,572 A | * | 6/1990 | Doshier | 165/45 |
| 4,995,450 A | * | 2/1991 | Geppelt et al. | 165/104.21 |
| 5,029,633 A | * | 7/1991 | Mann | 165/45 |
| 5,054,297 A | * | 10/1991 | Furuhama | 165/45 |
| 5,069,199 A | * | 12/1991 | Messner | 165/10 |
| 5,477,703 A | * | 12/1995 | Hanchar et al. | 165/45 |
| 5,803,161 A | * | 9/1998 | Wahle et al. | 165/104.21 |
| 6,129,141 A | * | 10/2000 | Yang | 165/45 |
| 6,769,487 B2 | * | 8/2004 | Hache | 165/45 |
| 6,802,360 B1 | * | 10/2004 | Schmitt | 165/45 |
| 7,004,231 B2 | * | 2/2006 | Yang | 165/11.1 |
| 7,370,488 B2 | * | 5/2008 | Kidwell et al. | 165/45 |
| 7,373,785 B2 | * | 5/2008 | Kidwell et al. | 165/45 |
| 7,377,122 B2 | * | 5/2008 | Kidwell et al. | 165/45 |
| 8,100,172 B2 | * | 1/2012 | Yang | 165/45 |
| 8,448,876 B2 | * | 5/2013 | Yang | 165/45 |
| 8,757,504 B2 | * | 6/2014 | Yang | 165/45 |
| 8,826,903 B2 | * | 9/2014 | Thoma | 165/45 |
| 8,833,098 B2 | * | 9/2014 | Wiggs | 165/45 |
| 8,839,848 B2 | * | 9/2014 | Wu et al. | 165/45 |
| 8,929,073 B2 | * | 1/2015 | Suzuki et al. | 165/104.21 |
| 8,939,197 B2 | * | 1/2015 | Yang | 165/45 |
| 8,960,181 B2 | * | 2/2015 | Lin | 165/104.11 |
| 8,985,199 B2 | * | 3/2015 | Yang | 165/45 |
| 8,991,482 B2 | * | 3/2015 | Yang | 165/45 |
| 9,038,408 B2 | * | 5/2015 | Sabo | 62/260 |
| 2004/0194909 A1 | * | 10/2004 | Yang | 165/11.1 |
| 2007/0271940 A1 | * | 11/2007 | Yang | 165/45 |
| 2009/0277602 A1 | * | 11/2009 | Yang | 165/45 |
| 2012/0090810 A1 | * | 4/2012 | Yang | 165/45 |
| 2012/0097361 A1 | * | 4/2012 | Yang | 165/45 |
| 2012/0111530 A1 | * | 5/2012 | Yang | 165/45 |
| 2014/0290903 A1 | * | 10/2014 | Yang | 165/11.1 |
| 2015/0090423 A1 | * | 4/2015 | Naneff et al. | 165/11.1 |
| 2015/0136354 A1 | * | 5/2015 | Yesiller et al. | 165/45 |

\* cited by examiner

CLOSED-LOOP TEMPERATURE EQUALIZATION DEVICE HAVING A HEAT RELEASING DEVICE AND MULTIPLE FLOWPATHS

CROSS-REFERENCE TO RELATED APPLICATION

This application is a Continuation-In-Part of application Ser. No. 13/209,579, filed on Aug. 15, 2011, which is a Continuation-In-Part of application Ser. No. 13/195,230, filed on Aug. 1, 2011, which is a Continuation-In-Part of application Ser. No. 13/189,819, filed on Jul. 25, 2011.

BACKGROUND OF THE INVENTION (a) Field of the Invention

The present invention utilizes the thermal energy of a natural heat storage body (100) to transmit thermal energy to a heat exchange fluid (104) passing a heat gaining device (101) installed at the bottom of a closed-loop temperature equalization device. The closed-loop temperature equalization device has a heat releasing device in communication with multiple flowpaths. As a result of an effect in which warmer fluid ascends and colder fluid descends or due to pumping performed by an auxiliary fluid pump, the heat exchange fluid (104) in the heat gaining device (101) is enabled to flow through a heat releasing device (201) in communication with multiple flowpaths formed by a pipeline structure (401) and another pipeline structure (301). The heat exchange fluid (104) flows back to the heat gaining device (101) for forming a closed-loop flow circulation. The heat releasing device (201) structured by multiple flowpaths that perform the heat releasing operation to a temperature differentiation body (103) in multiple directions or in a preset direction. The thermal energy can be transmitted to the solid, liquid or gaseous temperature differentiation body (103) to be received with the releasing heat, or to the temperature differentiation body (103) structured by the internal or external space of a building. The features of the present invention include one or more of the following: 1) an operation port (111) and a sealing plug (110) installed at the upper end of the top corner of a closed-loop flowpath connected with a fluid inlet/outlet port (2011) formed at a higher location of the heat releasing device (201) and structured by multiple flowpaths and the pipeline structure (401), for filling in or sucking out the heat exchange fluid (104) and serving as interfaces for observation and maintenance; 2) an outward-expanding arc-shaped flowpath structure formed at one or more than one turning locations of the closed-type circulation flowpath configured by connecting in series the heat gaining device (101), the pipeline structure (301), the heat releasing device (201) and the pipeline structure (401), for temporarily storing a part of the heat exchange fluid (104) and moderating the flow speed of the heat exchange fluid (104) with thermal energy reduce the flow damping of the closed-type circulation flowpath to the heat exchange fluid (104); 3) an auxiliary heating/cooling device (115); 4) installing an auxiliary fluid pump (107); 5) a heat exchange fluid temperature sensing device (TS201); 6) an environment temperature sensing device (TS202); and 7) an electric energy control unit (ECU200).

(b) Description of the Prior Art

When a heat exchange fluid performs thermal energy transmission in a conventional closed-loop flowpath in which a temperature equalization device with single-flowpath structure is adopted, the flowpath area is relatively larger and thus the structural strength is weaker. Further, the heat exchange fluid is spaced further away from the inner layer of a heat releasing surface and it is therefore harder to transmit the thermal energy to the exterior through the heat releasing surface. The interior of the temperature equalization device may form return flows or turbulent flows due to the uneven temperature differentiation between the solid or liquid or gaseous temperature differentiation body received with released heat or formed by external space and the heat releasing surface of the heat releasing device. Thus the flow resistance may increase which causes the fluid to not be able to flow smoothly. Moreover, the thermal energy of a natural heat storage body often utilizes a closed-loop temperature equalization device with the heat exchange fluid serving as a carrier for transmitting thermal energy to an external temperature differentiation body. This is often defined as a passive operation of a closed-loop pipeline structure, wherein interfaces for observation and maintenance are not provided, and an active type auxiliary device is not installed for joint operation.

SUMMARY OF THE INVENTION

The present invention is to install the closed-loop temperature equalization device having a heat releasing device in communication with multiple flowpaths installed in a natural heat storage body (100). Examples of a solid or liquid heat storage body having stable heat storage capacity includes a stratum, ground, lake, pool, river, desert, berg and ocean. The present invention is for storing thermal energy through the natural heat storage body so as to transmit thermal energy to a heat exchange fluid (104) passing through a heat gaining device (101) installed at the bottom of a closed-loop temperature equalization device. Due to the cold descending/hot ascending effect of the heat exchange fluid (104) that equalizes the temperature or the pumping performed by an auxiliary fluid pump, the heat exchange fluid (104) in the heat gaining device (101) is enabled to flow through a pipeline structure (301), a heat releasing device (201) and a pipeline structure (401). Then the heat exchange fluid (104) flows back to the heat gaining device (101) for forming a closed-loop flow circulation. The heat releasing device (201) performs the heat releasing operation in multiple directions or in a preset direction to the solid, liquid or gaseous temperature differentiation body (103) which receives the released heat. The temperature differentiation body (103) may be structured by the internal or external space of a building, and the features thereof include one or more of the following: 1) an operation port (111) and a sealing plug (110) installed at the upper end of the top corner of a closed-loop flowpath connected with a fluid inlet/outlet port (2011) formed at a higher location of the heat releasing device (201) in communication with multiple flowpaths and the pipeline structure (401), for filling in or sucking out the heat exchange fluid (104) and serving as interfaces for observation and maintenance; 2) an outward-expanding arc-shaped flowpath structure formed at one or more turning locations of the closed-type circulation flowpath configured by connecting in series the heat gaining device (101), the pipeline structure (301), the heat releasing device (201) and the pipeline structure (401), for temporarily storing a part of the heat exchange fluid (104) and moderating the flow speed of the heat exchange fluid (104) with thermal energy for reducing the flow damping of the closed-type circulation flowpath to the heat exchange fluid (104); 3) an auxiliary heating/cooling device (115); 4) an auxiliary fluid pump (107); 5) installing a heat exchange fluid temperature sensing device (TS201); 6) an environment temperature sensing device (TS202); and 7) an electric energy control unit (ECU200).

DESCRIPTION OF MAIN COMPONENT SYMBOLS

Figure 1:
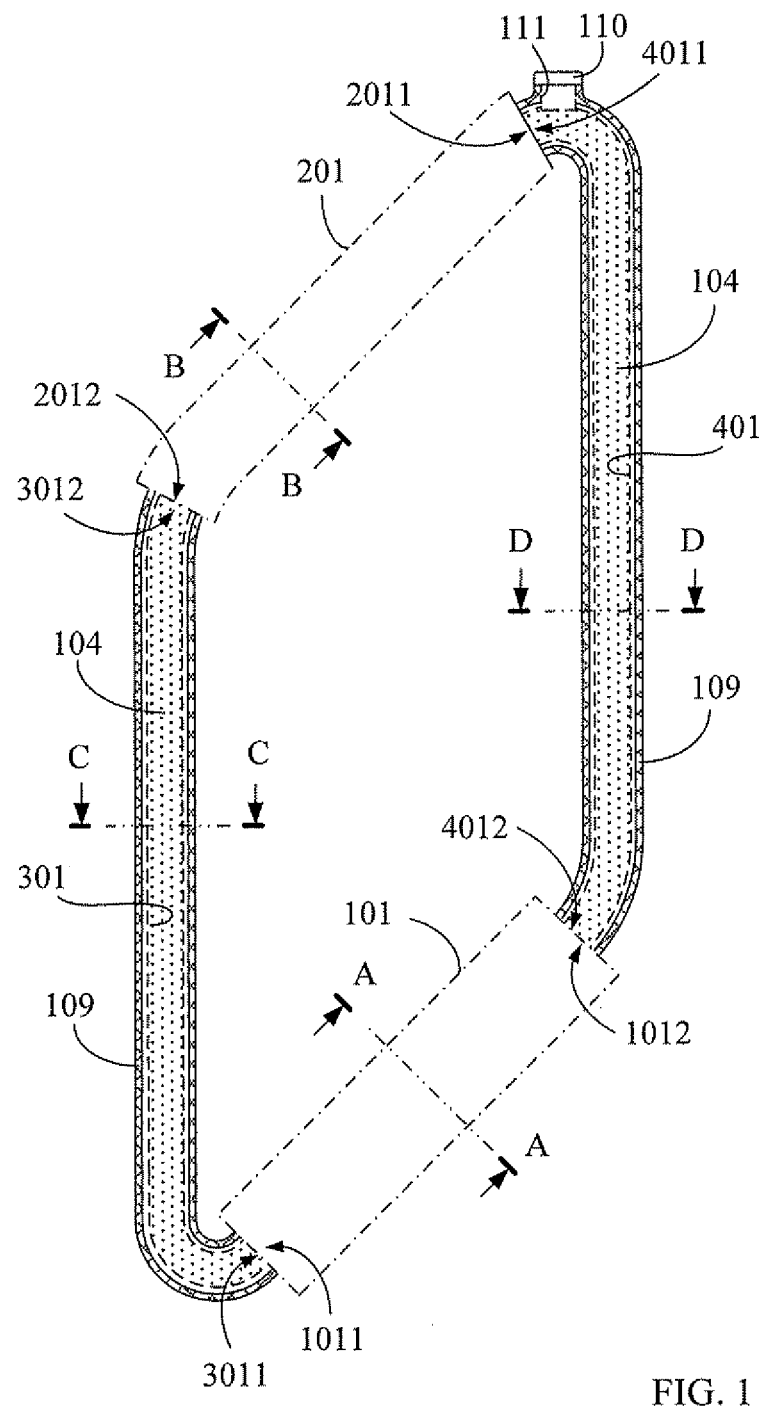
FIG. 1 is a lateral structural view of an embodiment of the present invention showing the closed-loop temperature equalization device having a heat releasing device structured by multiple flowpaths installed with an operation hole (111) and a sealing plug (110) at the upper end of the top corner of a closed-type flowpath.

100: Natural heat storage body
101: Heat gaining device
103: Temperature differentiation body
104: Heat exchange fluid
107: Auxiliary fluid pump
108: Outward-expanding arc-shaped fluid chamber
109: Heat insulation member
110: Sealing plug
111: Operation port
112: Top cover
113: Hinge
114: Sealing ring
115: Auxiliary heating/cooling device
116-118: Power wire
120: Signal transmission wire
ECU200: Electric power control unit
TS201: Heat exchange fluid temperature detecting device
TS202: Environment temperature detecting device
1000: Planar thermal energy transmitting surface
1001: Wave-shaped thermal energy transmitting surface
1004: W-shaped pipeline
1005: Rectangular pipeline
1006: Round pipeline
1007: Partitioned flowpath structure
1120: Thermal conductive fin sheet
1011-1012-2011-2012-3011-3012-4011-4012: Fluid inlet/outlet port
201: Heat releasing device
301-401: Pipeline structure

DETAILED DESCRIPTION OF THE PREFERRED EMBODIMENTS

When a heat exchange fluid performs thermal energy transmission in a conventional closed-loop flowpath, if a temperature equalization device with single-flowpath structure is adopted, the flowpath area is relatively larger and therefore the structural strength is weaker. Thus, the heat exchange fluid spaced further away from the inner layer of a heat releasing surface is harder to transmit the thermal energy to the exterior through the heat releasing surface. The interior of the temperature equalization device may form return flows or turbulent flows due to the uneven temperature differentiation between the solid or liquid or gaseous temperature differentiation body. Thus the flow resistance may increase, which causes the fluid to not be able to flow smoothly. Moreover, the thermal energy of a natural heat storage body often utilizes a closed-loop temperature equalization device with the heat exchange fluid serving as a carrier for transmitting thermal energy to an external temperature differentiation body. This is often defined as a passive operation of closed-loop pipeline structure, wherein interfaces for observation and maintenance are not provided, and an active type auxiliary device is not installed for joint operation.

The present invention utilizes the thermal energy of a natural heat storage body (100) to transmit thermal energy to a heat exchange fluid (104) passing a heat gaining device (101) installed at the bottom of a closed-loop temperature equalization device having a heat releasing device in communication with multiple flowpaths. As a result of an effect in which warmer fluid ascends and colder fluid descends, or with the pumping performed by an auxiliary fluid pump, the heat exchange fluid (104) in the heat gaining device (101) is enabled to flow through a heat releasing device (201) structured by multiple flowpaths and a pipeline structure (401) through another pipeline structure (301). The heat exchange fluid (104) then flows back to the heat gaining device (101) for forming a closed-loop flow circulation. The heat releasing operation to a temperature differentiation body (103) may be performed in multiple directions or in a preset direction, so that the thermal energy can be transmitted to the solid, liquid or gaseous temperature differentiation body (103) to be received with the releasing heat, or to the temperature differentiation body (103) structured by the internal or external space of a building. The features of the present invention include the following: 1) an operation port (111) and a sealing plug (110) installed at the upper end of the top corner of a closed-loop flowpath connected with a fluid inlet/outlet port (2011) formed at a higher location of the heat releasing device (201) structured by multiple flowpaths and the pipeline structure (401), for filling in or sucking out the heat exchange fluid (104) and serving as interfaces for observation and maintenance; 2) an outward-expanding arc-shaped flowpath structure formed at one or more than one turning locations of the closed-type circulation flowpath configured by connecting in series the heat gaining device (101), the pipeline structure (301), the heat releasing device (201) and the pipeline structure (401), for temporarily storing a part of the heat exchange fluid (104) and moderating the flow speed of the heat exchange fluid (104) with thermal energy for reducing the flow damping of the closed-type circulation flowpath to the heat exchange fluid (104); 3) an auxiliary heating/cooling device (115); 4) an auxiliary fluid pump (107); 5) installing a heat exchange fluid temperature sensing device (TS201); 6) an environment temperature sensing device (TS202); and 7) an electric energy control unit (ECU200).

The structural features and functions of the present invention are illustrated through embodiments accompanied with drawings, as follows:

FIG. 1 is a lateral structural view showing the closed-loop temperature equalization device having a heat releasing device structured by multiple flowpaths and having an operation hole (111) and a sealing plug (110) at the upper end of the top corner of a closed-type flowpath.

As shown in FIG. 1, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301). Another fluid inlet/outlet port (1012) of the heat gaining device (101) is connected to a fluid inlet/outlet port (2011) of the heat releasing device (201) via the pipeline structure (401), thereby forming a closed-loop circulation flowpath so the heat exchange fluid (104) passing the heat gaining device (101) is enabled to form a closed-type circulation flowpath through the pipeline structures (301), (401) and the heat releasing device (201). The heat releasing device (201) releases the thermal energy to the temperature differentiation body (103) at its periphery is subjected to temperature equalization. According to the closed-loop temperature equalization device having a heat releasing device structured by multiple flowpaths provided by the present invention, the thermal energy of the natural heat storage body (100) and the thermal energy of the temperature differentiation body (103) subjected to temperature equalization are transmitted for temperature equalization. The heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during operation of the system.

Features of main components are as followings:

Heat gaining device (101) is made of a material having good heat conductivity, and is provided with a flowpath structure configured by one or more flowpaths, or structured by a conduit structure configured by one or more flowpaths, for being installed in the natural heat storage body (100). Two ends of the flowpath of the heat gaining device (101) respectively have a fluid inlet/outlet port (1011), (1012) for connecting to one end of the pipeline structure (301) and one end of another pipeline structure (401), so as to be leaded and connected to the heat releasing device (201) for forming a closed-type circulation flowpath. The flowpath inside the heat gaining device (101) is inclined with respect to the horizontal level, such that the fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and is provided with a flowpath structure configured by two or more flowpaths, or structured by a pipeline structure configured by two or more flowpaths. The exterior of the heat releasing device (201) is in contact with the temperature differentiation body (103), and the thermal energy of the heat exchange fluid (104) passing the heat releasing device (201) performs the heat releasing operation to the temperature differentiation body (103) in multiple directions or in a set direction. The height difference between the fluid inlet/outlet port (2011) and the other fluid inlet/outlet port (2012) of the heat releasing device (201) are designed to facilitate, or at least have no negative influence on, the heat exchange fluid (104) flowing from the heat gaining device (101) to perform the closed-loop flow circulation in the closed-loop temperature equalization device.

Pipeline structure (301) comprises one or more flowpaths in round or other geometric shapes. The pipeline structure (301) further comprises one or more of following: 1) a material having good heat conductivity; 2) a material having good heat conductivity, and the exterior of all or part of the pipeline segments is covered by a heat insulation member (109); 3) a pipe-like structure or building structural body made of a material having good heat insulation property. One end of the pipeline structure (301) has one or more fluid inlet/outlet ports (3011) for being connected to the fluid inlet/outlet port (1011) of the heat gaining device (101) having one or more flowpaths, and the other end of the pipeline structure (301) has one or more fluid inlet/outlet ports (3012) connected to the fluid inlet/outlet port (2012) of the heat releasing device (201) having two or more flowpaths for transporting the heat exchange fluid (104).

Pipeline structure (401) comprises one or more flowpaths in round or other geometric shapes. The pipeline structure (401) further comprises one or more of the following: 1) a material having good heat conductivity; 2) a material having good heat conductivity, and the exterior of all or part of pipeline segments is covered by a heat insulation member (109); 3) a pipe-like structure or building structural body made of a material having good heat insulation property. One end of the pipeline structure (401) has one or more fluid inlet/outlet ports (4012) connected to the fluid inlet/outlet port (1012) of the heat gaining device (101) having one or more than one flowpaths, and the other end of the pipeline structure (401) has one or more fluid inlet/outlet ports (4011) for being respectively connected to the fluid inlet/outlet port (2011) of the heat releasing device (201) having two or more flowpaths for transporting the heat exchange fluid (104).

By installing the sealing plug (110) and the operation port (111) at the upper end of the top corner of the closed-type circulation flowpath configured by the heat gaining device (101), the heat releasing device (201), the pipeline structure (301) and the pipeline structure (401), the fluid is enabled to be filled in or sucked out. Additionally, observation and maintenance can be carried out.

The aforementioned closed-loop temperature equalization device having a heat releasing device structured by multiple flowpaths includes at least a heat gaining device (101), at least a heat releasing device (201), at least a pipeline structure (301) and at least another pipeline structure (401) in series connection, or in series and parallel connection, to configure a closed-loop flowpath. The heat gaining device (101), the heat releasing device (201), the pipeline structure (301) and the pipeline structure (401) can be integrally formed or assembled by a plurality of components, the dimension and shape at each connecting location for the assembly is in a gradually-altered shape for forming a smooth state. Such a smooth state can reduce the damping while the fluid is flowing, thereby facilitating the flow circulation of the fluid.

The aforementioned closed-loop temperature equalization device having a heat releasing device structured by multiple flowpath can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

Figure 2:
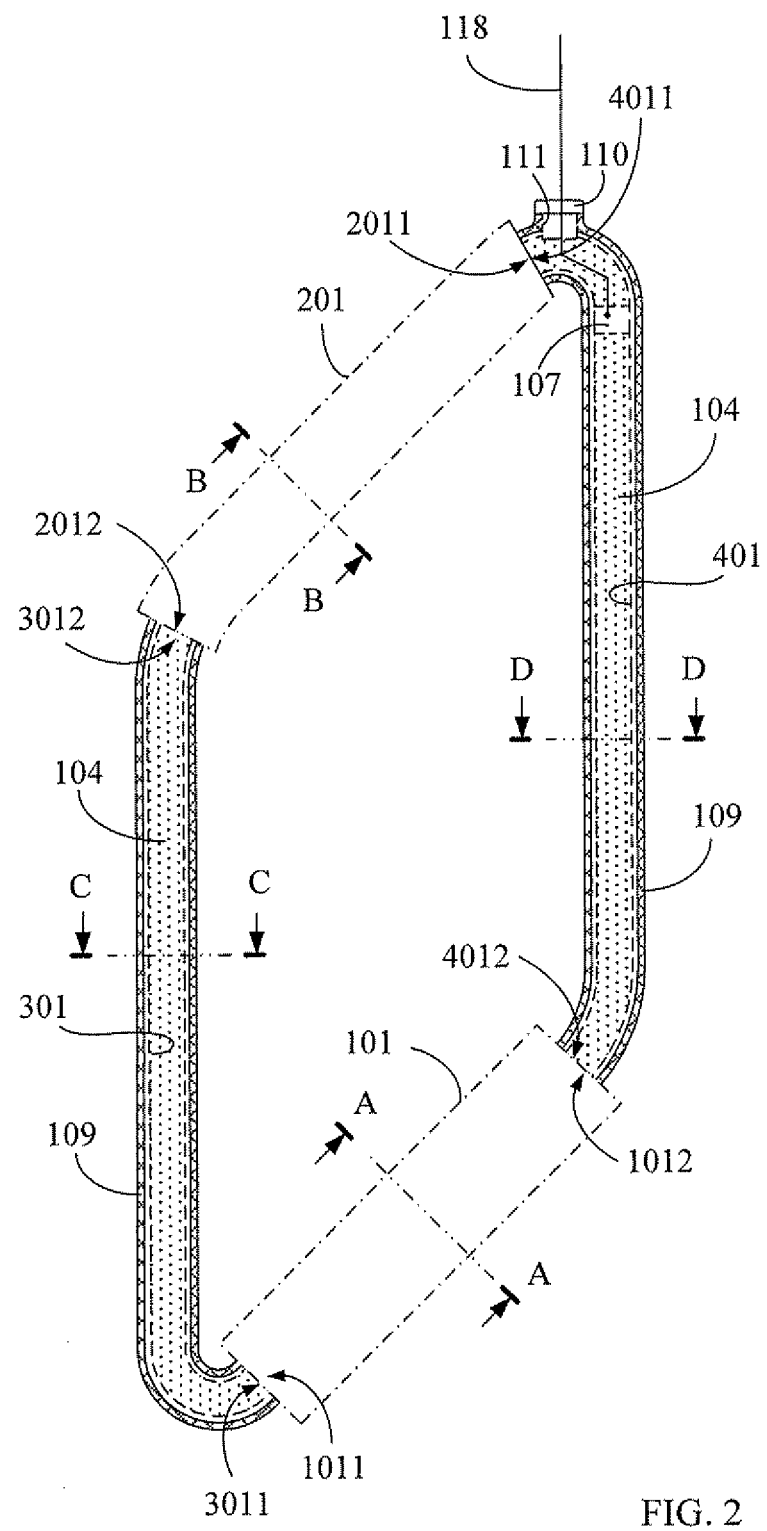
FIG. 2 is a lateral structural view showing the embodiment illustrated in FIG. 1 having an auxiliary fluid pump.

The aforementioned closed-loop temperature equalization device having a heat releasing device structured by multiple flowpaths can be further installed with an auxiliary fluid pump (107) in series in the closed-type circulation flowpath configured by the heat gaining device (101), the heat releasing device (201), the pipeline structure (301) and the pipeline structure (401). The closed-loop temperature equalization device having a heat releasing device is structured by multiple flowpaths is not only provided with the circulative flow through the cold descending/hot ascending effect of the heat exchange fluid (104), but also can perform normal-direction fluid pumping in the same direction as the cold descending/hot ascending flow of the fluid exchange fluid (104) through actively operating the auxiliary fluid pump (107), or perform reverse-direction fluid pumping in the direction opposite to the cold descending/hot ascending flow of the fluid exchange fluid (104) through actively operating the auxiliary fluid pump (107) as follows. FIG. 2 is a lateral structural view showing the embodiment illustrated in FIG. 1 being installed with an auxiliary fluid pump, according to the present invention.

As shown in FIG. 2, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301). Another fluid inlet/outlet port (1012) of the heat gaining device (101) is connected to a fluid inlet/outlet port (2011) of the heat releasing device (201) via the other pipeline structure (401), thereby forming a closed-loop circulation flowpath. The heat exchange fluid (104) passing the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery being subjected to temperature equalization. According to the closed-loop temperature equalization device having a heat releasing device structured by multiple flowpaths, through the heat exchange fluid (104) performing closed-loop flow circulation in the closed-loop temperature equalization device, the thermal energy of the natural heat storage body (100) and the thermal energy of the temperature differentiation body (103) subjected to temperature equalization are transmitted for temperature equalization. The heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during the system operation.

Features of main components are as followings:

Heat gaining device (101) is made of a material having good heat conductivity, and provided with a flowpath structure configured by one or more flowpaths, or structured by a conduit structure configured by one or more flowpaths, for being installed in the natural heat storage body (100). Two ends of the flowpath of the heat gaining device (101) respectively have a fluid inlet/outlet port (1011), (1012) for being respectively connected to one end of the pipeline structure (301) and one end of the other pipeline structure (401), so as to be leaded and connected to the heat releasing device (201) for forming a closed-type circulation flowpath, in which the flowpath inside the heat gaining device (101) is inclined with respect to the horizontal level. The fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and provided with a flowpath structure configured by two or more flowpaths, or structured by a pipeline structure configured by two or more flowpaths. The exterior of the heat releasing device (201) is in contact with the temperature differentiation body (103), and the thermal energy of the heat exchange fluid (104) passing the heat releasing device (201) is served to perform the heat releasing operation to the temperature differentiation body (103) in multiple directions or in a set direction. The height difference between the fluid inlet/outlet port (2011) and the fluid inlet/outlet port (2012) of the heat releasing device (201) are designed to facilitate, or at least have no negative influence, on the heat exchange fluid (104) flowing from the heat gaining device (101) to perform the closed-loop flow circulation in the closed-loop temperature equalization device.

Pipeline structure (301) is constituted by a fluid pipeline structure configured by one or more flowpaths in round or other geometric shapes, the pipeline structure (301) is configured by one or more of the following: 1) configured by a material having good heat conductivity; 2) configured by a material having good heat conductivity, and the exterior of all or part of the pipeline segments is covered by a heat insulation member (109); 3) configured by a pipe-like structure or building structural body made of a material having good heat insulation property. One end of the pipeline structure (301) has one or more than one fluid inlet/outlet ports (3011) for being connected to the fluid inlet/outlet port (1011) of the heat gaining device (101) having one or more than one flowpaths, and the other end of the pipeline structure (301) has one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401) is constituted by a fluid pipeline structure configured by one or more flowpaths in round or other geometric shapes. The pipeline structure (401) is configured by one or more of the following: 1) configured by a material having good heat conductivity; 2) configured by a material having good heat conductivity, and the exterior of all or part of pipeline segments is covered by a heat insulation member (109); 3) configured by a pipe-like structure or building structural body made of a material having good heat insulation property. One end of the pipeline structure (401) has one or more than one fluid inlet/outlet ports (4012) for being connected to the fluid inlet/outlet port (1012) of the heat gaining device (101) having one or more than one flowpaths, and the other end of the pipeline structure (401) has one or more than one fluid inlet/outlet ports (4011) for being respectively connected to the fluid inlet/outlet port (2011) of the heat releasing device (201) having two or more than two flowpaths for transporting the heat exchange fluid (104).

Auxiliary fluid pump (107) is constituted by a fluid pump driven by a motor driven by the electric power externally supplied through a power wire (118) or by a fluid pump driven by natural forces, provided for being connected in series to the closed-type circulation flowpath for pumping the heat exchange fluid (104). The auxiliary fluid pump (107) includes a fixed single-direction pumping operation, or the pumping direction is selectable, and the operation of ON/OFF, speed changing or the pumping flow amount is controllable.

When the auxiliary fluid pump (107) is not operated, the heat exchange fluid (104) circulates due to the cold descending/hot ascending effect. The auxiliary fluid pump (107) may be actively controlled to pump in the normal direction for performing auxiliary pumping in the same direction as the cold descending/hot ascending flow direction of the heat exchange fluid (104); or the auxiliary fluid pump (107) may be actively controlled to pump in the reverse direction for performing reverse pumping in the direction opposite to the cold descending/hot ascending flow direction of the heat exchange fluid (104).

By installing the sealing plug (110) and the operation port (111) at the upper end of the top corner of the closed-type circulation flowpath configured by the heat gaining device (101), the heat releasing device (201), the pipeline structure (301) and the pipeline structure (401), the fluid is enabled to be filled in or sucked out. Thus, observation and maintenance can be carried out.

The aforementioned closed-loop temperature equalization device having a heat releasing device structured by multiple flowpaths includes at least a heat gaining device (101), at least a heat releasing device (201), at least a pipeline structure (301) and at least a pipeline structure (401) in series connection, or in series and parallel connection, to configure a closed-loop flowpath. The heat gaining device (101), the heat releasing device (201), the pipeline structure (301) and the pipeline structure (401) can be integrally formed or assembled by a plurality of components. The dimension and shape at each connecting location for the assembly is in a gradually-altered shape for forming a smooth state. Such a smooth state can reduce the damping while the fluid is flowing, thereby facilitating the flow circulation of the fluid.

The aforementioned closed-loop temperature equalization device having a heat releasing device structured by multiple flowpath can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

According to the present invention, the closed-loop temperature equalization device having a heat releasing device structured by multiple flowpaths can be further installed with an outward-expanding arc-shaped fluid chamber (108) at the upper end of the top corner of the closed-type circulation flowpath configured by the heat gaining device (101), the heat releasing device (201), the pipeline structure (301) and the pipeline structure (401), for lowering the damping of the circulative flow of the heat exchange fluid (104) as follows.

Figure 3:
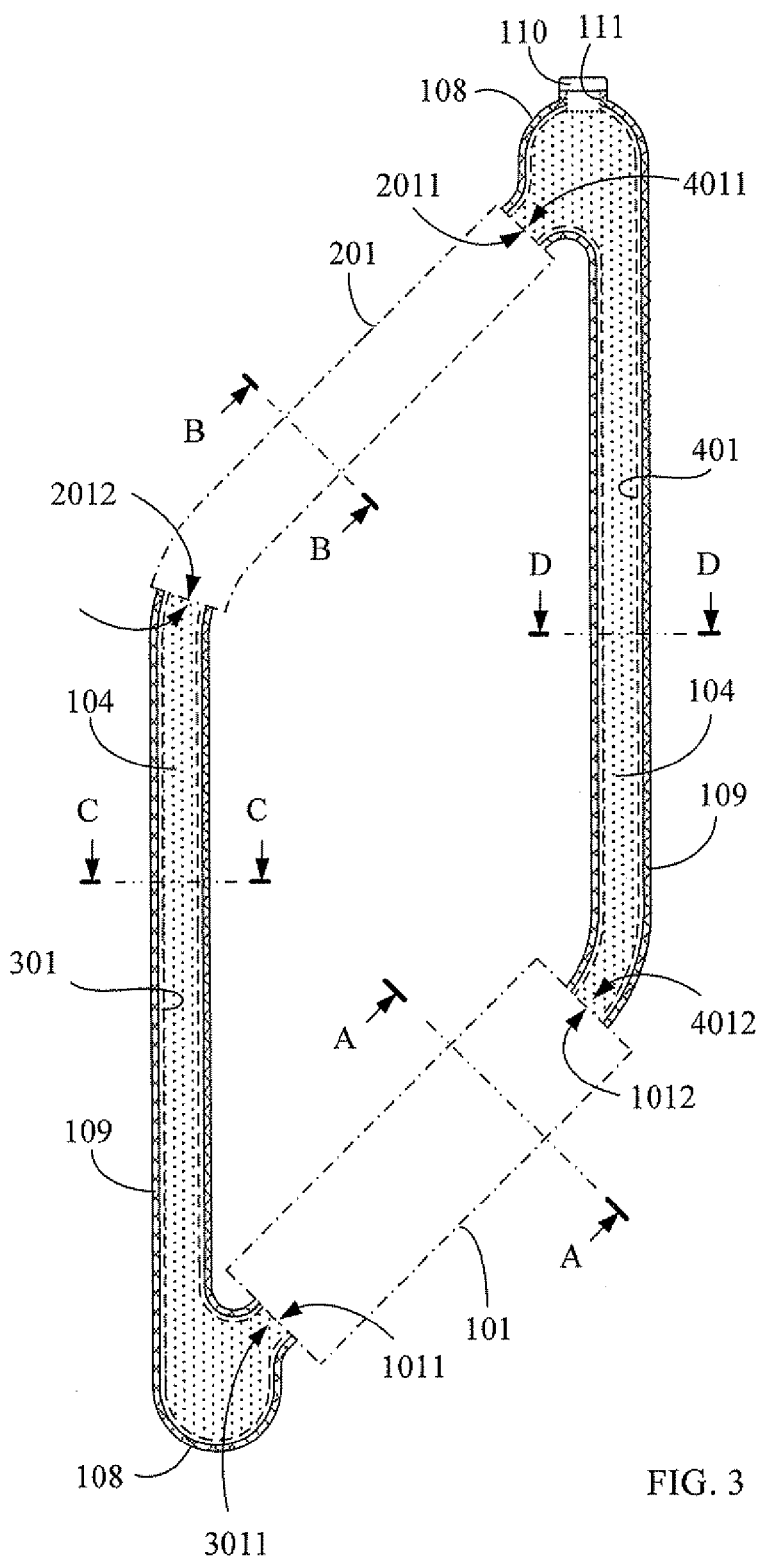
FIG. 3 is a lateral structural view showing the embodiment illustrated in FIG. 1, wherein the upper end of the top corner of the closed-type flowpath is installed with an outward-expanding arc-shaped fluid chamber (108), and provided with the operation port (111) and the sealing plug (110) thereon.

FIG. 3 is a lateral structural view showing the embodiment illustrated in FIG. 1, wherein the upper end of the top corner of the closed-type flowpath is installed with an outward-expanding arc-shaped fluid chamber (108), and is provided with the operation port (111) and the sealing plug (110) thereon.

As shown in FIG. 3, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301), another fluid inlet/outlet port (1012) of the heat gaining device (101) is connected to a fluid inlet/outlet port (2011) of the heat releasing device (201) via the other pipeline structure (401), thereby forming a closed-loop circulation flowpath. The heat exchange fluid (104) passing the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery being subjected to temperature equalization. According to the closed-loop temperature equalization device having a heat releasing device structured by multiple flowpaths provided by the present invention, through the heat exchange fluid (104) performing closed-loop flow circulation in the closed-loop temperature equalization device having a heat releasing device structured by multiple flowpath, the thermal energy of the natural heat storage body (100) and the thermal energy of the temperature differentiation body (103) subjected to temperature equalization are transmitted for temperature equalization. The heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during the system operation.

Features of main components are as follows:

Heat gaining device (101) is made of a material having good heat conductivity, and provided with a flowpath structure configured by one or more flowpaths, or structured by a conduit structure configured by one or more flowpaths, for being installed in the natural heat storage body (100). Two ends of the flowpath of the heat gaining device (101) respectively have a fluid inlet/outlet port (1011), (1012) for being respectively connected to one end of the pipeline structure (301) and one end of the pipeline structure (401), so as to be leaded and connected to the heat releasing device (201) for forming a closed-type circulation flowpath, in which the flowpath inside the heat gaining device (101) is inclined with respect to the horizontal level. The fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and is provided with a flowpath structure configured by two or more flowpaths, or structured by a pipeline structure configured by two or more flowpaths. The exterior of the heat releasing device (201) is served to be in contact with the temperature differentiation body (103), and the thermal energy of the heat exchange fluid (104) passing the heat releasing device (201) is served to perform the heat releasing operation to the temperature differentiation body (103) in multiple directions or in a set direction. The height difference between the fluid inlet/outlet port (2011) and the fluid inlet/outlet port (2012) of the heat releasing device (201) are designed to facilitate or at least has no negative influence to the heat exchange fluid (104) flowing from the heat gaining device (101) to perform the closed-loop flow circulation in the closed-loop temperature equalization device having a heat releasing device structured by multiple flowpath provided by the present invention by means of the hot ascending/cold descending effect of the fluid.

Pipeline structure (301) is constituted by a fluid pipeline structure configured by one or more than one flowpaths in round or other geometric shapes, the pipeline structure (301) is configured by one or more of the following: 1) configured by a material having good heat conductivity; 2) configured by a material having good heat conductivity, and the exterior of all or part of the pipeline segments is covered by a heat insulation member (109); 3) configured by a pipe-like structure or building structural body made of a material having good heat insulation property. One end of the pipeline structure (301) has one or more than one fluid inlet/outlet ports (3011) for being connected to the fluid inlet/outlet port (1011) of the heat gaining device (101) having one or more than one flowpaths, and the other end of the pipeline structure (301) has one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401) is constituted by a fluid pipeline structure configured by one or more flowpaths in round or other geometric shapes, the pipeline structure (401) is configured by one or more one of the following: 1) configured by a material having good heat conductivity; 2) configured by a material having good heat conductivity, and the exterior of all or part of pipeline segments is covered by a heat insulation member (109); 3) configured by a pipe-like structure or building structural body made of a material having good heat insulation property. One end of the pipeline structure (401) has one or more than one fluid inlet/outlet ports (4012) for being connected to the fluid inlet/outlet port (1012) of the heat gaining device (101) having one or more than one flowpaths, and the other end of the pipeline structure (401) has one or more than one fluid inlet/outlet ports (4011) for being respectively connected to the fluid inlet/outlet port (2011) of the heat releasing device (201) having two or more than two flowpaths for transporting the heat exchange fluid (104).

Outward-expanding arc-shaped fluid chamber (108) is constituted by an outward-expanding arc-shaped flowpath structure formed at one or more of the turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) having thermal energy, so as to reduce the flow damping of the closed-type circulation flowpath to the heat exchange fluid (104).

By installing the aforementioned outward-expanding arc-shaped fluid chamber (108) at the upper end of the top corner of the closed-type circulation flowpath configured by the heat gaining device (101), the heat releasing device (201), the pipeline structure (301) and the pipeline structure (401), the damping generated when the heat exchange fluid (104) performs circulative flow can be reduced thereby facilitating the heat exchange. By installing the sealing plug (110) and the operation port (111) at the upper end of the outward-expanding arc-shaped fluid chamber (108) installed at the turning location defined between the pipeline structure (401) and the heat releasing device (201), the fluid is allowed to be filled in or sucked out, and the observation and maintenance can be carried out.

The volume of the fluid stored in the outward-expanding arc-shaped fluid chamber (108) installed close to the fluid inlet/outlet port of the heat gaining device (101) or the heat releasing device (201) is relatively larger, therefore the total heat capacity is larger, when the thermal energy introduced from the temperature differentiation body which is in contact with exterior of the heat gaining device (101) or the heat releasing device (201) is transmitted towards two ends through the fluid, the fluid at the end where the heat gaining device (101) or the heat releasing device (201) being provided with the outward-expanding arc-shaped fluid chamber (108) generates a smaller temperature difference, the other end where the outward-expanding arc-shaped fluid chamber (108) not being installed generates a greater temperature difference, thereby forming temperature differentiation at two ends of the inlet/outlet port of the heat gaining device (101) or the heat releasing device (201).

The aforementioned closed-loop temperature equalization device having a heat releasing device structured by multiple flowpath includes at least a heat gaining device (101), at least a heat releasing device (201), at least a pipeline structure (301) and at least a pipeline structure (401) in series connection, or in series and parallel connection, to configure a closed-loop flowpath. The heat gaining device (101), the heat releasing device (201), the pipeline structure (301) and the pipeline structure (401) can be integrally formed or assembled by a plurality of components. The dimension and shape at each connecting location for the assembly is in a gradually-altered shape for forming a smooth state. Said smooth state can reduce the damping while the fluid is flowing, thereby facilitating the flow circulation of the fluid.

The aforementioned closed-loop temperature equalization device having a heat releasing device structured by multiple flowpaths can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

Figure 4:
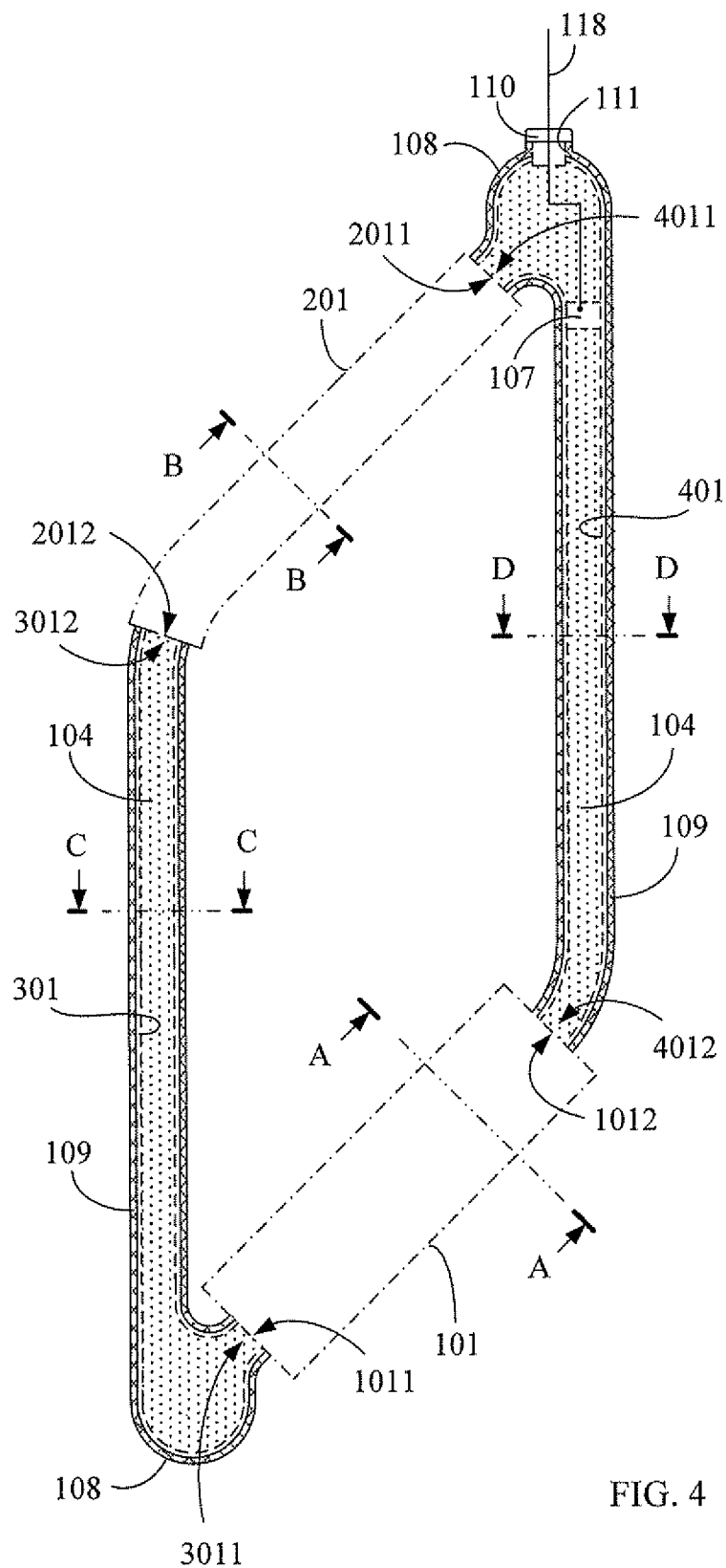
FIG. 4 is a lateral structural view showing the embodiment illustrated in FIG. 1 installed with the auxiliary fluid pump (107) and with the outward-expanding arc-shaped fluid chamber (108), the operation port (111) and the sealing plug (110) at the top end of the corner part of the closed-type flowpath.

According to the present invention, the closed-loop temperature equalization device having a heat releasing device structured by multiple flowpaths can be further provided with the auxiliary fluid pump (107) installed in the closed-type circulation flowpath in series and configured by the heat gaining device (101), the heat releasing device (201), the pipeline structure (301) and the pipeline structure (401) for actively controlling the auxiliary fluid pump (107) to pump in the normal direction or pump in the reverse direction or stop operation. Further, an outward-expanding arc-shaped fluid chamber (108) may be installed at the upper end of the top corner of the closed-type circulation flowpath for lowering the damping of the closed-type circulative flow of the heat exchange fluid (104), so as to facilitate the heat exchange, as follows:

FIG. 4 is a lateral structure view showing the embodiment illustrated in FIG. 1 installed with the auxiliary fluid pump (107) and installed with the outward-expanding arc-shaped fluid chamber (108) and the operation port (111) and the scaling plug (110) at the top end of the corner part of the closed-type flowpath.

As shown in FIG. 4, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301), another fluid inlet/outlet port (1012) of the heat gaining device (101) is connected to a fluid inlet/outlet port (2011) of the heat releasing device (201) via the pipeline structure (401) thereby forming a closed-loop circulation flowpath, so the heat exchange fluid (104) passing the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery being subjected to temperature equalization; according to the closed-loop temperature equalization device having a heat releasing device structured by multiple flowpath provided by the present invention, through the heat exchange fluid (104) performing closed-loop flow circulation in the closed-loop temperature equalization device having a heat releasing device structured by multiple flowpath, the thermal energy of the natural heat storage body (100) and the thermal energy of the temperature differentiation body (103) subjected to temperature equalization are transmitted for temperature equalization; the heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during the system operation.

Features of main components are as follows:

Heat gaining device (101) is made of a material having good heat conductivity, and provided with a flowpath structure configured by one or more flowpaths, or structured by a conduit structure configured by one or more than one flowpaths, for being installed in the natural heat storage body (100). Two ends of the flowpath of the heat gaining device (101) respectively have a fluid inlet/outlet port (1011), (1012) for being respectively connected to one end of the pipeline structure (301) and one end of the pipeline structure (401), so as to be leaded and connected to the heat releasing device (201) for forming a closed-type circulation flowpath, in which the flowpath inside the heat gaining device (101) is inclined with respect to the horizontal level, the fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and provided with a flowpath structure configured by two or more than two flowpaths, or structured by a pipeline structure configured by two or more than two flowpaths. The exterior of the heat releasing device (201) is served to be in contact with the temperature differentiation body (103), and the thermal energy of the heat exchange fluid (104) passing the heat releasing device (201) is served to perform the heat releasing operation to the temperature differentiation body (103) in multiple directions or in a set direction, the height difference between the fluid inlet/outlet port (2011) and the fluid inlet/outlet port (2012) of the heat releasing device (201) are designed to facilitate or at least has no negative influence to the heat exchange fluid (104) flowing from the heat gaining device (101) to perform the closed-loop flow circulation in the closed-loop temperature equalization device having a heat releasing device structured by multiple flowpaths provided by the present invention by means of the hot ascending/cold descending effect of the fluid.

Pipeline structure (301) is constituted by a fluid pipeline structure configured by one or more flowpaths in round or other geometric shapes, the pipeline structure (301) is configured by one or more of the following: 1) configured by a material having good heat conductivity; 2) configured by a material having good heat conductivity, and the exterior of all or part of the pipeline segments is covered by a heat insulation member (109); 3) configured by a pipe-like structure or building structural body made of a material having good heat insulation property. One end of the pipeline structure (301) has one or more than one fluid inlet/outlet ports (3011) for being connected to the fluid inlet/outlet port (1011) of the heat gaining device (101) having one or more than one flowpaths, and the other end of the pipeline structure (301) has one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401) is constituted by a fluid pipeline structure configured by one or more flowpaths in round or other geometric shapes, the pipeline structure (401) is configured by one or more of the following: 1) configured by a material having good heat conductivity; 2) configured by a material having good heat conductivity, and the exterior of all or part of pipeline segments is covered by a heat insulation member (109); 3) configured by a pipe-like structure or building structural body made of a material having good heat insulation property. One end of the pipeline structure (401) has one or more than one fluid inlet/outlet ports (4012) for being connected to the fluid inlet/outlet port (1012) of the heat gaining device (101) having one or more than one flowpaths, and the other end of the pipeline structure (401) has one or more than one fluid inlet/outlet ports (4011) for being respectively connected to the fluid inlet/outlet port (2011) of the heat releasing device (201) having two or more than two flowpaths for transporting the heat exchange fluid (104).

Outward-expanding arc-shaped fluid chamber (108) is constituted by an outward-expanding arc-shaped flowpath structure formed at one or more than one of the turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) having thermal energy, so as to reduce the flow damping of the closed-type circulation flowpath to the heat exchange fluid (104). By installing the scaling plug (110) and the operation port (111) at the upper end of the outward-expanding arc-shaped fluid chamber (108) installed at the turning location defined between the pipeline structure (401) and the heat releasing device (201), the fluid is allowed to be filled in or sucked out, and the observation and maintenance can be carried out.

The volume of the fluid stored in the outward-expanding arc-shaped fluid chamber (108) installed close to the fluid inlet/outlet port of the heat gaining device (101) or the heat releasing device (201) is relatively larger, therefore the total heat capacity is larger. When the thermal energy introduced from the temperature differentiation body which is in contact with exterior of the heat gaining device (101) or the heat releasing device (201) is transmitted towards two ends through the fluid, the fluid at the end where the heat gaining device (101) or the heat releasing device (201) being provided with the outward-expanding arc-shaped fluid chamber (108) generates a smaller temperature difference. The other end where the outward-expanding arc-shaped fluid chamber (108) is not installed generates a greater temperature difference, thereby forming temperature differentiation at two ends of the inlet/outlet port of the heat gaining device (101) or the heat releasing device (201).

Auxiliary fluid pump (107) is constituted by a fluid pump driven by a motor driven by the electric power externally supplied through a power wire (118) or by a fluid pump driven by natural forces, provided for being connected in series to the aforementioned closed-type circulation flowpath for pumping the heat exchange fluid (104). The auxiliary fluid pump (107) includes a fixed single-direction pumping operation, or the pumping direction is selectable, and the operation of ON/OFF, speed changing or the pumping flow amount is being controllable.

When the auxiliary fluid pump (107) is not operated, the heat exchange fluid (104) circulates due to the cold descending/hot ascending effect. The auxiliary pump (107) may be actively controlled to pump in the normal direction, for performing auxiliary pumping in the same direction as the cold descending/hot ascending flow direction of the heat exchange fluid (104), or actively controlled to pump in the reverse direction for performing reverse pumping in the direction opposite to the cold descending/hot ascending flow direction of the heat exchange fluid (104).

The aforementioned closed-loop temperature equalization device having heat releasing device structured by multiple flowpaths includes at least a heat gaining device (101), at least a heat releasing device (201), at least a pipeline structure (301) and at least a pipeline structure (401) in series connection, or in series and parallel connection, to configure a closed-loop flowpath. The heat gaining device (101), the heat releasing device (201), the pipeline structure (301) and the pipeline structure (401) can be integrally formed or assembled by plural components. The dimension and shape at each connecting location for the assembly is in a gradually-altered shape for forming a smooth state, said smooth state can reduce the damping while the fluid is flowing, thereby facilitating the flow circulation of the fluid.

The aforementioned closed-loop temperature equalization device having heat releasing device structured by multiple flowpath can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

Figure 5:
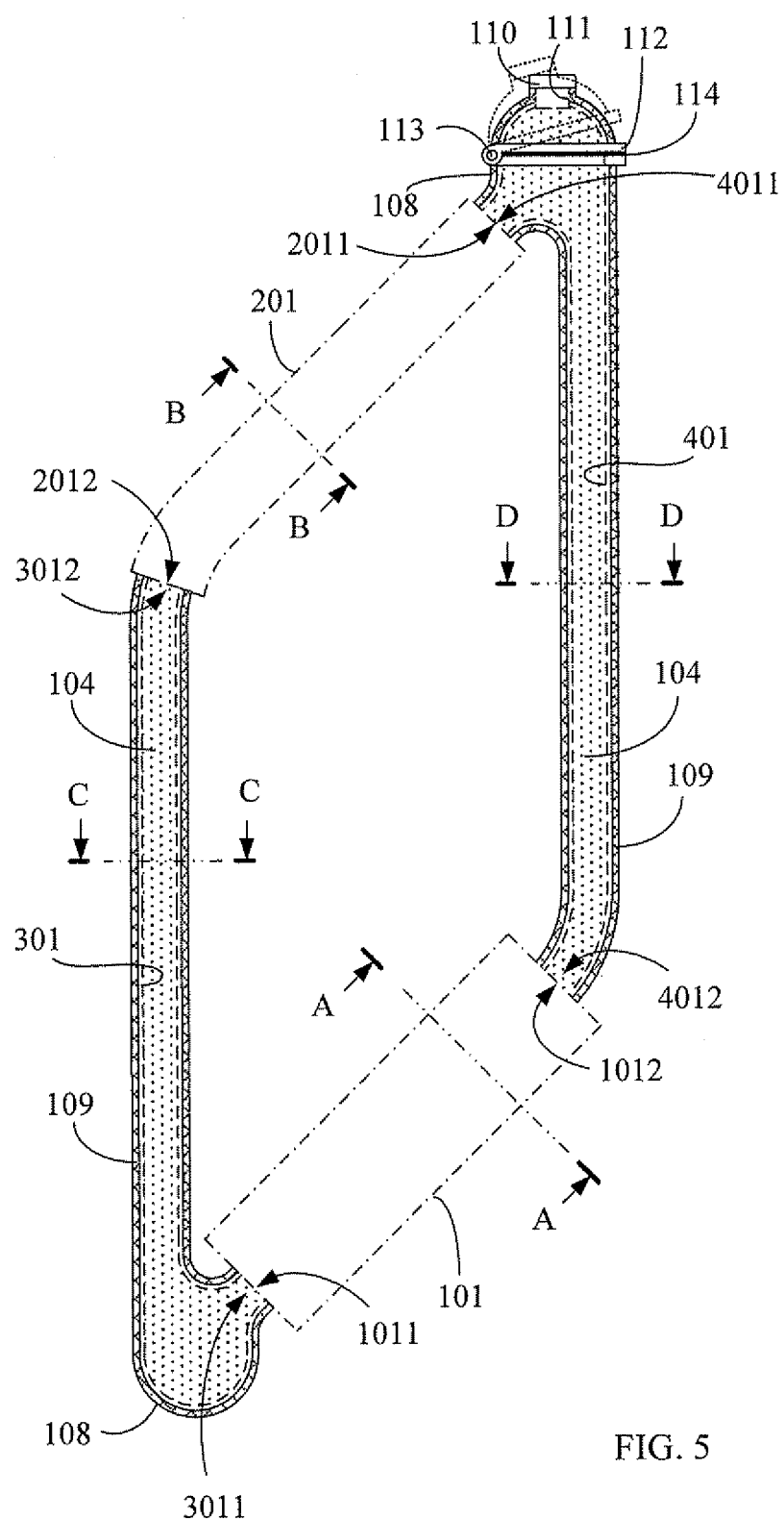
FIG. 5 is a lateral structural view showing the embodiment illustrated in FIG. 1 with the outward-expanding arc-shaped fluid chamber (108) at the upper end of the top corner of the closed-type flowpath, and disposed at the topmost region with the top cover (112) capable of being opened or tightly engaged, the hinge (113), the sealing ring (114), and having the sealing plug (110) and the operation port (111) installed at the upper end of the top cover.

According to the present invention, the closed-loop temperature equalization device having heat releasing device structured by multiple flowpaths can be further installed with an outward-expanding arc-shaped fluid chamber (108) at the upper end of the top corner of the closed-type circulation flowpath configured by the heat gaining device (101), the heat releasing device (201), the pipeline structure (301) and the pipeline structure (401) for lowering the damping of the circulative flow of the heat exchange fluid (104). The outward-expanding arc-shaped fluid chamber (108) disposed at the topmost is installed with a top cover (112) capable of being opened or tightly engaged, a hinge (113), a sealing ring (114), and having the sealing plug (110) and the operation port (111) installed at the upper end of the top cover, as follows:

FIG. 5 is a lateral structural view showing the embodiment illustrated in FIG. 1 installed with the outward-expanding arc-shaped fluid chamber (108) at the upper end of the top corner of the closed-type flowpath, and the outward-expanding arc-shaped fluid chamber (108) disposed at the topmost being installed with the top cover (112) capable of being opened or tightly engaged, the hinge (113), the sealing ring (114), and having the sealing plug (110) and the operation port (111) installed at the upper end of the top cover, according to the present invention.

As shown in FIG. 5, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301). Another fluid inlet/outlet port (1012) of the heat gaining device (101) is connected to a fluid inlet/outlet port (2011) of the heat releasing device (201) via the pipeline structure (401) thereby forming a closed-loop circulation flowpath. The heat exchange fluid (104) passing the heat gaining device (101) is enabled to form a closed-type circulation flowpath through the pipeline structures (301), (401) and the heat releasing device (201), and the heat releasing device (201) releases the thermal energy to the temperature differentiation body (103) at its periphery being subjected to temperature equalization. According to the closed-loop temperature equalization device having heat releasing device structured by multiple flowpaths, through the heat exchange fluid (104) performing closed-loop flow circulation in the closed-loop temperature equalization device having a heat releasing device structured by multiple flowpaths, the thermal energy of the natural heat storage body (100) and the thermal energy of the temperature differentiation body (103) subjected to temperature equalization are transmitted for temperature equalization; the heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during the system operation.

Features of main components are as follows:

Heat gaining device (101) is made of a material having good heat conductivity, and provided with a flowpath structure configured by one or more flowpaths, or structured by a conduit structure configured by one or more flowpaths, for being installed in the natural heat storage body (100). Two ends of the flowpath of the heat gaining device (101) respectively have a fluid inlet/outlet port (1011), (1012) for being respectively connected to one end of the pipeline structure (301) and one end of the pipeline structure (401), so as to be leaded and connected to the heat releasing device (201) for forming a closed-type circulation flowpath, in which the flowpath inside the heat gaining device (101) is inclined with respect to the horizontal level. The fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and provided with a flowpath structure configured by two or more flowpaths, or structured by a pipeline structure configured by two or more flowpaths. The exterior of the heat releasing device (201) is served to be in contact with the temperature differentiation body (103), and the thermal energy of the heat exchange fluid (104) passing the heat releasing device (201) is served to perform the heat releasing operation to the temperature differentiation body (103) in multiple directions or in a set direction. The height difference between the fluid inlet/outlet port (2011) and the fluid inlet/outlet port (2012) of the heat releasing device (201) are designed to facilitate or at least has no negative influence to the heat exchange fluid (104) flowing from the heat gaining device (101) to perform the closed-loop flow circulation in the closed-loop temperature equalization device having heat releasing device structured by multiple flowpath provided by the present invention by means of the hot ascending/cold descending effect of the fluid.

Pipeline structure (301) is constituted by a fluid pipeline structure configured by one or more flowpaths in round or other geometric shapes. The pipeline structure (301) is configured by one or more one of the following: 1) configured by a material having good heat conductivity; 2) configured by a material having good heat conductivity, and the exterior of all or part of the pipeline segments is covered by a heat insulation member (109); 3) configured by a pipe-like structure or building structural body made of a material having good heat insulation property. One end of the pipeline structure (301) has one or more than one fluid inlet/outlet ports (3011) for being connected to the fluid inlet/outlet port (1011) of the heat gaining device (101) having one or more than one flowpaths, and the other end of the pipeline structure (301) has one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401) is constituted by a fluid pipeline structure configured by one or more flowpaths in round or other geometric shapes, the pipeline structure (401) is configured by one or more one of the following: 1) configured by a material having good heat conductivity; 2) configured by a material having good heat conductivity, and the exterior of all or part of pipeline segments is covered by a heat insulation member (109); 3) configured by a pipe-like structure or building structural body made of a material having good heat insulation property. One end of the pipeline structure (401) has one or more than one fluid inlet/outlet ports (4012) connected to the fluid inlet/outlet port (1012) of the heat gaining device (101) having one or more than one flowpaths, and the other end of the pipeline structure (401) has one or more than one fluid inlet/outlet ports (4011) respectively connected to the fluid inlet/outlet port (2011) of the heat releasing device (201) having two or more than two flowpaths for transporting the heat exchange fluid (104).

Outward-expanding arc-shaped fluid chamber (108) is constituted by an outward-expanding arc-shaped flowpath structure formed at one or more than one of the turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) having thermal energy, so as to reduce the flow damping of the closed-type circulation flowpath to the heat exchange fluid (104).

Installing the aforementioned outward-expanding arc-shaped fluid chamber (108) at the upper end of the top corner of the closed-type circulation flowpath configured by the heat gaining device (101), the heat releasing device (201), the pipeline structure (301) and the pipeline structure (401), the damping generated when the heat exchange fluid (104) performs circulative flow can be reduced thereby facilitating the heat exchange. Also, the outward-expanding arc-shaped fluid chamber (108) disposed at the topmost is installed with the top cover (112) capable of being opened or tightly engaged, the hinge (113) and the sealing ring (114) for the benefit of the pipeline maintenance. The upper end of the top cover is installed with the sealing plug (110) and the operation port (111) which allows the fluid to be filled in or sucked out, and further allows observation and maintenance to be carried out. Further, a protection fence or protection net can be optionally installed between the top cover (112) and the pipeline.

The volume of the fluid stored in the outward-expanding arc-shaped fluid chamber (108) installed close to the fluid inlet/outlet port of the heat gaining device (101) or the heat releasing device (201) is relatively larger, therefore the total heat capacity is larger. When the thermal energy introduced from the temperature differentiation body which is in contact with exterior of the heat gaining device (101) or the heat releasing device (201) is transmitted towards two ends through the fluid, the fluid at the end where the heat gaining device (101) or the heat releasing device (201) being provided with the outward-expanding arc-shaped fluid chamber (108) generates a smaller temperature difference. The other end where the outward-expanding arc-shaped fluid chamber (108) not being installed generates a greater temperature difference. Thus, temperature differentiation at two ends of the inlet/outlet port of the heat gaining device (101) or the heat releasing device (201) is formed.

The aforementioned closed-loop temperature equalization device having a heat releasing device structured by multiple flowpaths includes at least a heat gaining device (101), at least a heat releasing device (201), at least a pipeline structure (301) and at least a pipeline structure (401) in series connection or in series and parallel connection to configure a closed-loop flowpath. The heat gaining device (101), the heat releasing device (201), the pipeline structure (301) and the pipeline structure (401) can be integrally formed or assembled by plural components. The dimension and shape at each connecting location for the assembly is in a gradually-altered shape for forming a smooth state, said smooth state can reduce the damping while the fluid is flowing, thereby facilitating the flow circulation of the fluid.

The closed-loop temperature equalization device having a heat releasing device structured by multiple flowpaths can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

Figure 6:
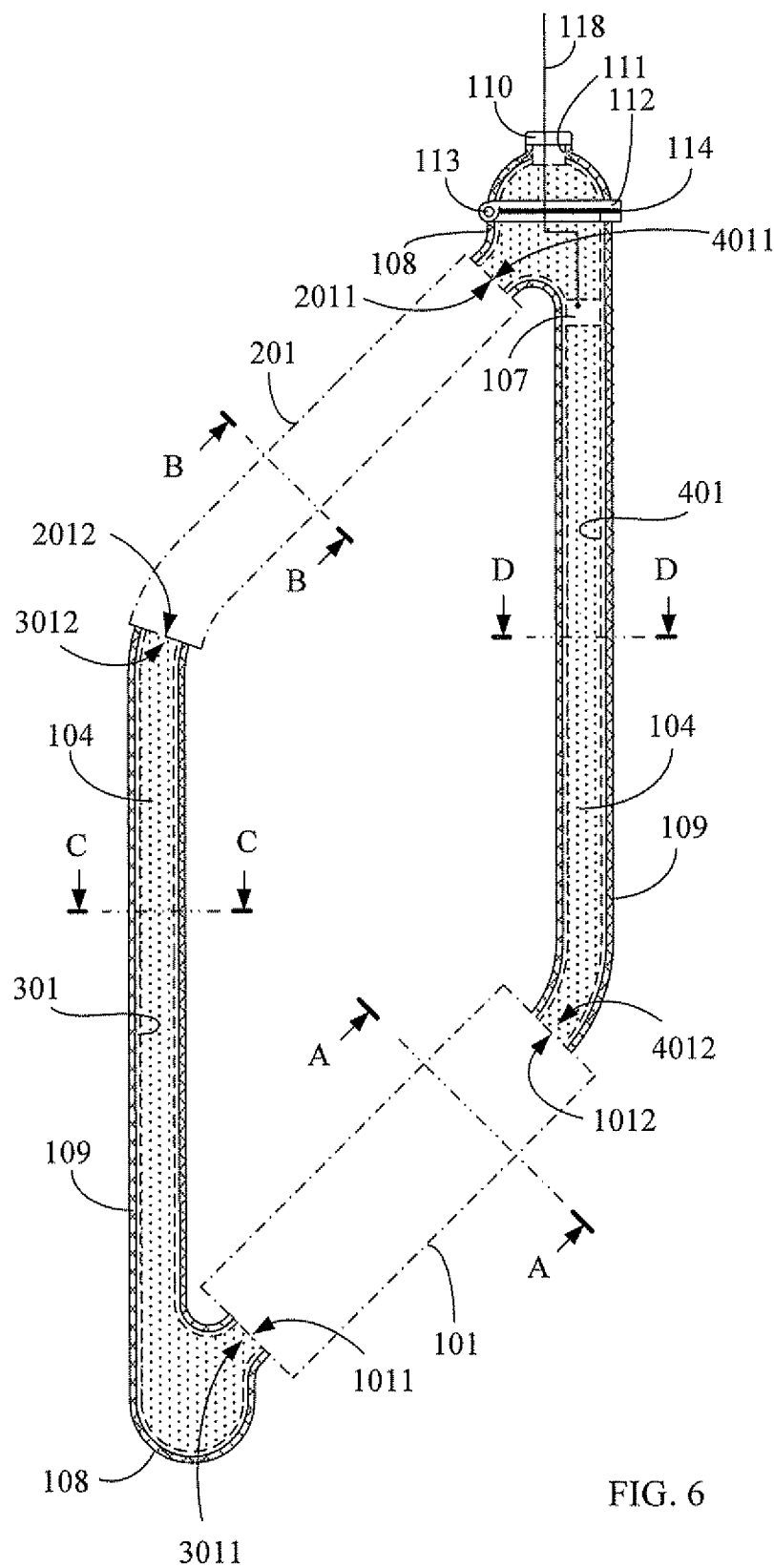
FIG. 6 is a lateral structural view showing the embodiment illustrated in FIG. 1 having the auxiliary fluid pump and the outward-expanding arc-shaped fluid chamber (108) at the upper end of the top corner of the closed-type flowpath, wherein the outward-expanding arc-shaped fluid chamber (108) is disposed at the topmost region and further having the top cover (112) capable of being opened or tightly engaged, the hinge (113), the sealing ring (114), and having the sealing plug (110) and the operation port (111) installed at the upper end of the top cover.

According to the present invention, the closed-loop temperature equalization device having heat releasing device structured by multiple flowpaths can be further installed in series with the auxiliary fluid pump (107) in the closed-type circulation flowpath configured by the heat gaining device (101), the heat releasing device (201), the pipeline structure (301) and the pipeline structure (401) for actively controlling the auxiliary fluid pump (107) to pump in the normal direction or pump in the reverse direction or stop operation. The outward-expanding arc-shaped fluid chamber (108) is also installed at the upper end of the top corner of the closed-type flowpath for lowering the damping of the closed-type circulative flow of the heat exchange fluid (104), thereby facilitating the heat exchange. The outward-expanding arc-shaped fluid chamber (108) disposed at the topmost is further installed with the top cover (112) capable of being opened or tightly engaged, the hinge (113), the sealing ring (114), and having the sealing plug (110) and the operation port (111) installed at the upper end of the top cover, as follows:

FIG. 6 is a lateral structural view showing the embodiment illustrated in FIG. 1 installed with the auxiliary fluid pump and installed with the outward-expanding arc-shaped fluid chamber (108) at the upper end of the top corner of the closed-type flowpath, and the outward-expanding arc-shaped fluid chamber (108) disposed at the topmost being further installed with the top cover (112) capable of being opened or tightly engaged, the hinge (113), the sealing ring (114), and having the sealing plug (110) and the operation port (111) installed at the upper end of the top cover.

As shown in FIG. 6, the heat gaining device (101) is installed in a natural heat storage body (100) which is constituted by a solid or liquid heat storage body having greater and stable heat storage capacity such as a stratum, ground, lake, pool, river, desert, berg and ocean.

A fluid inlet/output port (1011) of the heat gaining device (101) is connected to the fluid inlet/outlet port (2012) of the heat releasing device (201) via the pipeline structure (301), another fluid inlet/outlet port (1012) of the heat gaining device (101) is connected to a fluid inlet/outlet port (2011) of the heat releasing device (201) via the pipeline structure (401) thereby forming a closed-loop circulation flowpath, so the heat exchange fluid (104) passing the heat gaining device (101) is enabled to form a closed-type circulation flowpath through the pipeline structures (301), (401) and the heat releasing device (201). The heat releasing device (201) releases the thermal energy to the temperature differentiation body (103) at its periphery being subjected to temperature equalization. According to the closed-loop temperature equalization device having heat releasing device structured by multiple flowpath, through the heat exchange fluid (104) performing closed-loop flow circulation in the closed-loop temperature equalization device having heat releasing device structured by multiple flowpaths, the thermal energy of the natural heat storage body (100) and the thermal energy of the temperature differentiation body (103) subjected to temperature equalization are transmitted for temperature equalization. The heat exchange fluid (104) is constituted by a gaseous or liquid fluid having heat storage and thermal conduction properties. The temperature differentiation body (103) is a space or structure configured by gas or solid or liquid for receiving the thermal energy released by the heat exchange fluid passing the heat releasing device (201) during the system operation.

Features of main components are as follows:

Heat gaining device (101) is made of a material having good heat conductivity, and provided with a flowpath structure configured by one or more flowpaths, or structured by a conduit structure configured by one or more than one flowpaths, for being installed in the natural heat storage body (100); two ends of the flowpath of the heat gaining device (101) respectively have a fluid inlet/outlet port (1011), (1012) for being respectively connected to one end of the pipeline structure (301) and one end of the pipeline structure (401), so as to be leaded and connected to the heat releasing device (201) for forming a closed-type circulation flowpath, in which the flowpath inside the heat gaining device (101) is inclined with respect to the horizontal level, the fluid inlet/outlet port (1011) at a lower position allows the heat exchange fluid (104) having relatively low temperature to flow in, and the fluid inlet/outlet port (1012) at a higher position allows the heat exchange fluid (104) having relatively high temperature to flow out, so as to facilitate the heat exchange fluid (104) to generate a hot ascending/cold descending effect.

Heat releasing device (201) is made of a material having good heat conductivity, and provided with a flowpath structure configured by two or more than two flowpaths, or structured by a pipeline structure configured by two or more than two flowpaths. The exterior of the heat releasing device (201) is served to be in contact with the temperature differentiation body (103), and the thermal energy of the heat exchange fluid (104) passing the heat releasing device (201) is served to perform the heat releasing operation to the temperature differentiation body (103) in multiple directions or in a set direction, the height difference between the fluid inlet/outlet port (2011) and the fluid inlet/outlet port (2012) of the heat releasing device (201) are designed to facilitate, or at least have no negative influence to, the heat exchange fluid (104) flowing from the heat gaining device (101) to perform the closed-loop flow circulation in the closed-loop temperature equalization device having heat releasing device structured by multiple flowpath provided by the present invention by means of the hot ascending/cold descending effect of the fluid.

Pipeline structure (301) is constituted by a fluid pipeline structure configured by one or more flowpaths in round or other geometric shapes, the pipeline structure (301) is configured by one or more for the following: 1) configured by a material having good heat conductivity; 2) configured by a material having good heat conductivity, and the exterior of all or part of the pipeline segments is covered by a heat insulation member (109); 3) configured by a pipe-like structure or building structural body made of a material having good heat insulation property. One end of the pipeline structure (301) has one or more than one fluid inlet/outlet ports (3011) for being connected to the fluid inlet/outlet port (1011) of the heat gaining device (101) having one or more than one flowpaths, and the other end of the pipeline structure (301) has one or more than one fluid inlet/outlet ports (3012) for being connected to the fluid inlet/outlet port (2012) of the heat releasing device (201) having two or more than two flowpaths for transporting the heat exchange fluid (104).

Pipeline structure (401) is constituted by a fluid pipeline structure configured by one or more flowpaths in round or other geometric shapes, the pipeline structure (401) is configured by one or more one of the following: 1) configured by a material having good heat conductivity; 2) configured by a material having good heat conductivity, and the exterior of all or part of pipeline segments is covered by a heat insulation member (109); 3) configured by a pipe-like structure or building structural body made of a material having good heat insulation property. One end of the pipeline structure (401) has one or more than one fluid inlet/outlet ports (4012) for being connected to the fluid inlet/outlet port (1012) of the heat gaining device (101) having one or more than one flowpaths, and the other end of the pipeline structure (401) has one or more than one fluid inlet/outlet ports (4011) for being respectively connected to the fluid inlet/outlet port (2011) of the heat releasing device (201) having two or more than two flowpaths for transporting the heat exchange fluid (104).

Outward-expanding arc-shaped fluid chamber (108) is constituted by an outward-expanding arc-shaped flowpath structure formed at one or more of the turning locations of the closed-type circulation flowpath configured by the heat gaining device (101), the heat releasing device (201), the pipeline structure (301) and the pipeline structure (401), for temporarily storing a part of the heat exchange fluid (104) and moderating the flow speed of the heat exchange fluid (104) having thermal energy, so as to reduce the flow damping of the closed-type circulation flowpath to the heat exchange fluid (104). The outward-expanding arc-shaped fluid chamber (108) disposed at the topmost is installed with the top cover (112) capable of being opened or tightly engaged, the hinge (113) and the sealing ring (114) for the benefit of the pipeline maintenance. The upper end of the top cover is installed with the sealing plug (110) and the operation port (111) allowing the fluid to be filled in or sucked out and allowing observation and maintenance to be carried out. A protection fence or protection net can be optionally installed between the top cover (112) and the pipeline.

The volume of the fluid stored in the outward-expanding arc-shaped fluid chamber (108) installed close to the fluid inlet/outlet port of the heat gaining device (101) or the heat releasing device (201) is relatively larger, therefore the total heat capacity is larger.

When the thermal energy introduced from the temperature differentiation body which is in contact with exterior of the heat gaining device (101) or the heat releasing device (201) is transmitted towards two ends through the fluid, the fluid at the end where the heat gaining device (101) or the heat releasing device (201) being provided with the outward-expanding arc-shaped fluid chamber (108) generates a smaller temperature difference, the other end where the outward-expanding arc-shaped fluid chamber (108) not being installed generates a greater temperature difference, thereby forming temperature differentiation at two ends of the inlet/outlet port of the heat gaining device (101) or the heat releasing device (201).

Auxiliary fluid pump (107) is constituted by a fluid pump driven by a motor driven by the electric power externally supplied through a power wire (118) or by a fluid pump driven by natural forces, provided for being series connected to the mentioned closed-type circulation flowpath for pumping the heat exchange fluid (104). The auxiliary fluid pump (107) includes a fixed single-direction pumping operation, or the pumping direction is selectable, and the operation of ON/OFF, speed changing or the pumping flow amount is being controllable.

When the auxiliary fluid pump (107) is not operated, the heat exchange fluid (104) circulates due to the cold descending/hot ascending effect. The auxiliary fluid pump (107) may be actively controlled to pump in the normal direction, for performing auxiliary pumping in the same direction as the cold descending/hot ascending flow direction of the heat exchange fluid (104); or actively controlled to pump in the reverse direction, for performing reverse pumping in the direction opposite to the cold descending/hot ascending flow direction of the heat exchange fluid (104).

The aforementioned closed-loop temperature equalization device having heat releasing device structured by multiple flowpaths includes at least a heat gaining device (101), at least a heat releasing device (201), at least a pipeline structure (301) and at least a pipeline structure (401) in series connection, or in series and parallel connection, to configure a closed-loop flowpath. The heat gaining device (101), the heat releasing device (201), the pipeline structure (301) and the pipeline structure (401) can be integrally formed or assembled by a plurality of components. The dimension and shape at each connecting location for the assembly is in a gradually-altered shape for forming a smooth state, said smooth state can reduce the damping while the fluid is flowing, thereby facilitating the flow circulation of the fluid.

The aforementioned closed-loop temperature equalization device having heat releasing device structured by multiple flowpaths can be applied to release energy to the gaseous or solid or liquid heat releasing object, such as a road surface, roof, wall, floor of a building, air inside a green house, or air inside a house, or water in a lake, or equipment or structural body desired to be heated for freeze preventing.

According to the embodiments of the closed-loop temperature equalization device having heat releasing device structured by multiple flowpaths as shown from FIG. 1 to FIG. 6, one or more auxiliary heating/cooling device (115) can be installed in the interior or the exterior of the flowpath segment configured by the heat gaining device (101) and the pipeline structure (401), for actively controlling the thermal energy transmitted from the heat releasing device (201) to the temperature differentiation body (103).

Auxiliary heating/cooling device (115) is driven by the electric power provided from a power wire (116), including being constituted by an electrothermal device capable of converting electric energy into thermal energy, or constituted by a temperature regulation device capable of converting electric energy into thermal energy or converting electric energy into cool energy, or constituted by the semiconductor chips capable of converting electric energy into thermal energy or cooling energy, and installed in the closed-type circulation flowpath of the closed-loop temperature equalization device having heat releasing device structured by multiple flowpath. It may further be disposed at a location for being capable of assisting the heat exchange fluid (104) to perform hot ascending/cold descending and would not influence the flow of heat exchange fluid (104). The installation means includes one or more of the following: 1) fixedly installed inside the flowpath segment configured by the heat gaining device (101) and the pipeline structure (401) of the closed-type circulation flowpath; 2) surroundingly or partially installed at the exterior of the flowpath segment configured by the heat gaining device (101) and the pipeline structure (401) of the closed-type circulation flowpath made of a heat conductive material for indirectly heating or cooling the heat exchange fluid (104)

inside the circulation flowpath; 3) installed inside the flowpath segment configured by the heat gaining device (101) and the pipeline structure (401) of the closed-type circulation flowpath through being randomly accommodated from the operation port (111) or via opening the top cover (112); and 4) installed at the bottom of the sealing plug (110) for being coupled to the interior of the flowpath segment configured by the heat gaining device (101) and the pipeline structure (401) of the closed-type circulation flowpath.

Figure 7:
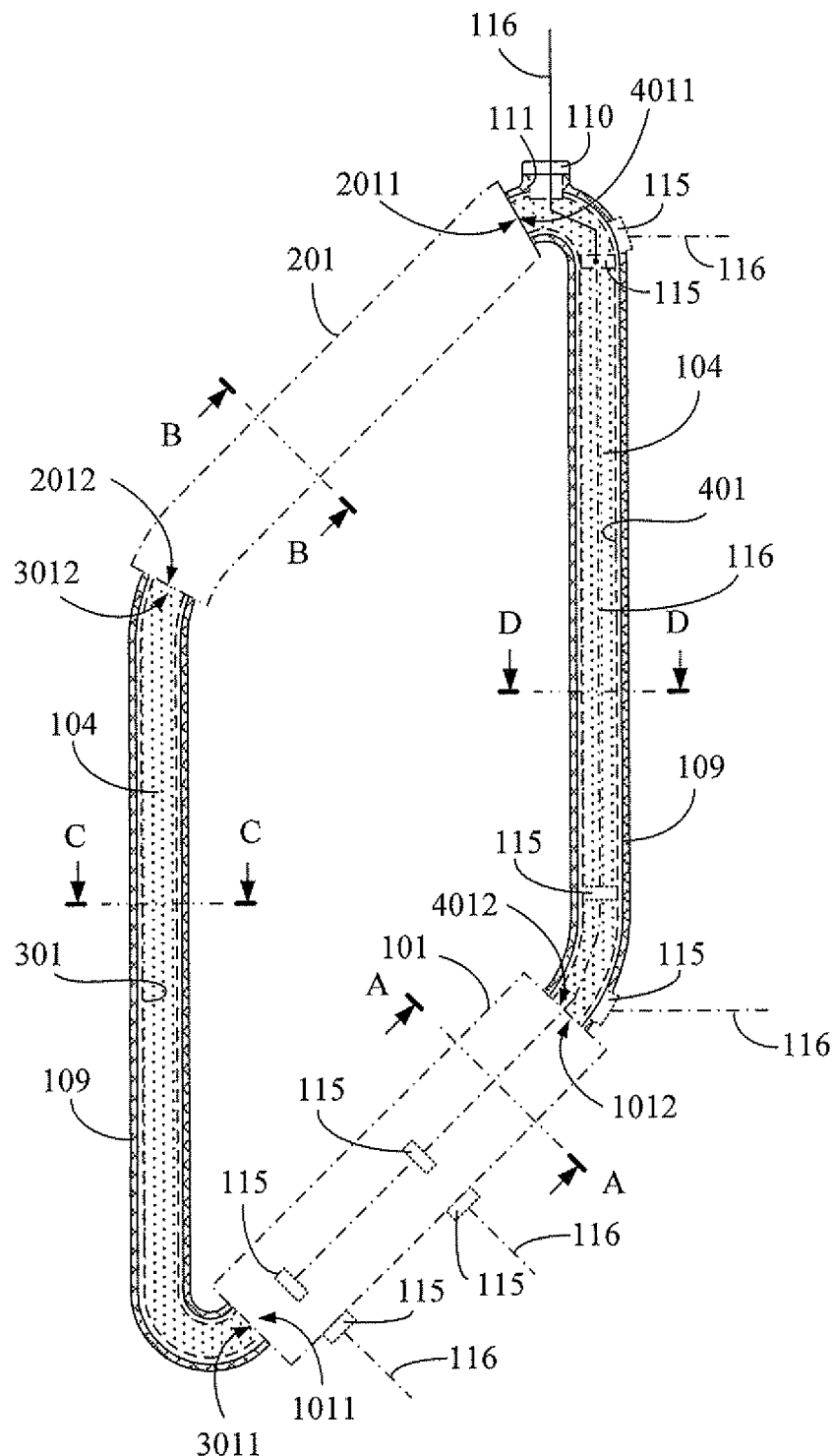
FIG. 7 is a lateral structural view showing the cross section of FIG. 1 wherein the interior or exterior of the flowpath segment configured by the heat gaining device (101) and the pipeline structure (401) is installed with the auxiliary heating/cooling device (115).

FIG. 7 is a lateral structural view showing the cross section of FIG. 1 wherein the interior or exterior of the flowpath segment configured by the heat gaining device (101) and the pipeline structure (401) is installed with the auxiliary heating/cooling device (115).

Figure 8:
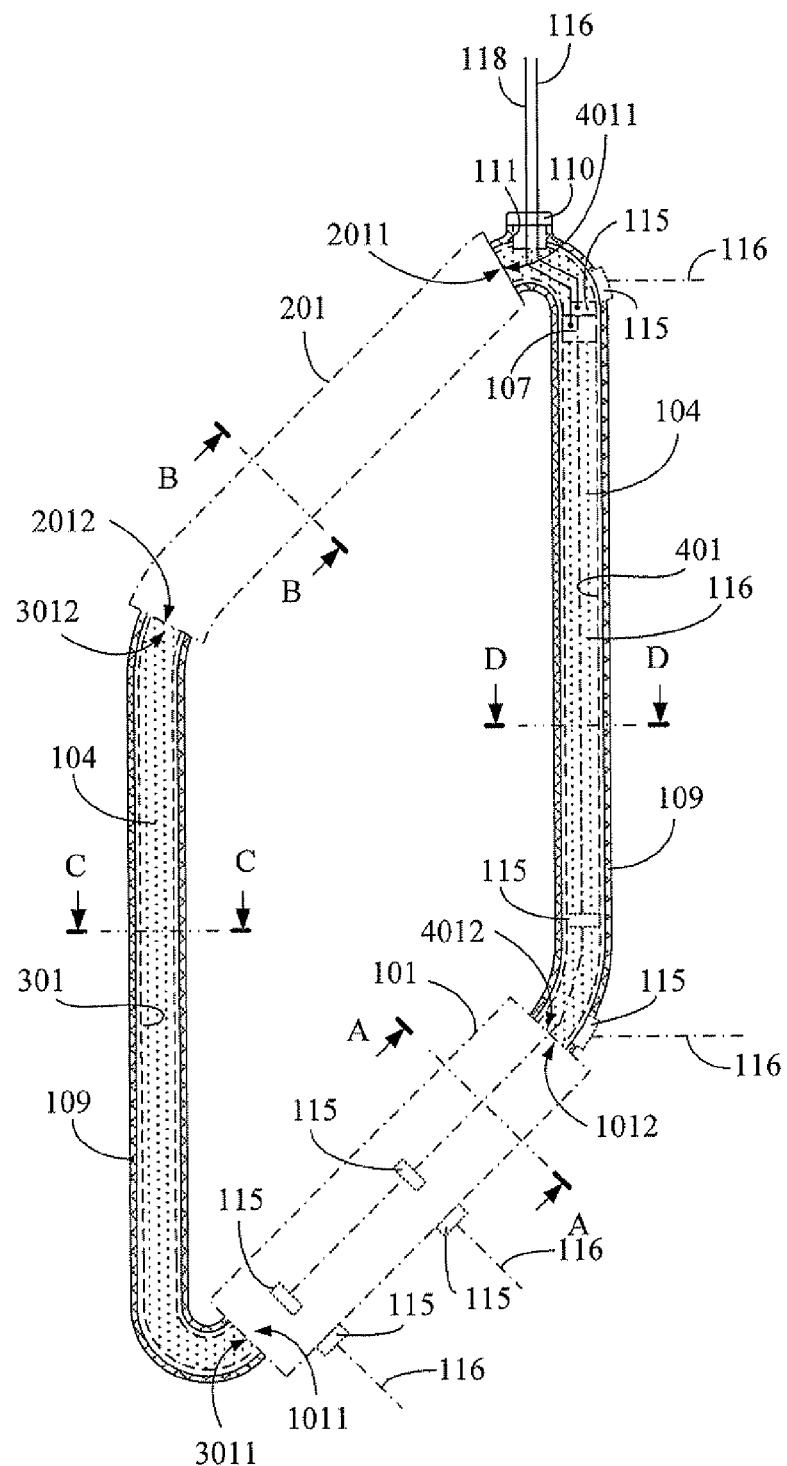
FIG. 8 is a lateral structural view showing the cross section of FIG. 2 wherein the interior of the flowpath segment configured by the heat gaining device (101) and the pipeline structure (401) includes the auxiliary fluid pump (107), and the interior or the exterior is installed with the auxiliary heating/cooling device (115).

FIG. 8 is a lateral structural view showing the cross section of FIG. 2 wherein the interior of the flowpath segment configured by the heat gaining device (101) and the pipeline structure (401) being installed with the auxiliary fluid pump (107), and the interior or the exterior is installed with the auxiliary heating/cooling device (115).

Figure 9:
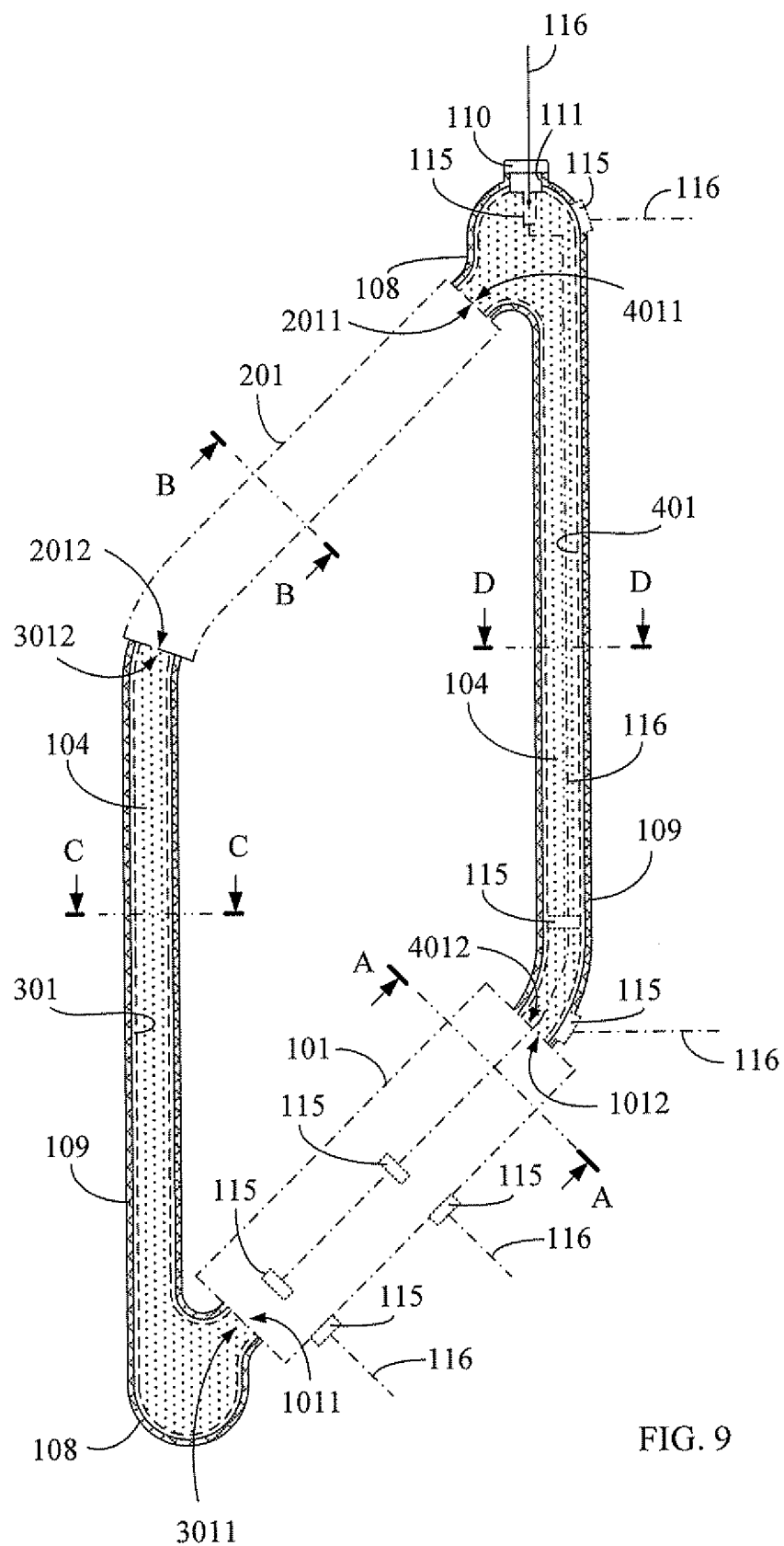
FIG. 9 is a lateral structural view showing the cross section of FIG. 3 wherein the interior or exterior of the flowpath segment configured by the heat gaining device (101) and the pipeline structure (401) is installed with the auxiliary heating/cooling device (115).

FIG. 9 is a lateral structural view showing the cross section of FIG. 3 wherein the interior or exterior of the flowpath segment configured by the heat gaining device (101) and the pipeline structure (401) is installed with the auxiliary heating/cooling device (115).

Figure 10:
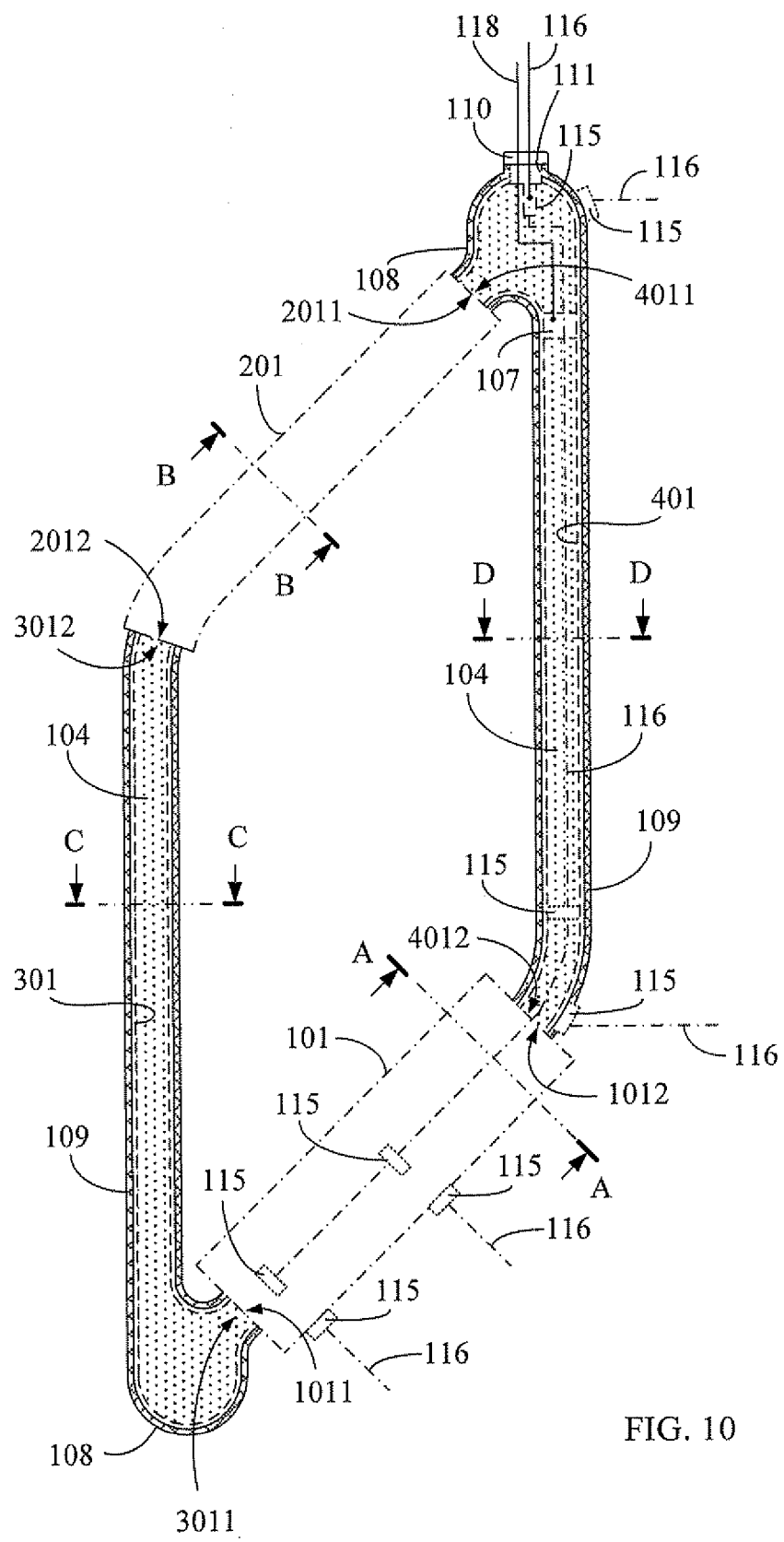
FIG. 10 is a lateral structural view showing the cross section of FIG. 4 wherein the interior of the flowpath segment configured by the heat gaining device (101) and the pipeline structure (401) is installed with the auxiliary fluid pump (107), and the interior or the exterior is installed with the auxiliary heating/cooling device (115).

FIG. 10 is a lateral structural view showing the cross section of FIG. 4 wherein the interior of the flowpath segment configured by the heat gaining device (101) and the pipeline structure (401) is installed with the auxiliary fluid pump (107), and the interior or the exterior is installed with the auxiliary heating/cooling device (115).

Figure 11:
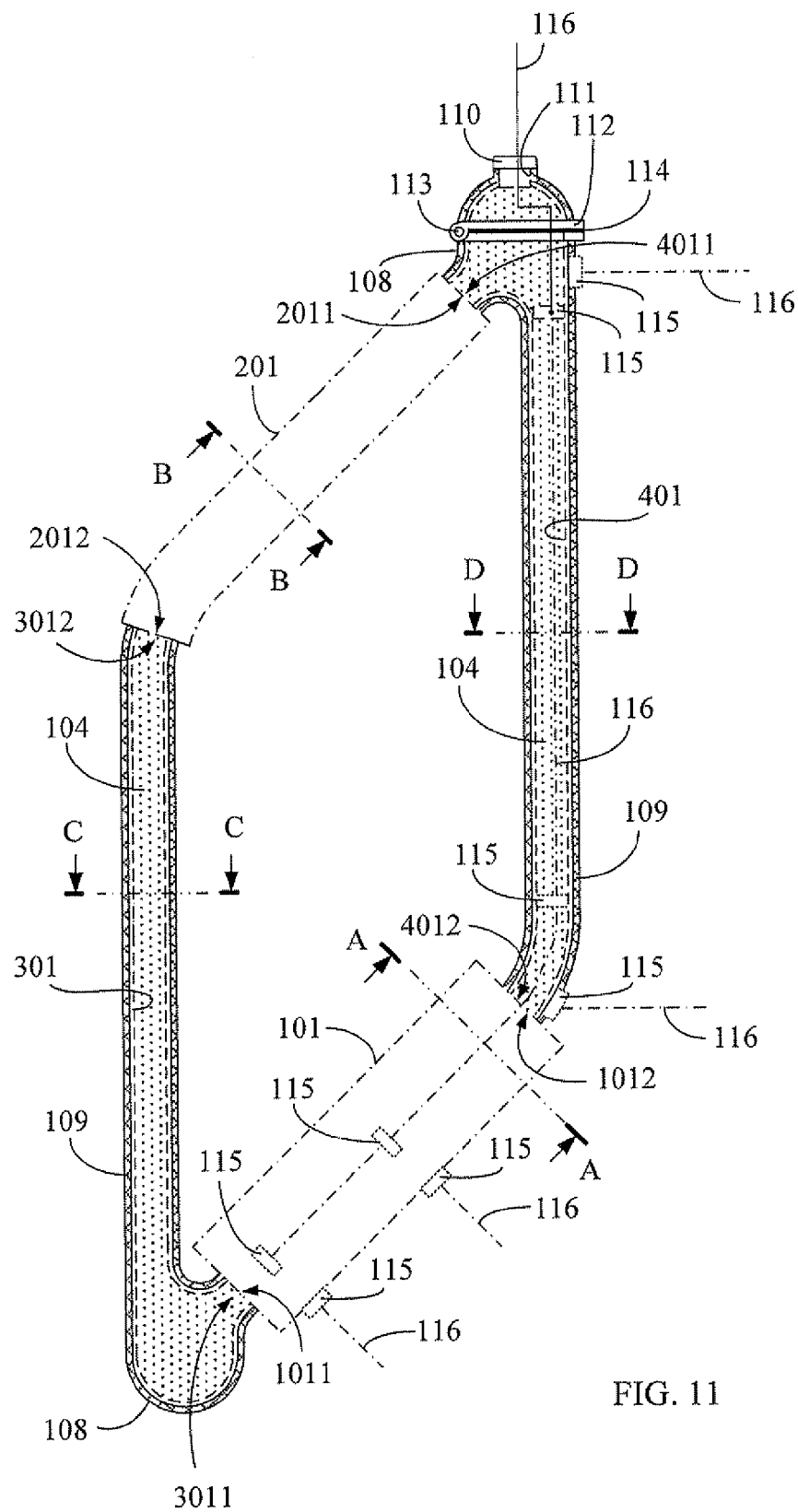
FIG. 11 is a lateral structural view showing the cross section of FIG. 5 wherein the interior or exterior of the flowpath segment configured by the heat gaining device (101) and the pipeline structure (401) is installed with the auxiliary heating/cooling device (115).

FIG. 11 is a lateral structural view showing the cross section of FIG. 5 wherein the interior or exterior of the flowpath segment configured by the heat gaining device (101) and the pipeline structure (401) is installed with the auxiliary heating/cooling device (115).

Figure 12:
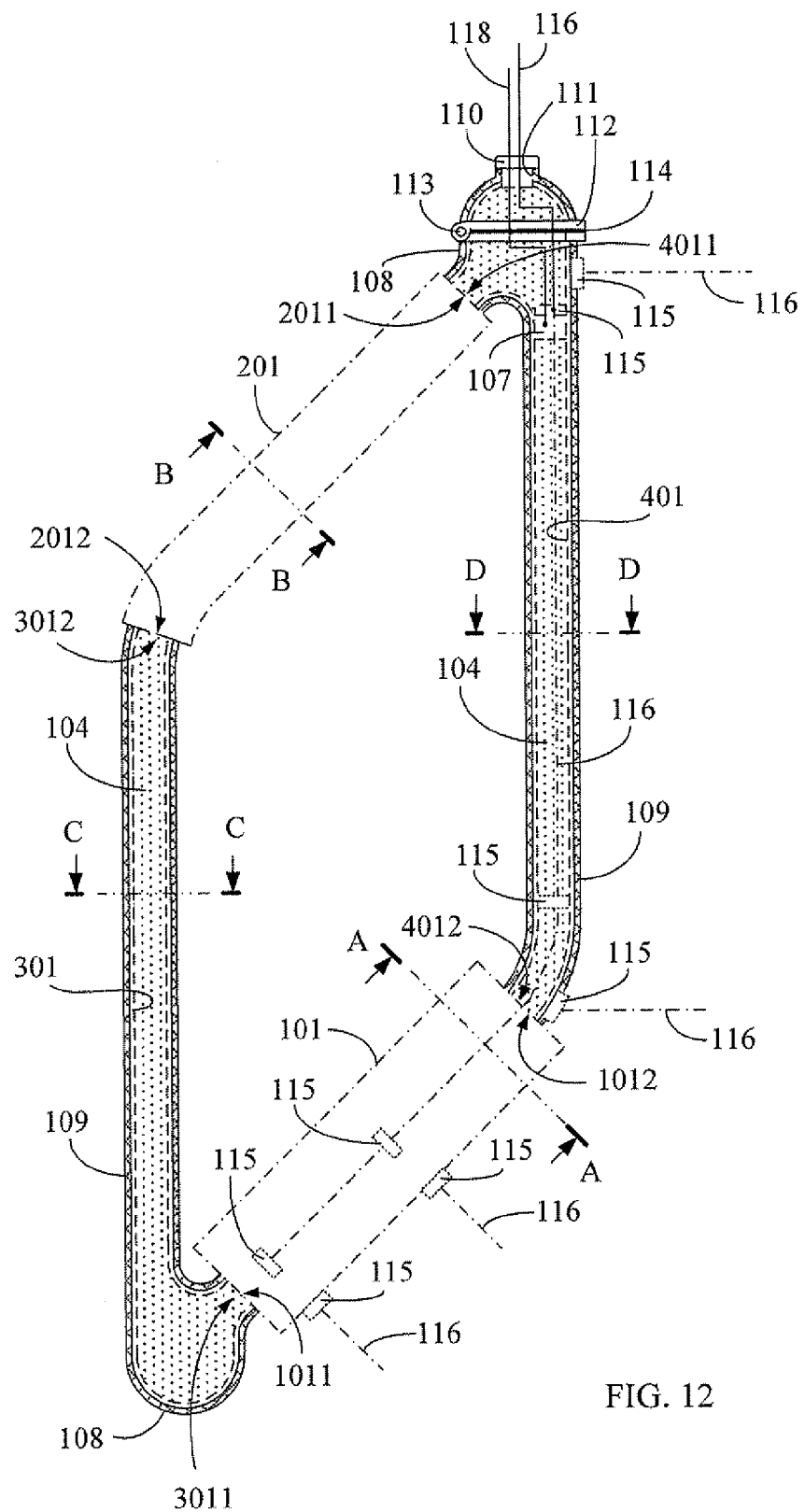
FIG. 12 is a lateral structural view showing the cross section of FIG. 6 wherein the interior of the flowpath segment configured by the heat gaining device (101) and the pipeline structure (401) is installed with the auxiliary fluid pump (107), and the interior or the exterior being installed with the auxiliary heating/cooling device (115).

FIG. 12 is a lateral structural view showing the cross section of FIG. 6 wherein the interior of the flowpath segment configured by the heat gaining device (101) and the pipeline structure (401) are installed with the auxiliary fluid pump (107), and the interior or the exterior is installed with the auxiliary heating/cooling device (115).

According to the embodiments disclosed in FIG. 2, FIG. 4, FIG. 6, and FIG. 7 to FIG. 12, the present invention can be further installed with one or both of the auxiliary fluid pump (107) and the auxiliary heating/cooling device (115), and one or both of the heat exchange fluid temperature detecting device (TS201) and the environment temperature detecting device (TS202), wherein the auxiliary fluid pump (107), the auxiliary heating/cooling device (115), the heat exchange fluid temperature detecting device (TS201) and the environment temperature detecting device (TS202) can be controlled through operations of manually reading or setting in a power supply state, or can be controlled to operate in a power supply state by the installation of the electric power control unit (ECU200).

Figure 13:
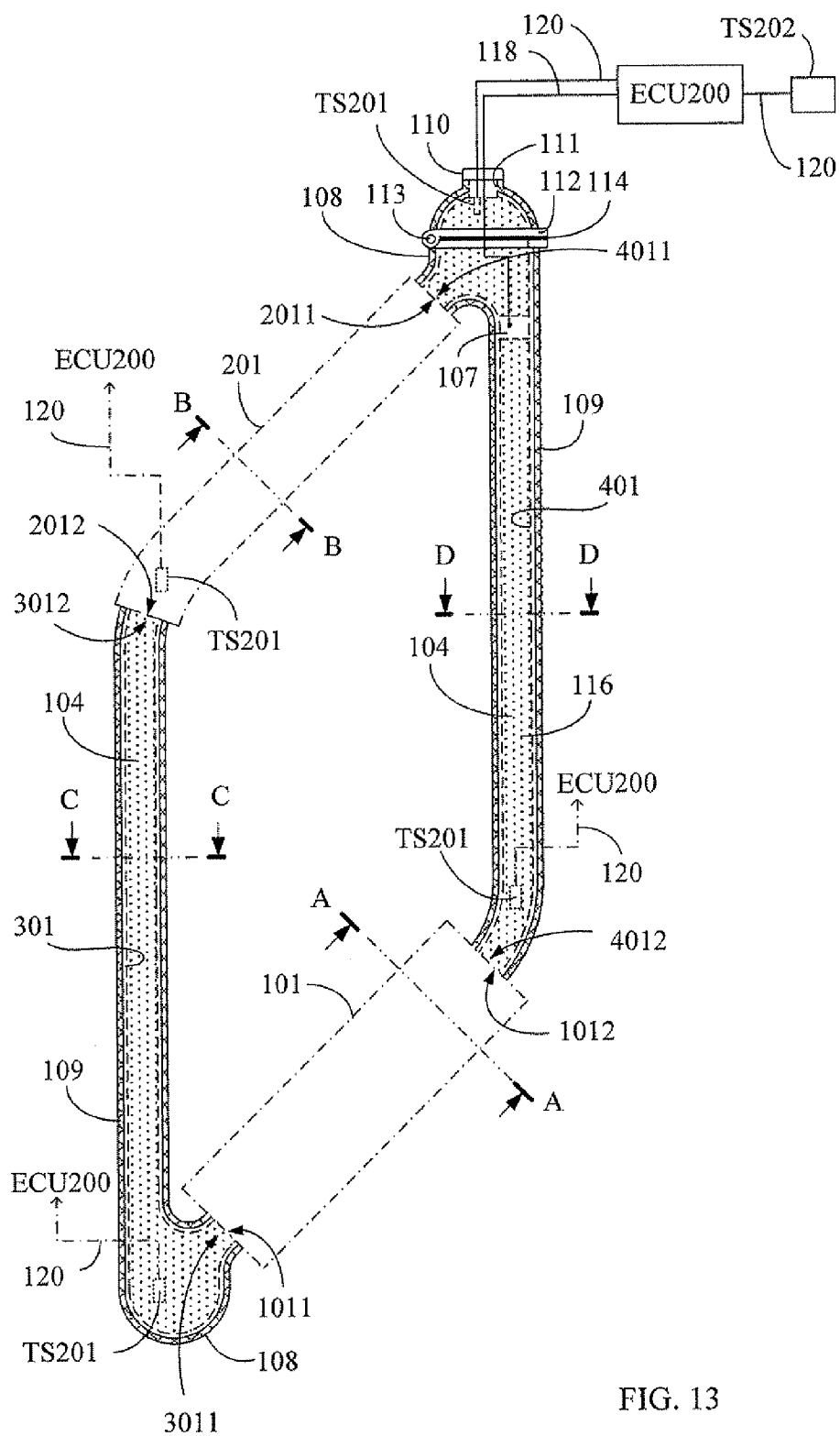
FIG. 13 is a schematic view showing the present invention is installed with the electric power control unit (ECU200), the heat exchange fluid temperature detecting device (TS201) and the environment temperature detecting device (TS202) for controlling the auxiliary fluid pump (107).

FIG. 13 is a schematic view showing the present invention being installed with the electric power control unit (ECU200), the heat exchange fluid temperature detecting device (TS201) and the environment temperature detecting device (TS202) for controlling the auxiliary fluid pump (107).

As shown in FIG. 13, one or more of the heat exchange fluid temperature detecting device (TS201) is installed in the closed-type circulation flowpath, and utilizes a signal transmission wire (120) to transmit the detected temperature value of the heat exchange fluid to the electric power control unit (ECU200), and an environment temperature detecting device (TS202) is installed, and utilizes the signal transmission wire (120) to feedback the detected temperature value to the electric power control unit (ECU200). The timing for supplying power for operation and the amount of pumping flow and pumping direction of the auxiliary fluid pump (107) can be controlled by the electric power control unit (ECU200) with respect to the internal setting and the feedback signals of the heat exchange fluid temperature detecting device (TS201) and the environment temperature detecting device (TS202).

Electric power control unit (ECU200) is constituted by electromechanical components or electric circuit components or micro processors or related software. The interior is equipped with operation parameter settings and with respect to the signals sent by the heat exchange fluid temperature detecting device (TS201) and the environment temperature detecting device (TS202) for controlling the timing for supplying the electric power for operation and the amount of pumping flow and pumping direction of the auxiliary fluid pump (107).

Heat exchange fluid temperature detecting device (TS201) and environment temperature detecting device (TS202) is constituted by one or more temperature detecting devices capable of converting the temperature variation into an analog or digital electric power signal, and installed at the selected temperature detecting points or environment temperature detecting points in the closed-type circulation flowpath for transmitting the signals to the electric power control unit (ECU200) through the signal transmission wire (120).

The aforementioned environment temperature detecting device (TS202) can be optionally installed according to actual needs.

Figure 14:
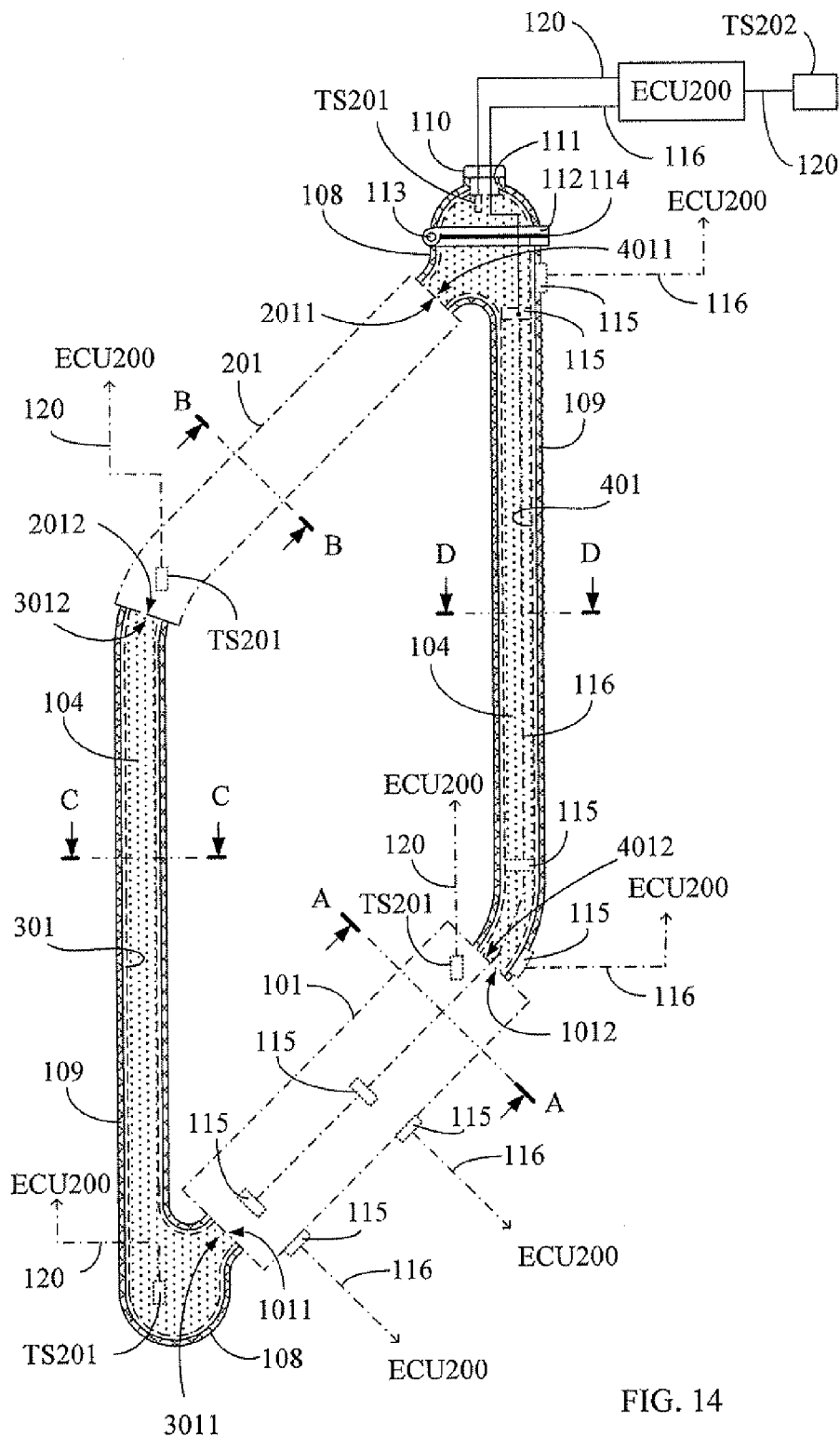
FIG. 14 is a schematic view showing the present invention is installed with the electric power control unit (ECU200), the heat exchange fluid temperature detecting device (TS201) and the environment temperature detecting device (TS202) for controlling the auxiliary heating/cooling device (115).

FIG. 14 is a schematic view showing the present invention being installed with the electric power control unit (ECU200), the heat exchange fluid temperature detecting device (TS201) and the environment temperature detecting device (TS202) for controlling the auxiliary heating/cooling device (115).

As shown in FIG. 14, one or more than one of the heat exchange fluid temperature detecting device (TS201) is installed in the closed-type circulation flowpath, and utilizes a signal transmission wire (120) to transmit the detected temperature value of the heat exchange fluid to the electric power control unit (ECU200), and the environment temperature detecting device (TS202) is installed, and utilizes the signal transmission wire (120) to feedback the detected temperature value to the electric power control unit (ECU200). The timing for supplying power for heating and heating values of the auxiliary heating/cooling device (115) can be controlled by the electric power control unit (ECU200) with respect to the internal setting and the feedback signals of the heat exchange fluid temperature detecting device (TS201) and the environment temperature detecting device (TS202).

Electric power control unit (ECU200) is constituted by electromechanical components or electric circuit components or micro processors or related software. The interior is equipped with operation parameter setting and with respect to the signals sent by the heat exchange fluid temperature detecting device (TS201) and the environment temperature detecting device (TS202) for controlling the timing for supplying the electric power for heating and the heating values of the auxiliary heating/cooling device (115).

Heat exchange fluid temperature detecting device (TS201) and environment temperature detecting device (TS202) is constituted by one or more temperature detecting devices capable of converting the temperature variation into an analog or digital electric power signal, and installed at the selected temperature detecting points or environment temperature detecting points in the closed-type circulation flowpath for transmitting the signals to the electric power control unit (ECU200) through the signal transmission wire (120).

The mentioned environment temperature detecting device (TS202) can be optionally installed according to actual needs.

Figure 15:
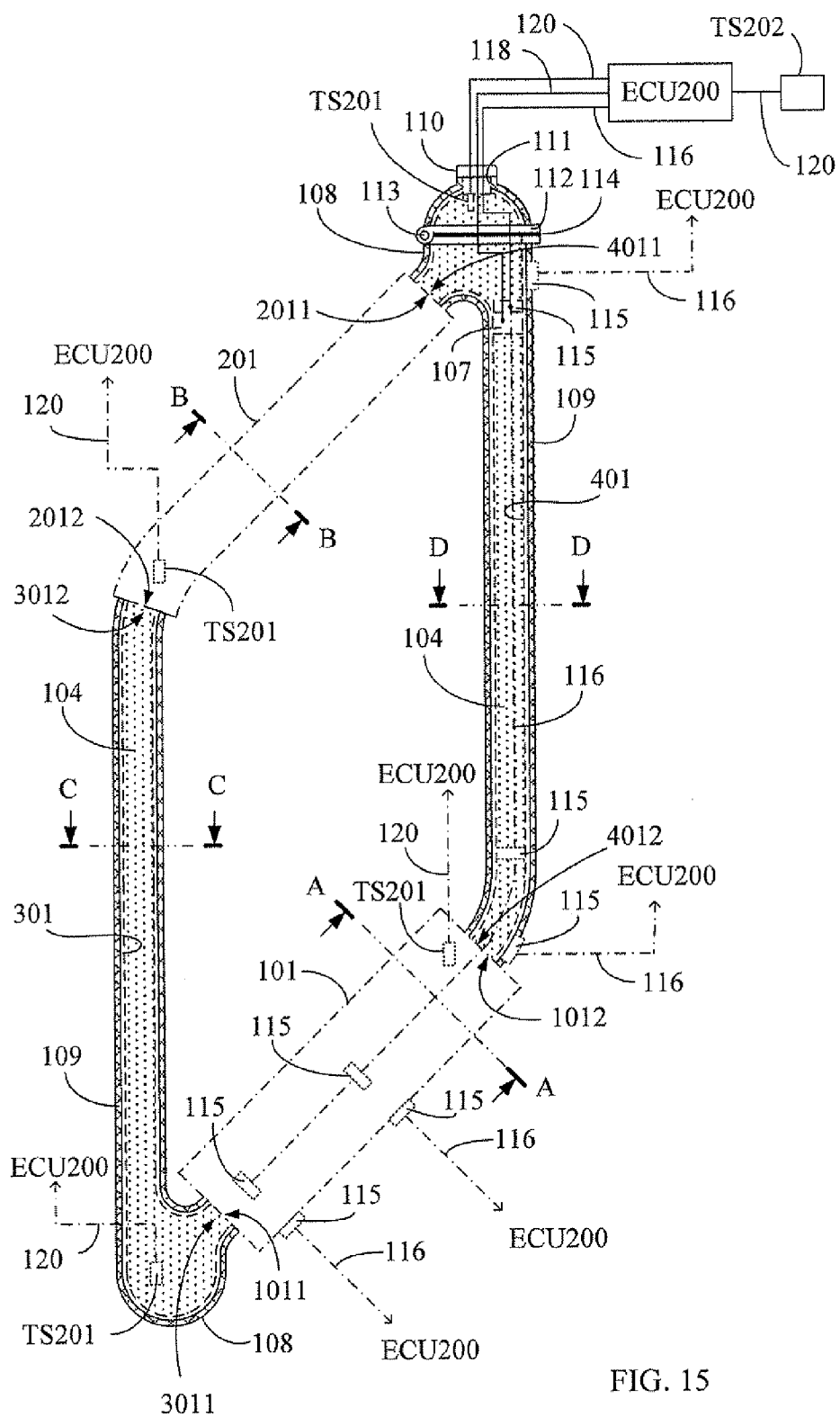
FIG. 15 is a schematic view showing the present invention is installed with the electric power control unit (ECU200), the heat exchange fluid temperature detecting device (TS201) and the environment temperature detecting device (TS202) for controlling the auxiliary fluid pump (107) and the auxiliary heating/cooling device (115).

FIG. 15 is a schematic view showing the present invention being installed with the electric power control unit (ECU200), the heat exchange fluid temperature detecting device (TS201) and the environment temperature detecting device (TS202) for controlling the auxiliary fluid pump (107) and the auxiliary heating/cooling device (115).

As shown in FIG. 15, one or more than one of the heat exchange fluid temperature detecting device (TS201) is installed in the closed-type circulation flowpath, and utilizes a signal transmission wire (120) to transmit the detected temperature value of the heat exchange fluid to the electric power control unit (ECU200), and the environment temperature detecting device (TS202) is installed, and utilizes the signal transmission wire (120) to feedback the detected temperature value to the electric power control unit (ECU200). The timing for supplying power for operation and the amount of pumping flow and pumping direction of the auxiliary fluid pump (107) and the timing for supplying power for heating and the heating values of the auxiliary heating/cooling device (115) can be controlled by the electric power control unit (ECU200) with respect to the internal setting and the feedback signals of the heat exchange fluid temperature detecting device (TS201) and the environment temperature detecting device (TS202).

Electric power control unit (ECU200) is constituted by electromechanical components or electric circuit components or micro processors or related software, and the interior is equipped with operation parameter setting and with respect to the signals sent by the heat exchange fluid temperature detecting device (TS201) and the environment temperature detecting device (TS202) for controlling the timing for supplying power for operation and the amount of pumping flow and pumping direction of the auxiliary fluid pump (107) and the timing for supplying power for heating and the heating values of the auxiliary heating/cooling device (115).

Heat exchange fluid temperature detecting device (TS201) and environment temperature detecting device (TS202) is constituted by one or more temperature detecting devices capable of converting the temperature variation into an analog or digital electric power signal, and installed at the selected temperature detecting points or environment temperature detecting points in the closed-type circulation flowpath for transmitting the signals to the electric power control unit (ECU200) through the signal transmission wire (120).

The aforementioned environment temperature detecting device (TS202) can be optionally installed according to actual needs.

In the closed-loop temperature equalization device having heat releasing device structured by multiple flowpaths, the closed-type circulation flowpath is configured by the heat gaining device (101), the heat releasing device (201), the pipeline structure (301) and the pipeline structure (401), wherein the heat releasing device (201) are specified to be configured by two or more flowpaths, the heat releasing device (201) and the heat gaining device (101) are exposed entirely to be served as the heat gaining surface or the heat releasing surface, or both. Alternatively, one of the partial direction of the heat releasing device (201) and the heat gaining device (101) is served as the heat insulating surface to cover the heat insulation body (109). The heat releasing device (201) having two or more flowpaths, the heat gaining device (101) having one or more flowpaths, the pipeline structure (301) having one or more flowpaths and the pipeline structure (401) having one or more flowpaths are connected in series in the same cross-sectional area of the flowpath or in different cross-sectional areas of the flowpath to constitute the closed-type circulation flowpath. Alternatively, multiple sets of the closed-type circulation flowpath respectively configured by the heat gaining device (101), the heat releasing device (201), the pipeline structure (301), and the pipeline structure (401) are further parallely disposed to jointly constitute the closed-type circulation flowpath, as follows. (I) The rectangular pipelines or pipeline structures having similar shapes are structured by rectangular pipes or pipeline structures having shapes similar to rectangular, including being configured by a heat conductive material, the exterior thereof is covered by a heat insulation member (109), and the interior thereof is configured by one or more of the following structures including: 1) a hollow flowpath, 2) a staggered semi-partitioned flowpath structure, 3) a semi-partitioned flowpath structure at single side, and 4) a partitioned flowpath structure.

Figure 16:
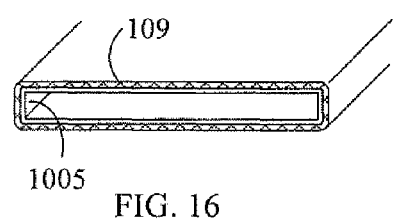
FIG. 16 is a cross sectional view of a rectangular pipeline made of a heat conductive material, wherein the exterior is covered by the heat insulation member and the interior is hollow.

FIG. 16 is a cross sectional view of a rectangular pipeline made of a heat conductive material, wherein the exterior being covered by the heat insulation member and the interior being hollow.

Figure 17:
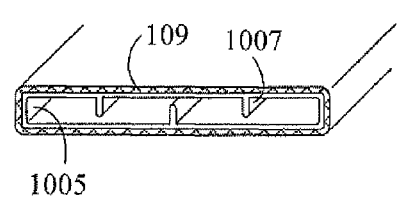
FIG. 17 is a cross sectional view of a rectangular pipeline made of a heat conductive material, wherein the exterior is covered by the heat insulation member and the interior is formed with a staggered semi-partitioned structure.

FIG. 17 is a cross sectional view of a rectangular pipeline made of a heat conductive material, wherein the exterior being covered by the heat insulation member and the interior being formed with a staggered semi-partitioned structure.

Figure 18:
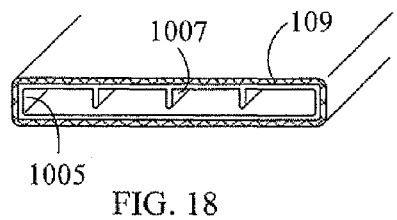
FIG. 18 is a cross sectional view of a rectangular pipeline made of a heat conductive material, wherein the exterior is covered by the heat insulation member and the interior is formed with a semi-partitioned structure at single side.

FIG. 18 is a cross sectional view of a rectangular pipeline made of a heat conductive material, wherein the exterior being covered by the heat insulation member and the interior being formed with a semi-partitioned structure at single side.

Figure 19:
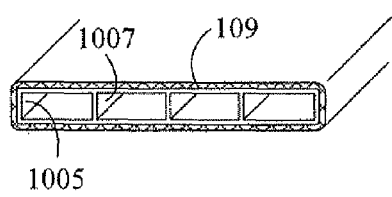
FIG. 19 is a cross sectional view of a rectangular pipeline made of a heat conductive material, wherein the exterior is covered by the heat insulation member and the interior is formed with a partitioned structure.

FIG. 19 is a cross sectional view of a rectangular pipeline made of a heat conductive material, wherein the exterior being covered by the heat insulation member and the interior being formed with a partitioned structure.

The rectangular pipeline structure having the heat insulation body covered at the exterior and having the partitioned flowpath structure at interior includes being configured integrally, or configured by two or more than two rectangular pipelines jointly constituted.

The rectangular pipeline structure shown from FIG. 16 to FIG. 19 includes being made of a non-heat conductive material, and the heat insulation member can be selected to be provided or not provided according to actual needs.

(II) The round pipelines or pipeline structures having similar shapes are made of a heat conductive material, the exterior thereof is covered by the heat insulation member (109), and the interior thereof is configured by one or more of the following structures including: 1) a single pipeline structure having the heat insulation member (109) covered at the exterior, 2) the exterior of each round pipeline structure being covered by the heat insulation member (109) then arranged in parallel to form a multiple flowpath structure, 3) each round pipeline structure being formed with multiple flowpaths arranged in parallel and being connected by a connection structure then jointly covered by the heat insulation structure, and 4) each round pipeline structure being spaced with intervals then jointly covered by the heat insulation member.

Figure 20:
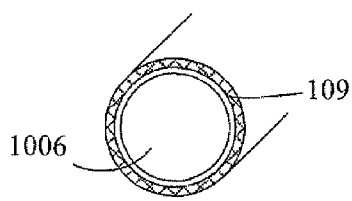
FIG. 20 is a cross sectional view of a round pipeline structure made of a heat conductive material, wherein the interior is hollow and the exterior is covered by the heat insulation member.

FIG. 20 is a cross sectional view of a round pipeline structure made of a heat conductive material, wherein the interior is hollow and the exterior is covered by the heat insulation member.

Figure 21:
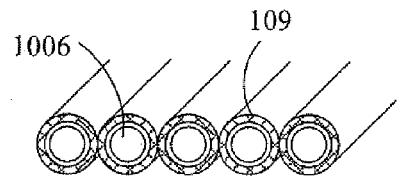
FIG. 21 is a cross sectional view of a round pipeline structure made of a heat conductive material and having one or more than one flowpaths, wherein the exterior of each flowpath of round pipeline structure is covered by the heat insulation member and arranged in parallel to form a multiple flowpath structure.

FIG. 21 is a cross sectional view of a round pipeline structure made of a heat conductive material and having one or more flowpaths, wherein the exterior of each flowpath of round pipeline structure being covered by the heat insulation member then arranged in parallel to form a multiple flowpath structure.

Figure 22:
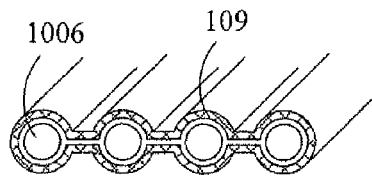
FIG. 22 is a cross sectional view of a round pipeline structure having one or more flowpaths of round pipeline structures and made of a heat conductive material wherein each flowpath of round pipeline structure is arranged in parallel and formed in multiple flowpaths and connected by a connection structure, and jointly covered by a heat insulation member so as to form a multiple flowpath structure.

FIG. 22 is a cross sectional view of a round pipeline structure having one or more flowpaths of round pipeline structures and made of a heat conductive material, wherein each flowpath of round pipeline structure being arranged in parallel and formed in multiple flowpaths and connected by a connection structure then jointly being covered by a heat insulation member so as to form a multiple flowpath structure.

Figure 23:
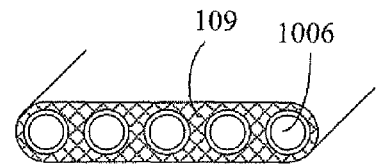
FIG. 23 is a cross sectional view of a round pipeline structure having one or more paths of round pipeline structures and made of a heat conductive material wherein each flowpath of round pipeline structure is spaced with intervals and jointly covered by a heat insulation member so as to form a multiple flowpath structure.

FIG. 23 is a cross sectional view of a round pipeline structure having one or more t paths of round pipeline structures and made of a heat conductive material, wherein each flowpath of round pipeline structure being spaced with intervals then jointly covered by a heat insulation member so as to form a multiple flowpath structure.

The round pipeline structure shown from FIG. 20 to FIG. 23 includes being made of a non-heat conductive material, and the heat insulation member can be selected to be provided or not provided according to actual needs.

Figure 24:
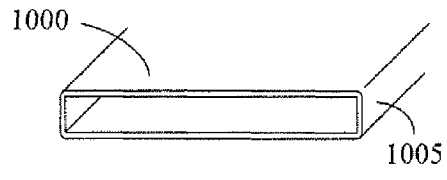
FIG. 24 is a cross sectional view showing a rectangular pipeline structure made of a heat conductive material, wherein the exterior is formed as a planar thermal energy transmitting surface (1000) for serving as the heat releasing surface or heat gaining surface, and the interior is formed with a hollow flowpath structure.

(III) The rectangular pipelines or pipeline structures having similar shapes are configured by a heat conductive material, and the external thermal energy transmitting surface is a heat releasing surface or a heat gaining surface of a planar thermal energy transmitting surface (1000) or wave-shaped thermal energy transmitting surface (1001), and the means for covering the heat insulation member (109) includes one of the following: 1) not being covered by the heat insulation member (109), 2) the exterior of the surface opposite to the thermal energy transmitting surface being covered by the heat insulation member (109), and the lateral sides also fully covered by the heat insulation member (109), 3) the exterior of the surface opposite to the thermal energy transmitting surface being covered by the heat insulation member (109), 4) the exterior of the surface opposite to the thermal energy transmitting surface being covered by the heat insulation member (109), and the lateral sides being partially covered by the heat insulation member (109). The interior thereof is configured by one or more of the following structures including: 1) a hollow flowpath, 2) a staggered semi-partition flowpath structure, 3) a semi-partitioned flowpath structure at a single side, and 4) a partitioned flowpath structure:

FIG. 24 is a cross sectional view showing a rectangular pipeline structure made of a heat conductive material, wherein the exterior being formed as a planar thermal energy transmitting surface (1000) for serving as the heat releasing surface or heat gaining surface, and the interior being formed with a hollow flowpath structure.

Figure 25:
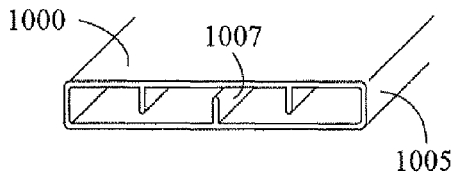
FIG. 25 is a cross sectional view showing a rectangular pipeline structure made of a heat conductive material, wherein the exterior is formed as a planar thermal energy transmitting surface (1000) for serving as the heat releasing surface or heat gaining surface, and the interior being formed with a staggered semi-partitioned flowpath structure.

FIG. 25 is a cross sectional view showing a rectangular pipeline structure made of a heat conductive material, wherein the exterior being formed as a planar thermal energy transmitting surface (1000) for serving as the heat releasing surface or heat gaining surface, and the interior being formed with a staggered semi-partitioned flowpath structure.

Figure 26:
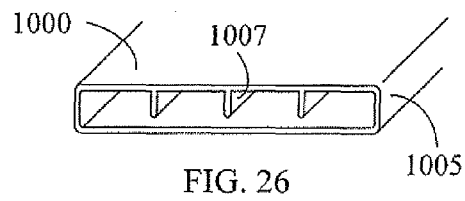
FIG. 26 is a cross sectional view showing a rectangular pipeline structure made of a heat conductive material, wherein the exterior being formed as a planar thermal energy transmitting surface (1000) for serving as the heat releasing surface or heat gaining surface, and the interior being formed with a semi-partitioned flowpath structure at single side.

FIG. 26 is a cross sectional view showing a rectangular pipeline structure made of a heat conductive material, wherein the exterior being formed as a planar thermal energy transmitting surface (1000) for serving as the heat releasing surface or heat gaining surface, and the interior being formed with a semi-partitioned flowpath structure at single side.

Figure 27:
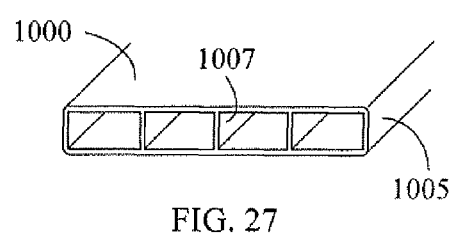
FIG. 27 is a cross sectional view showing a rectangular pipeline structure made of a heat conductive material, wherein the exterior is formed as a planar thermal energy transmitting surface (1000) for serving as the heat releasing surface or heat gaining surface, and the interior is formed with a partitioned flowpath structure.

FIG. 27 is a cross sectional view showing a rectangular pipeline structure made of a heat conductive material, wherein the exterior being formed as a planar thermal energy transmitting surface (1000) for serving as the heat releasing surface or heat gaining surface, and the interior being formed with a partitioned flowpath structure.

The rectangular pipeline structure having the planar thermal energy transmitting surface (1000) at the exterior for serving as the heat releasing surface or the heat gaining surface and having the partitioned flowpath structure at interior includes being configured integrally, or configured by two or more than two rectangular pipelines jointly constituted.

In the embodiments shown from FIG. 24 to FIG. 27, when being covered by the heat insulation member (109), the locations where the heat insulation member (109) covers includes the three surfaces, except for the surface serving as the thermal energy transmitting surface of the rectangular pipeline, the heat insulation member (109) can further be used to cover the back side of the surface opposite to the thermal energy transmitting surface, or to cover both of the back side of the surface opposite to the thermal energy transmitting surface and the two lateral sides, so the two lateral sides of the rectangular pipeline can serve as the thermal energy transmitting surfaces.

Figure 28:
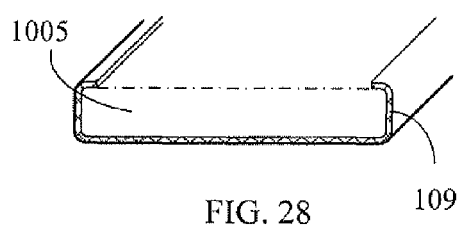
FIG. 28 is a cross sectional view showing the heat insulation member (109) covering the bottom and two lateral sides of the planar thermal energy transmitting surface (1000) of the rectangular pipeline structure shown from FIG. 21 to FIG. 24.

FIG. 28 is a cross sectional view showing the heat insulation member (109) covering the bottom and two lateral sides of the planar thermal energy transmitting surface (1000) of the rectangular pipeline structure shown from FIG. 21 to FIG. 24.

As shown in FIG. 28, in the closed-loop temperature equalization device having heat releasing device structured by multiple flowpaths, the rectangular pipeline can be further covered by the heat insulation member (109) at the exterior of the surface opposite to the thermal energy transmitting surface of the rectangular pipeline and also at two lateral sides of the rectangular pipeline.

Figure 29:
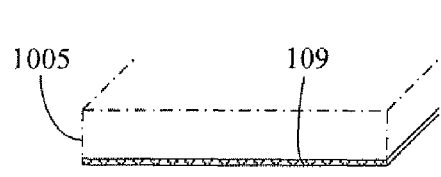
FIG. 29 is a cross sectional view showing the heat insulation member (109) covering the back side of the surface opposite to the planar thermal energy conductive surface (1000) of the rectangular pipeline structure shown from FIG. 21 to FIG. 24.

FIG. 29 is a cross sectional view showing the heat insulation member (109) covering the back side of the surface opposite to the planar thermal energy conductive surface (1000) of the rectangular pipeline structure shown from FIG. 21 to FIG. 24.

As shown in FIG. 29, in the closed-loop temperature equalization device having heat releasing device structured by multiple flowpaths, the rectangular pipeline is further covered by the heat insulation member (109) at the back side of the surface opposite to the thermal energy transmitting surface of the rectangular pipeline, so the two lateral sides of the rectangular pipeline are enabled to serve as the thermal energy transmitting surfaces.

Figure 30:
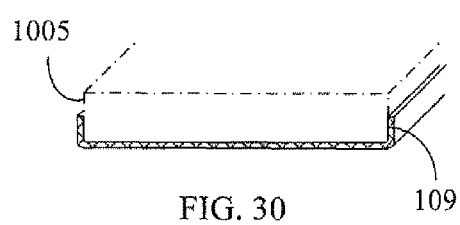
FIG. 30 is a cross sectional view showing the heat insulation member (109) covering the back side of the surface opposite to the planar thermal energy conductive surface (1000) as well as a part of the two lateral sides of the rectangular pipeline structure shown from FIG. 21 to FIG. 24.

FIG. 30 is a cross sectional view showing the heat insulation member (109) covering the back side of the surface opposite to the planar thermal energy conductive surface (1000) as well as a part of the two lateral sides of the rectangular pipeline structure shown from FIG. 21 to FIG. 24.

As shown in FIG. 30, in the closed-loop temperature equalization device having heat releasing device structured by multiple flowpaths, the rectangular pipeline is further covered by the heat insulation member (109) at the back side of the surface opposite to the thermal energy transmitting surface of the rectangular pipeline and at a part of the two lateral sides of the rectangular pipeline, so a part of the two lateral sides of the rectangular pipeline are enabled to serve as the thermal energy transmitting surfaces.

In the embodiments shown from FIG. 24 to FIG. 30, the heat gaining surface or the heat releasing surface providing the thermal energy transmitting function is not only in the structure of the planar thermal energy transmitting surface (1000), a wave-shaped thermal energy transmitting surface (1001) structure along the transversal cross section of the fluid flowing direction can be further provided for increasing the thermal energy transmitting effect between the fluid in the pipe and the exterior.

Figure 31:
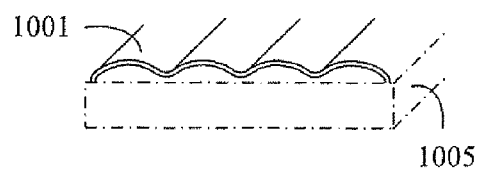
FIG. 31 is a cross sectional view showing the planar thermal energy transmitting surface (1000) further having a wave-like thermal energy transmitting surface (1001) along the transversal cross section of the fluid flowing direction.

FIG. 31 is a cross sectional view showing the planar thermal energy transmitting surface (1000) being further made in a wave-like thermal energy transmitting surface (1001) along the transversal cross section of the fluid flowing direction.

As shown in FIG. 31, according to the closed-loop temperature equalization device having heat releasing device structured by multiple flowpaths, the rectangular pipeline is configured by the wave-like thermal energy transmitting surface (1001) structure.

(IV) The round pipelines or pipeline structures having similar shapes are configured by the heat conductive material and configured by one or more of the round pipeline structures as followings: 1) the interior of round pipeline being formed as a hollow structure, 2) the interior of the round pipeline being formed with a structure wherein fin sheets radially spaced with three equal angles and extending towards the center but not in contact with each other, 3) the interior of round pipeline being formed with a structure wherein fin sheets radially spaced with three equal angles and extending towards the center for being connected with each other, 4) the interior of round pipeline being formed with a structure wherein fin sheets radially spaced with two equal angles and extending towards the center for being connected with each other, and 5) the interior of round pipeline being formed with a structure wherein fin sheets radially spaced with four equal angles and extending towards the center for being connected with each other.

Figure 32:
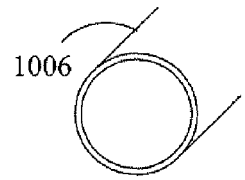
FIG. 32 is a cross sectional view showing the round pipeline structure made of a heat conductive material, wherein the pipeline is round or a similar shape and the interior is hollow.

FIG. 32 is a cross sectional view showing the round pipeline structure made of a heat conductive material, wherein the pipeline is in round or similar shapes and the interior is formed with a hollow structure.

Figure 33:
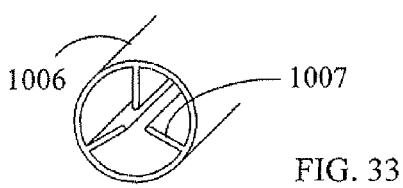
FIG. 33 is a cross sectional view showing the round pipeline structure made of a heat conductive material, wherein the pipeline is round or a similar shape and the interior is formed with a structure wherein fin sheets are radially spaced with three equal angles and extend towards the center but not in contact with each other.

FIG. 33 is a cross sectional view showing the round pipeline structure made of a heat conductive material, wherein the pipeline is in round or similar shapes and the interior is formed with a structure wherein fin sheets are radially spaced with three equal angles and extending towards the center but not in contact with each other.

Figure 34:
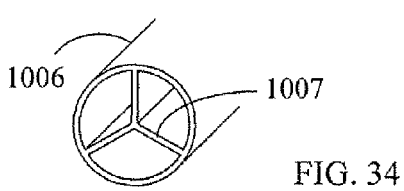
FIG. 34 is a cross sectional view showing the round pipeline structure made of a heat conductive material, wherein the pipeline is round or a similar shape and the interior is formed with a structure wherein fin sheets are radially spaced with three equal angles and extend towards the center and connect with each other.

FIG. 34 is a cross sectional view showing the round pipeline structure made of a heat conductive material, wherein the pipeline is in round or similar shapes and the interior is formed with a structure wherein fin sheets are radially spaced with three equal angles and extending towards the center for being connected with each other.

Figure 35:
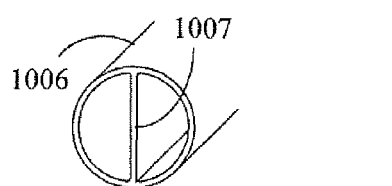
FIG. 35 is a cross sectional view showing the round pipeline structure made of a heat conductive material, wherein the pipeline is round or a similar shape and the interior is formed with a structure wherein fin sheets are radially spaced with two equal angles and extend towards the center and connect with each other.

FIG. 35 is a cross sectional view showing the round pipeline structure made of a heat conductive material, wherein the pipeline is in round or similar shapes and the interior is formed with a structure wherein fin sheets are radially spaced with two equal angles and extending towards the center for being connected with each other.

Figure 36:
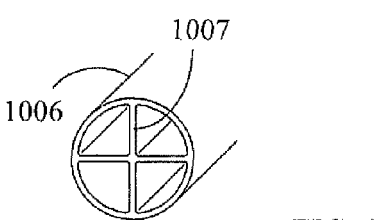
FIG. 36 is a cross sectional view showing the round pipeline structure made of a heat conductive material, wherein the pipeline is round or a similar shape and the interior is formed with a structure wherein fin sheets are radially spaced with four equal angles and extend towards the center to connect with each other.

FIG. 36 is a cross sectional view showing the round pipeline structure made of a heat conductive material, wherein the pipeline is in round or similar shapes and the interior is formed with a structure wherein fin sheets are radially spaced with four equal angles and extending towards the center for being connected with each other.

(V) The round pipelines or pipeline structures having similar shapes are configured by the heat conductive material, and the pipeline arrangement is configured by one or more of the pipeline arrangement means including: 1) multiple pipelines being up/down staggeredly separated, 2) multiple pipelines being up/down staggeredly separated and a connection structure being provided between the pipelines, 3) multiple pipelines being linearly and adjacently arranged, 4) multiple pipelines being linearly separated, 5) multiple pipelines being linearly separated and a connection structure being provided between the pipelines, and 6) the pipeline structures of said items 1)-5) are further covered with a grid or lattice structural body at the exterior to prevent from being plugged.

Figure 37:
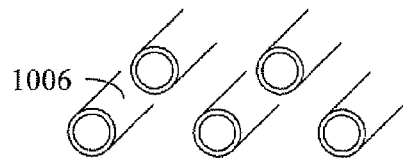
FIG. 37 is a cross sectional view showing the multiple pipeline structure made of a heat conductive material, wherein the multiple pipelines are staggeredly separated up/down.

FIG. 37 is a cross sectional view showing the multiple pipeline structure made of a heat conductive material, wherein the multiple pipelines are staggeredly separated up/down.

Figure 38:
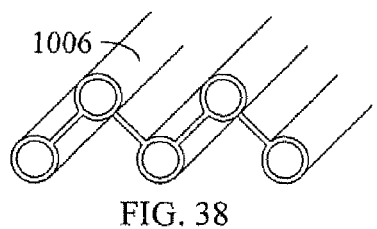
FIG. 38 is a cross sectional view showing the multiple pipeline structure made of a heat conductive material, wherein the multiple pipelines are staggeredly separated up/down and have a connection device between the pipelines.

FIG. 38 is a cross sectional view showing the multiple pipeline structure made of a heat conductive material, wherein the multiple pipelines are staggeredly separated up/down and having a connection device between the pipelines.

Figure 39:
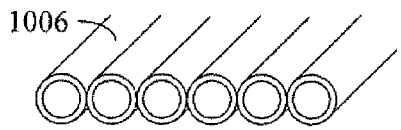
FIG. 39 is a cross sectional view showing the multiple pipeline structure made of a heat conductive material, wherein the multiple pipelines are linearly and adjacently arranged.

FIG. 39 is a cross sectional view showing the multiple pipeline structure made of a heat conductive material, wherein the multiple pipelines are linearly and adjacently arranged.

Figure 40:
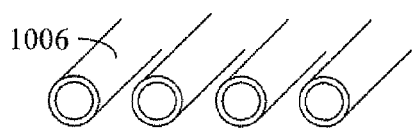
FIG. 40 is a cross sectional view showing the round pipeline structure made of a heat conductive material, wherein the multiple pipelines are linearly separated.

FIG. 40 is a cross sectional view showing the round pipeline structure made of a heat conductive material, wherein the multiple pipelines are linearly separated.

Figure 41:
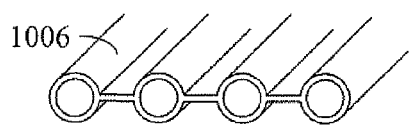
FIG. 41 is a cross sectional view showing the round pipeline structure made of a heat conductive material, wherein the multiple pipelines are linearly separated and a connection structure is provided between the pipelines.

FIG. 41 is a cross sectional view showing the round pipeline structure made of a heat conductive material, wherein the multiple pipelines are linearly separated and a connection structure is provided between the pipelines.

(VI) The round pipelines or pipeline structures having similar shapes are configured by the heat conductive material, and a part of the pipeline surface is served as a heat gaining surface or a heat releasing surface for transmitting thermal energy, and the other part of the pipeline surface is covered by the heat insulation member (109), and the pipeline arrangement is configured by one or more of the pipeline arrangement means including: 1) formed with a single pipeline structure and a part of the pipeline surface being covered by the heat insulation member (109), 2) multiple pipelines being up/down staggeredly separated and a part of the pipeline surface being covered by the heat insulation member (109), 3) multiple pipelines being up/down staggeredly separated and a connection structure being provided between the pipelines and a part of the pipeline surface being covered by the heat insulation member (109), 4) multiple pipelines being linearly and adjacently arranged and a part of the pipeline surface being covered by the heat insulation member (109), 5) multiple pipelines being linearly separated and a part of the pipeline surface being covered by the heat insulation member (109), 6) multiple pipelines being linearly separated and a connection structure being provided between the pipelines and a part of the pipeline surface being covered by the heat insulation member (109), and 7) the pipeline structures of said items 1)-6) are further covered with a grid or lattice structural body at the exterior to prevent from being plugged.

Figure 42:
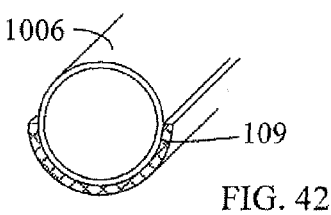
FIG. 42 is a cross sectional view showing the pipeline structure is made of a heat conductive material and a part of the pipeline surface is exposed externally and the other part is covered by the heat insulation member (109).

FIG. 42 is a cross sectional view showing the pipeline structure being made of a heat conductive material and a part of the pipeline surface being exposed externally and the other part being covered by the heat insulation member (109).

Figure 43:
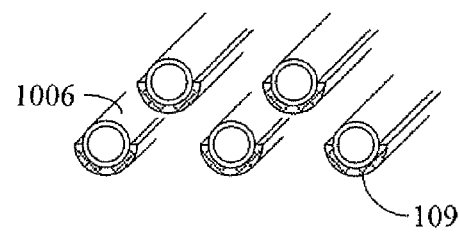
FIG. 43 is a cross sectional view showing the multiple pipeline structure made of a heat conductive material, wherein the multiple pipelines are staggeredly separated up/down, a part of each pipeline surface is exposed externally and the other part is covered by the heat insulation member (109).

FIG. 43 is a cross sectional view showing the multiple pipeline structure made of a heat conductive material, wherein the multiple pipelines are staggeredly separated up/down, a part of each pipeline surface being exposed externally and the other part being covered by the heat insulation member (109).

Figure 44:
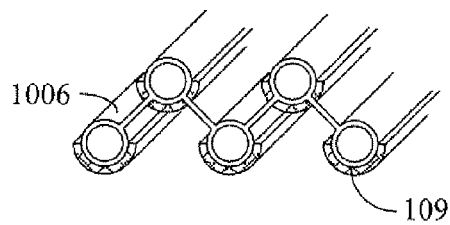
FIG. 44 is a cross sectional view showing the multiple pipeline structure made of a heat conductive material, wherein the multiple pipelines are staggeredly separated up/down and a connection structure is provided between the pipelines, a part of each pipeline surface is exposed externally and the other part is covered by the heat insulation member (109).

FIG. 44 is a cross sectional view showing the multiple pipeline structure made of a heat conductive material, wherein the multiple pipelines being staggeredly separated up/down and a connection structure being provided between the pipelines, a part of each pipeline surface being exposed externally and the other part being covered by the heat insulation member (109).

Figure 45:
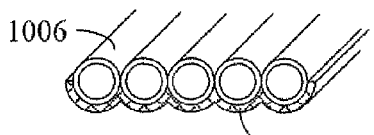
FIG. 45 is a cross sectional view showing the multiple pipeline structure made of a heat conductive material, wherein the multiple pipelines are linearly and adjacently arranged, a part of each pipeline surface being is externally and the other part is covered by the heat insulation member (109).

FIG. 45 is a cross sectional view showing the multiple pipeline structure made of a heat conductive material, wherein the multiple pipelines are linearly and adjacently arranged, a part of each pipeline surface is exposed externally and the other part is covered by the heat insulation member (109).

Figure 46:
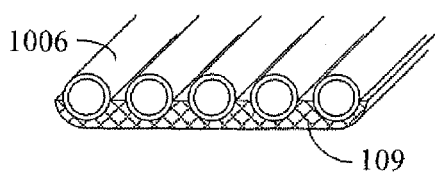
FIG. 46 is a cross sectional view showing the round pipeline structure made of a heat conductive material, wherein the multiple pipelines are linearly separated, a part of each pipeline surface is exposed externally and the other part is covered by the heat insulation member (109).

FIG. 46 is a cross sectional view showing the round pipeline structure made of a heat conductive material, wherein the multiple pipelines are linearly separated, a part of each pipeline surface is exposed externally and the other part is covered by the heat insulation member (109).

Figure 47:
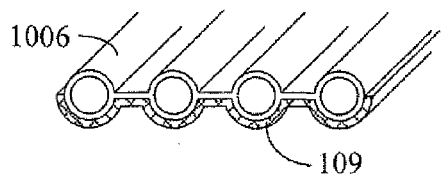
FIG. 47 is a cross sectional view showing the round pipeline structure made of a heat conductive material, wherein the multiple pipelines are linearly separated and a connection structure is provided between the pipelines, a part of each pipeline surface is exposed externally and the other part is covered by the heat insulation member (109).

FIG. 47 is a cross sectional view showing the round pipeline structure made of a heat conductive material, wherein the multiple pipelines are linearly separated and a connection structure being provided between the pipelines, a part of each pipeline surface is exposed externally and the other part is covered by the heat insulation member (109).

(VII) The round pipelines or pipeline structures having similar shapes are configured by a heat conductive material, the thermal energy transmitting surface is applied as the heat releasing surface of the heat releasing device (201) or the heat gaining surface of the heat gaining device (101), and the exterior thereof is installed with one or more of thermal conductive fin sheets (1120), and configured by one or more than one of the pipeline arrangement means including: 1) formed with a single pipeline structure, 2) multiple pipelines being up/down staggeredly separated, 3) multiple pipelines being up/down staggeredly separated and a connection structure being provided between the pipelines, 4) multiple pipelines being linearly and adjacently arranged, 5) multiple pipelines being linearly separated, 6) multiple pipelines being linearly separated and a connection structure being provided between the pipelines, and 7) the pipeline structures of said items 1)-6) are further covered with a grid or lattice structural body at the exterior to prevent from being plugged.

Figure 48:
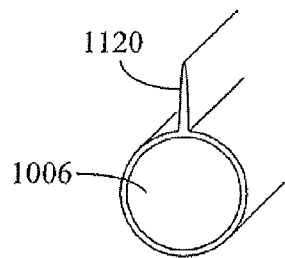
FIG. 48 is a cross sectional view showing the single pipeline structure is made of a heat conductive material and the exterior of the thermal energy transmitting surface is installed with a thermal conductive fin sheet (1120).

FIG. 48 is a cross sectional view showing the single pipeline structure being made of a heat conductive material and the exterior of the thermal energy transmitting surface being installed with a thermal conductive fin sheet (1120).

Figure 49:
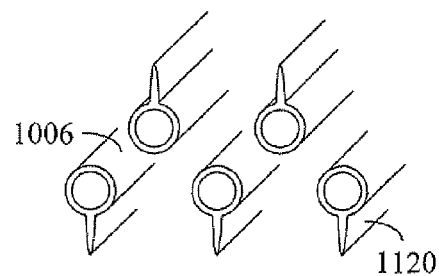
FIG. 49 is a cross sectional view showing the multiple pipeline structure made of a heat conductive material, wherein the multiple pipelines are staggeredly separated up/down and the exterior of each thermal energy transmitting surface is installed with a thermal conductive fin sheet (1120).

FIG. 49 is a cross sectional view showing the multiple pipeline structure made of a heat conductive material, wherein the multiple pipelines are staggeredly separated up/down and the exterior of each thermal energy transmitting surface is installed with a thermal conductive fin sheet (1120).

Figure 50:
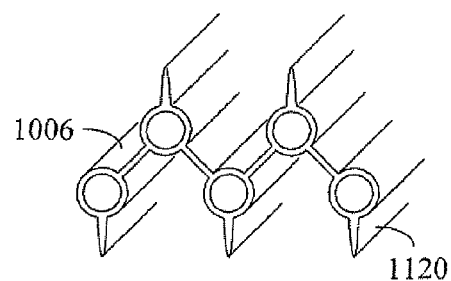
FIG. 50 is a cross sectional view showing the multiple pipeline structure made of a heat conductive material, wherein the multiple pipelines are staggeredly separated up/down and have a connection structure between each pipeline and the exterior of each thermal energy transmitting surface is installed with a thermal conductive fin sheet (1120).

FIG. 50 is a cross sectional view showing the multiple pipeline structure made of a heat conductive material, wherein the multiple pipelines are staggeredly separated up/down and having a connection structure between each pipeline and the exterior of each thermal energy transmitting surface being installed with a thermal conductive fin sheet (1120).

Figure 51:
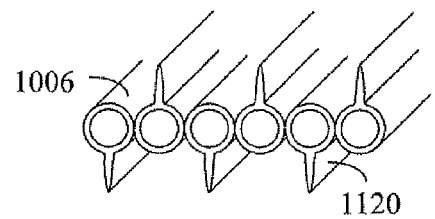
FIG. 51 is a cross sectional view showing the multiple pipeline structure made of a heat conductive material, wherein the multiple pipelines are linearly and adjacently arranged and the exterior of each thermal energy transmitting surface is installed with a thermal conductive fin sheet (1120).

FIG. 51 is a cross sectional view showing the multiple pipeline structure made of a heat conductive material, wherein the multiple pipelines are linearly and adjacently arranged and the exterior of each thermal energy transmitting surface is installed with a thermal conductive fin sheet (1120).

Figure 52:
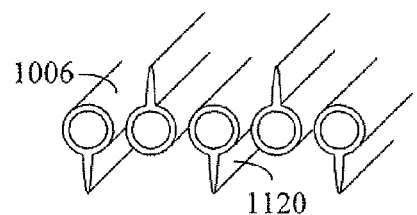
FIG. 52 is a cross sectional view showing the round pipeline structure made of a heat conductive material, wherein the multiple pipelines are linearly separated and the exterior of each thermal energy transmitting surface is installed with a thermal conductive fin sheet (1120).

FIG. 52 is a cross sectional view showing the round pipeline structure made of a heat conductive material, wherein the multiple pipelines are linearly separated and the exterior of each thermal energy transmitting surface is installed with a thermal conductive fin sheet (1120).

Figure 53:
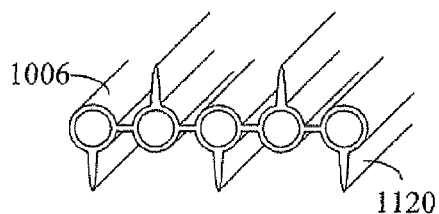
FIG. 53 is a cross sectional view showing the round pipeline structure made of a heat conductive material, wherein the multiple pipelines are linearly separated and a connection structure is provided between each pipeline and the exterior of each thermal energy transmitting surface being installed with a thermal conductive fin sheet (1120).

FIG. 53 is a cross sectional view showing the round pipeline structure made of a heat conductive material, wherein the multiple pipelines are linearly separated and a connection structure is provided between each pipeline and the exterior of each thermal energy transmitting surface is installed with a thermal conductive fin sheet (1120).

(VIII) The rectangular pipelines or pipeline structures having similar shapes are configured by the heat conductive material, and the thermal energy transmitting surface is applied as the heat releasing surface of the heat releasing device (201) or the heat gaining surface of the heat gaining device (101), one side or more than one sides of the exterior are installed with one or more than one thermal conductive fin sheets (1120), and the interior is configured by one or more than one of the following pipeline arrangement means including: 1) formed as a hollow structure, 2) formed with a staggered semi-partitioned flowpath structure, 3) formed with a staggered semi-partitioned flowpath structure at single side, 4) formed with a partitioned flowpath structure, and 5) the pipeline structures of said items 1)-4) are further covered with a grid or lattice structural body at the exterior to prevent from being plugged.

Figure 54:
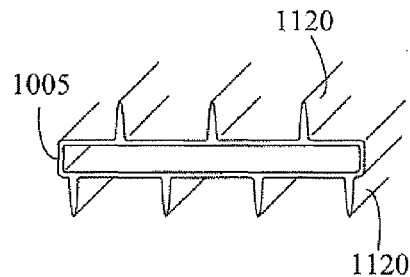
FIG. 54 is a cross sectional view of a rectangular pipeline made of a heat conductive material, wherein the exterior of the thermal energy transmitting surface is installed with thermal conductive fin sheets (1120) and the interior thereof is hollow.

FIG. 54 is a cross sectional view of a rectangular pipeline made of a heat conductive material, wherein the exterior of the thermal energy transmitting surface is installed with thermal conductive fin sheets (1120) and the interior thereof is hollow.

Figure 55:
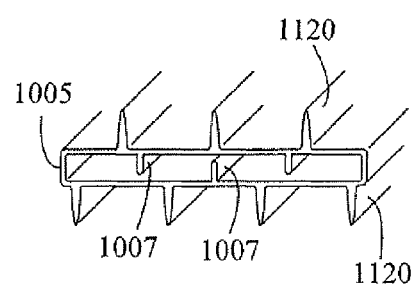
FIG. 55 is a cross sectional view of a rectangular pipeline made of a heat conductive material, wherein the exterior of the thermal energy transmitting surface is installed with thermal conductive fin sheets (1120) and the interior thereof is formed with a staggered semi-partitioned flowpath structure.

FIG. 55 is a cross sectional view of a rectangular pipeline made of a heat conductive material, wherein the exterior of the thermal energy transmitting surface is installed with thermal conductive fin sheets (1120) and the interior thereof is formed with a staggered semi-partitioned flowpath structure.

Figure 56:
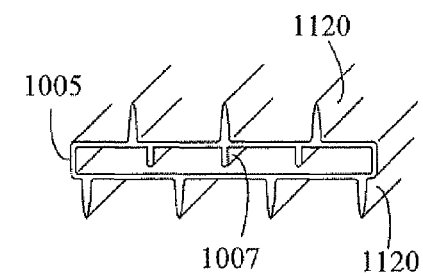
FIG. 56 is a cross sectional view of a rectangular pipeline made of a heat conductive material, wherein the exterior of the thermal energy transmitting surface is installed with thermal conductive fin sheets (1120) and the interior thereof is formed with a semi-partitioned flowpath structure at single side.

FIG. 56 is a cross sectional view of a rectangular pipeline made of a heat conductive material, wherein the exterior of the thermal energy transmitting surface is installed with thermal conductive fin sheets (1120) and the interior thereof is formed with a semi-partitioned flowpath structure at single side.

Figure 57:
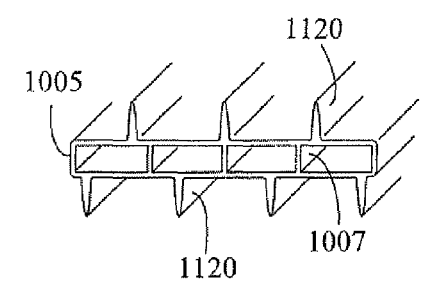
FIG. 57 is a cross sectional view of a rectangular pipeline made of a heat conductive material, wherein the exterior of the thermal energy transmitting surface is installed with thermal conductive fin sheets (1120) and the interior thereof is formed with a partitioned flowpath structure.

FIG. 57 is a cross sectional view of a rectangular pipeline made of a heat conductive material, wherein the exterior of the thermal energy transmitting surface is installed with thermal conductive fin sheets (1120) and the interior thereof is formed with a partitioned flowpath structure.

The rectangular pipeline structure having the thermal conductive fin sheets (1120) at the exterior and having the partitioned flowpath structure at the interior includes being configured integrally, or configured by two or more than two rectangular pipelines jointly constituted.

(IX) The W-shaped pipelines or pipeline structures having similar shapes are formed with outward-bended wave-shaped thermal energy transmitting surfaces serving as heat releasing surfaces or heat gaining surfaces at the wider top and bottom surfaces thereof, and configured by a heat conductive material, and the interior is configured by one or more of the following pipeline arrangements including: 1) formed as a hollow structure, 2) formed with a staggered semi-partitioned flowpath structure, 3) formed with a staggered semi-partitioned flowpath structure at single side, 4) formed with a partitioned flowpath structure, and 5) the pipeline structures of said item 1)-5) are further covered with a grid or lattice structural body at the exterior to prevent from being plugged.

Figure 58:
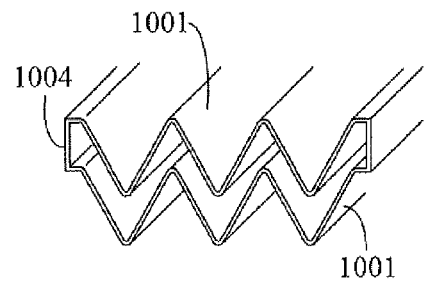
FIG. 58 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces, and the interior thereof is hollow.

FIG. 58 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a hollow structure.

Figure 59:
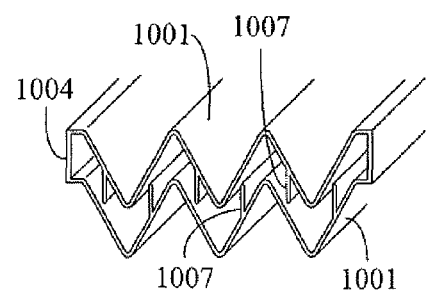
FIG. 59 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces, and the interior thereof is formed with a staggered semi-partitioned flowpath structure.

FIG. 59 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure.

Figure 60:
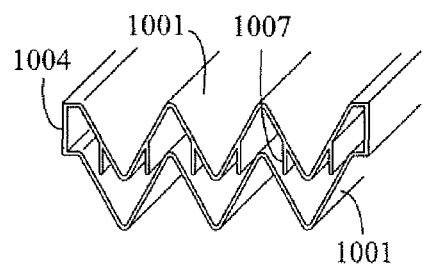
FIG. 60 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces, and the interior thereof is formed with a staggered semi-partitioned flowpath structure at single side.

FIG. 60 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a staggered semi-partitioned flowpath structure at single side.

Figure 61:
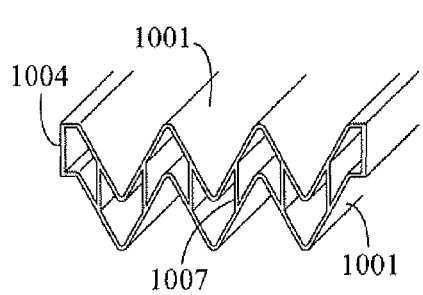
FIG. 61 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces, and the interior thereof is formed with a partitioned flowpath structure.

FIG. 61 is a cross sectional view of a W-shaped pipeline made of a heat conductive material, wherein the wider top and bottom surfaces are formed with wave-shaped thermal energy transmitting surfaces serving as heat releasing surfaces or heat gaining surfaces and the interior thereof is formed with a partitioned flowpath structure.

The w-shaped pipeline structure wherein the wider top and bottom surfaces being formed with wave-shaped thermal energy transmitting surfaces serve as heat releasing surfaces or heat gaining surfaces and the interior thereof being formed with a partitioned flowpath structure and includes being configured integrally, or configured by two or more than two w-shaped pipelines jointly constituted The embodiments for illustrating each pipeline structure as shown from FIG. 16 to FIG. 61 serve as examples of the closed-loop temperature equalization device having a heat releasing device structured by multiple flowpaths, and the scope of the present invention shall not be limited thereby.

Figure 62:
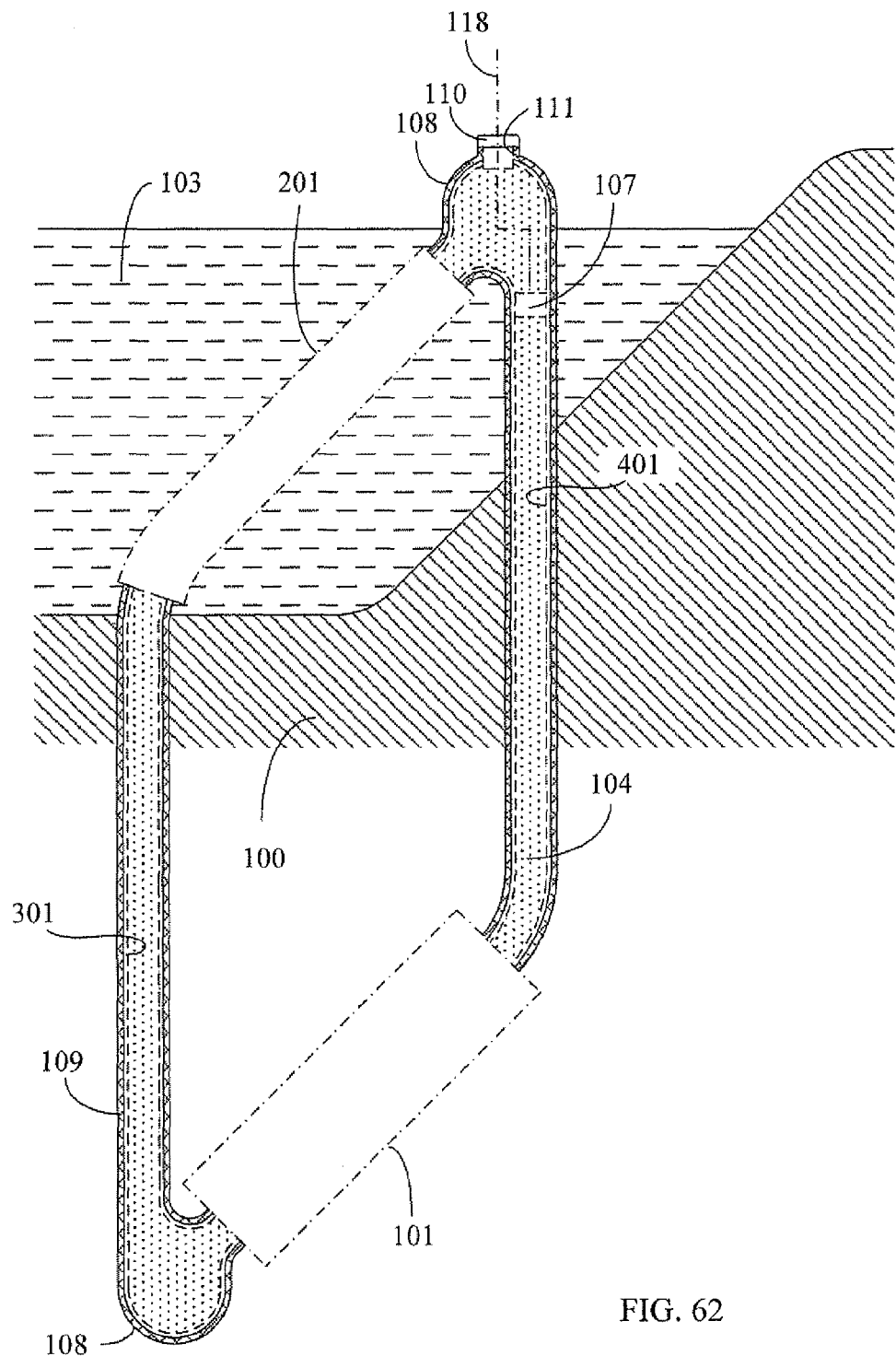
FIG. 62 is a schematic view showing the first example of the applied structure and installation means, according to the preset invention.

In the closed-loop temperature equalization device having a heat releasing device structured by multiple flowpaths, the geometric shape of the applied structure configured by the heat gaining device (101), the heat releasing device (201), the pipeline structure (301) and the pipeline structure (401), and the means for being installed in a natural thermal energy body and the means for releasing heat to the exterior are illustrated as follows:

FIG. 62 is a schematic view showing the first example of the applied structure and installation means, according to the preset invention.

As shown in FIG. 62, in the closed-loop temperature equalization device having a heat releasing device structured by multiple flowpaths, the heat gaining device (101) is buried under the natural heat storage body (100), and the heat releasing device (201) is disposed in the water, wherein the heat releasing surface of the heat releasing device (201) releases the thermal energy to the external gaseous or liquid fluid in the omni-direction or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 63:
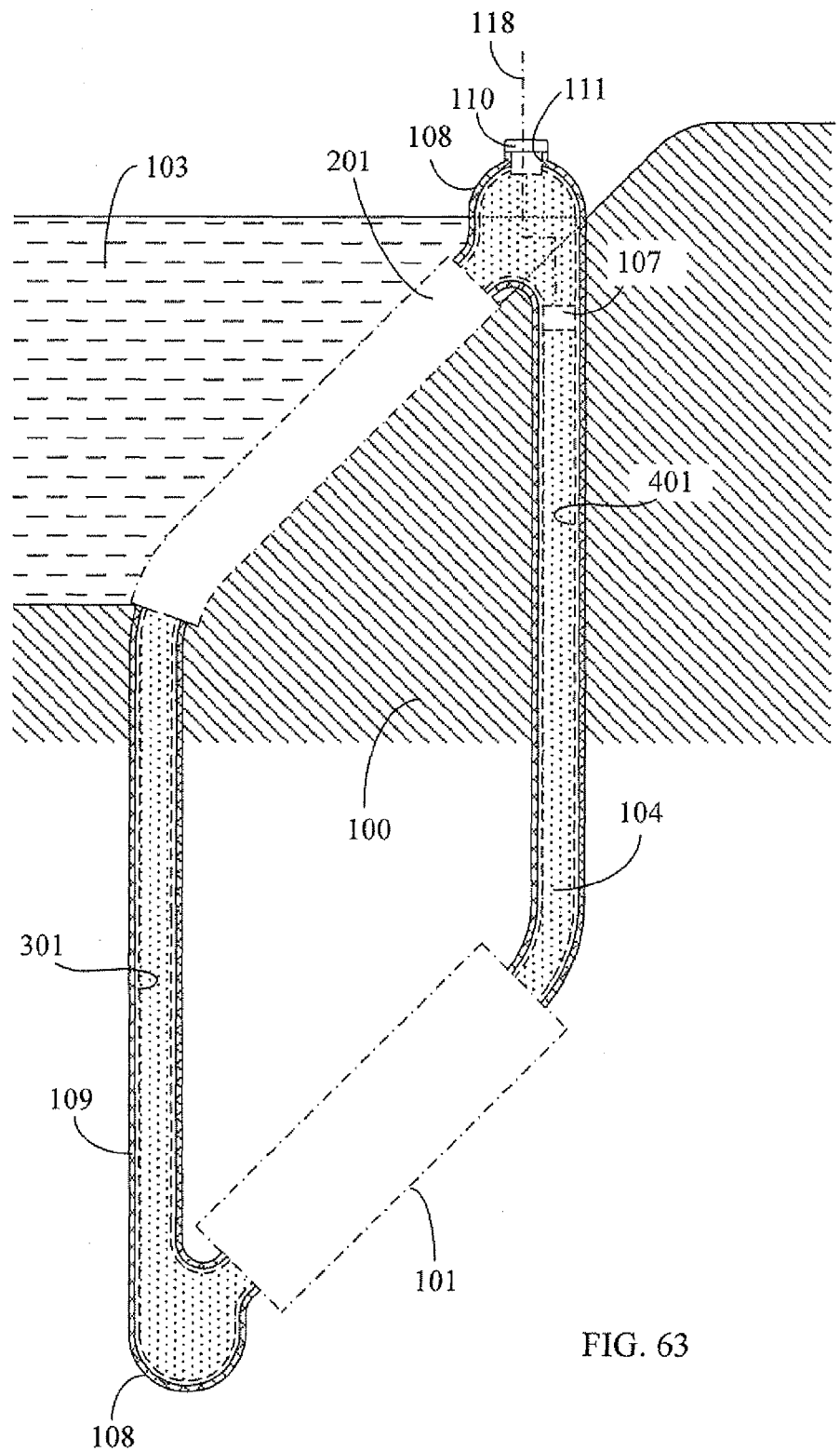
FIG. 63 is a schematic view showing the second example of the applied structure and installation means, according to the preset invention.

FIG. 63 is a schematic view showing the second example of the applied structure and installation means, according to the preset invention.

As shown in FIG. 63, in the closed-loop temperature equalization device having a heat releasing device structured by multiple flowpaths, the heat gaining device (101) is buried under the natural heat storage body (100), and the heat releasing device (201) is installed adjacent to the shore, wherein the heat releasing surface of the heat releasing device (201) releases the thermal energy to the exterior in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 64:
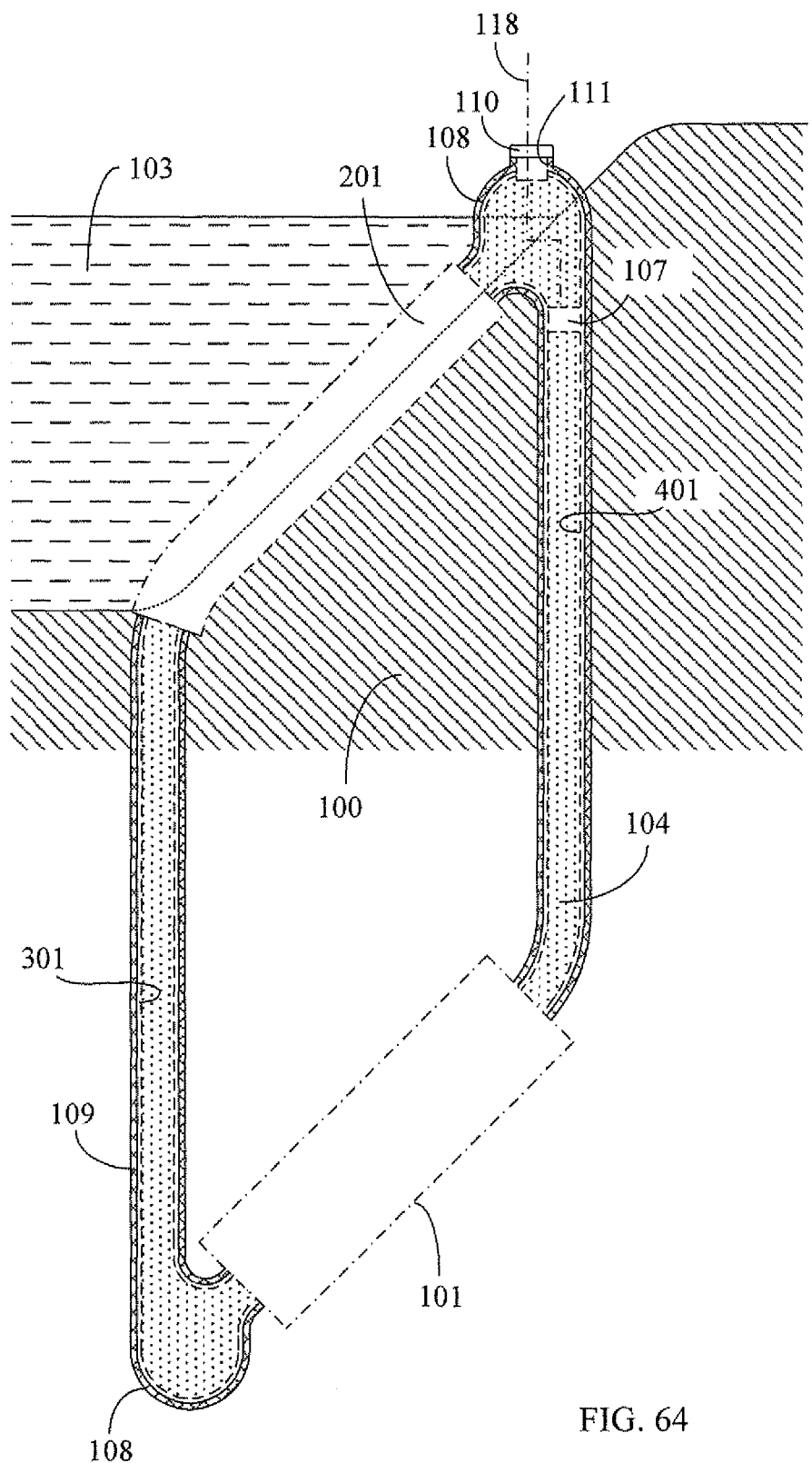
FIG. 64 is a schematic view showing the third example of the applied structures and installation means, according to the preset invention.

FIG. 64 is a schematic view showing the third example of the applied structures and installation means, according to the preset invention.

As shown in FIG. 64, in the closed-loop temperature equalization device having a heat releasing device structured by multiple flowpaths, the heat gaining device (101) is buried under the natural heat storage body (100), and the heat releasing device (201) is partially embedded in the shore, wherein the heat releasing surface of the heat releasing device (201) releases the thermal energy to the external gaseous or liquid fluid in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 65:
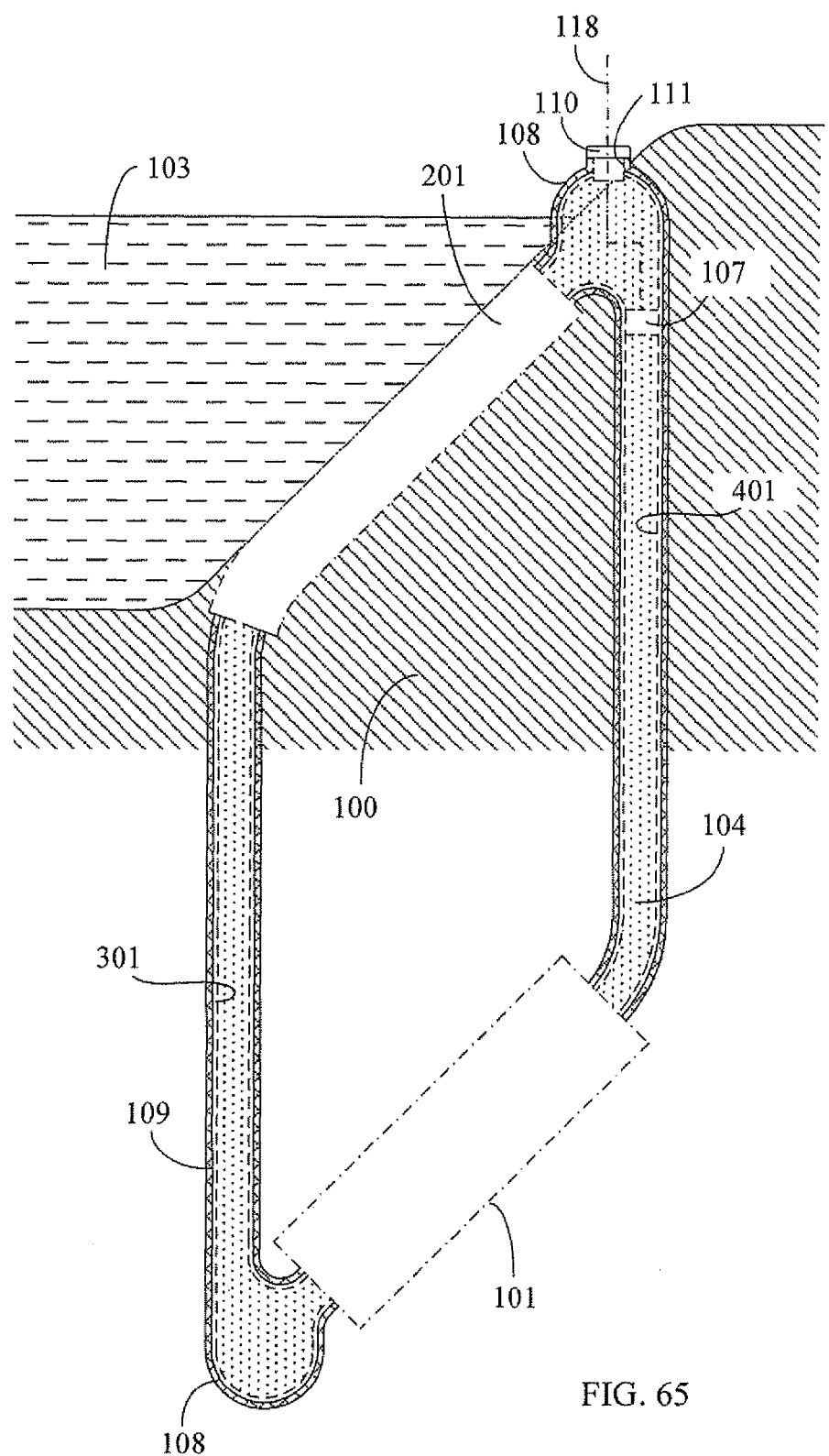
FIG. 65 is a schematic view showing the fourth example of the applied structure and installation means, according to the preset invention.

FIG. 65 is a schematic view showing the fourth example of the applied structure and installation means, according to the preset invention.

As shown in FIG. 65, in the closed-loop temperature equalization device having a heat releasing device structured by multiple flowpaths, the heat gaining device (101) is buried under the natural heat storage body (100), and the heat releasing device (201) is embedded in the shore, wherein the heat releasing surface of the heat releasing device (201) releases the thermal energy to the external gaseous or liquid fluid in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 66:
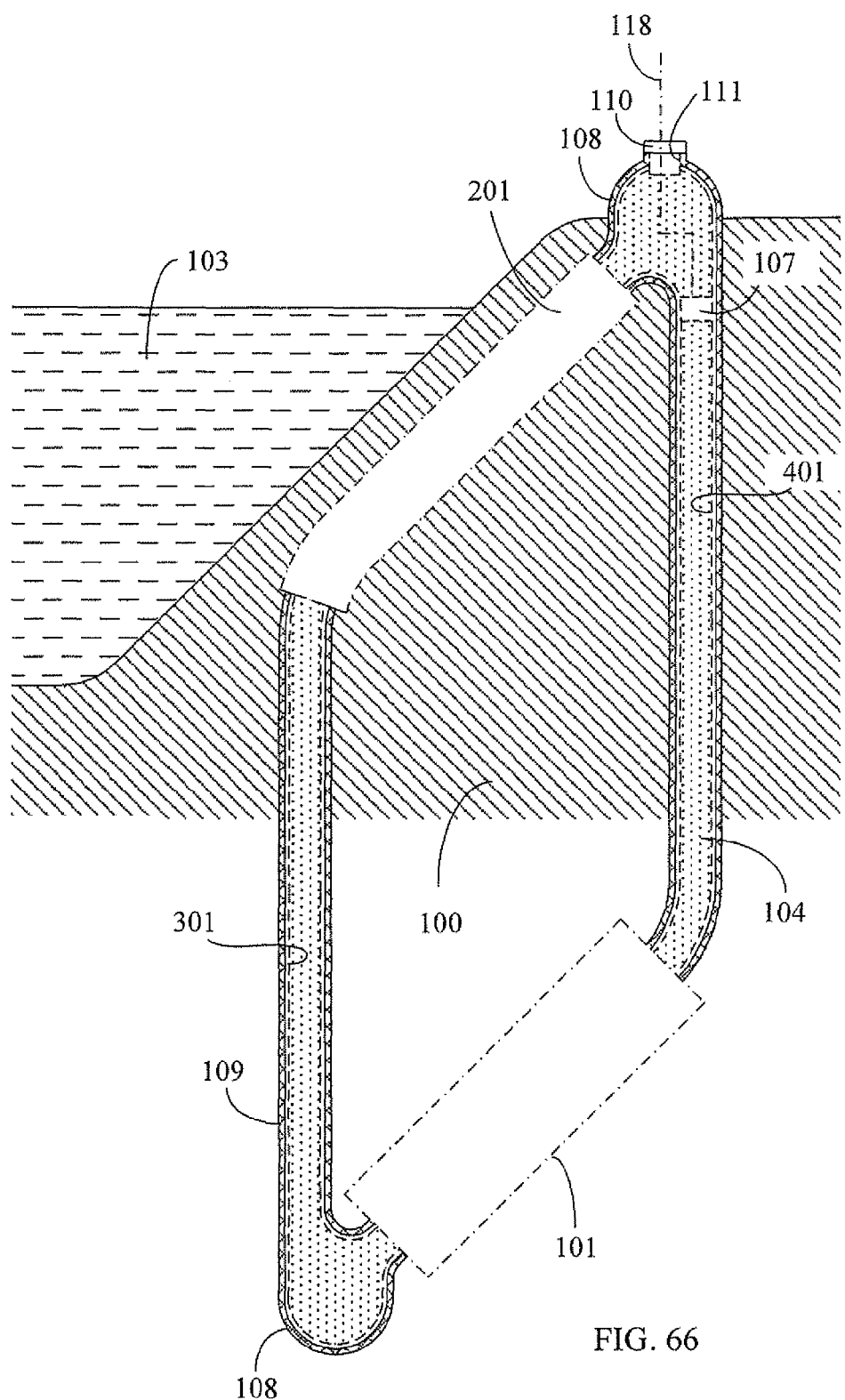
FIG. 66 is a schematic view showing the fifth example of the applied structure and installation means, according to the preset invention.

FIG. 66 is a schematic view showing the fifth example of the applied structure and installation means, according to the preset invention.

As shown in FIG. 66, in the closed-loop temperature equalization device having a heat releasing device structured by multiple flowpaths, the heat gaining device (101) is buried under the natural heat storage body (100), and the heat releasing device (201) is embedded in the shore, wherein the heat releasing surface of the heat releasing device (201) releases the thermal energy to the external stratum in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 67:
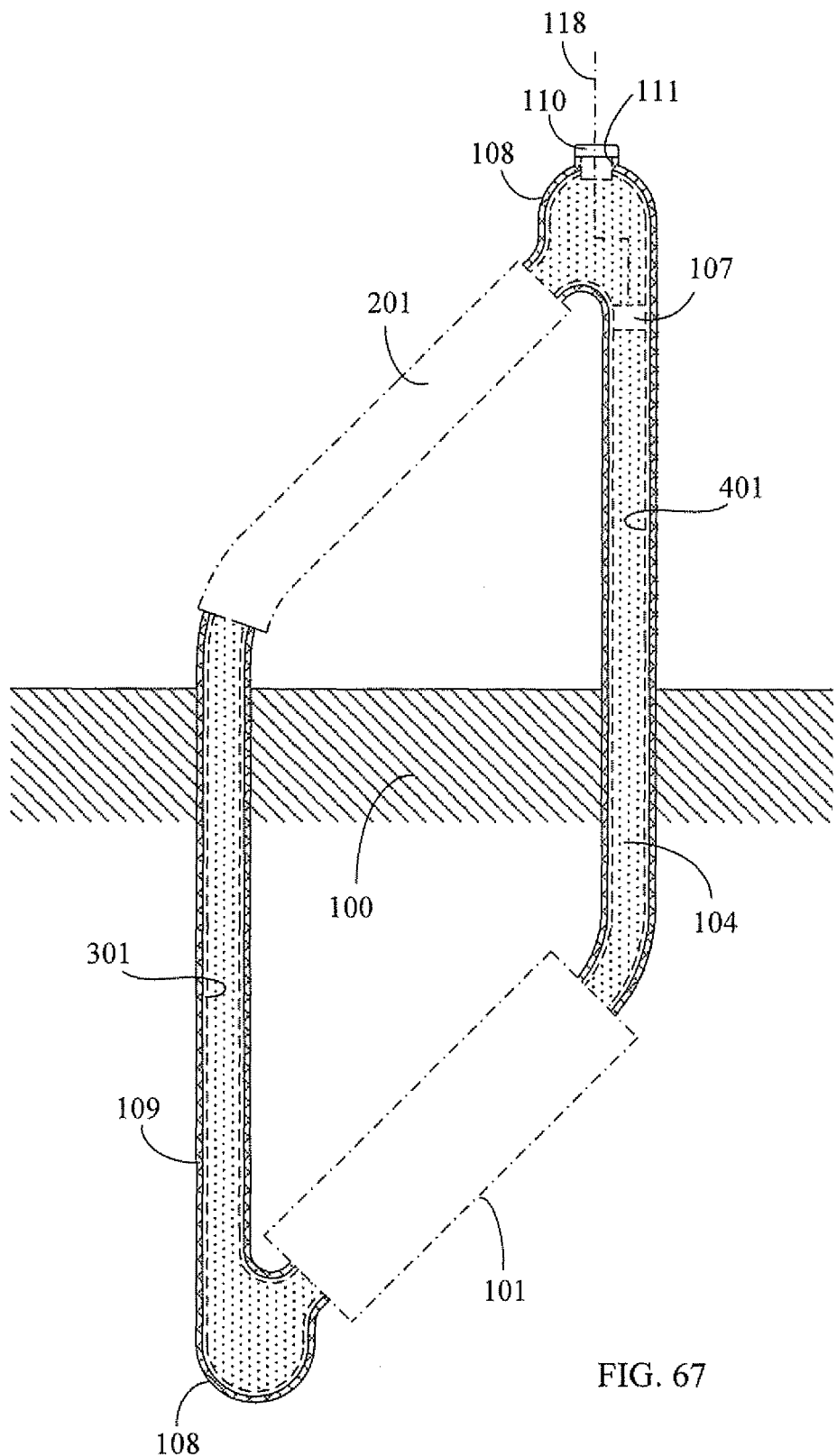
FIG. 67 is a schematic view showing the sixth example of the applied structure and installation means, according to the preset invention.

FIG. 67 is a schematic view showing the sixth example of the applied structure and installation means, according to the preset invention.

As shown in FIG. 67, in the closed-loop temperature equalization device having a heat releasing device structured by multiple flowpaths, the heat gaining device (101) is buried under the natural heat storage body (100), and the heat releasing device (201) is exposed at the top, wherein the heat releasing surface of the heat releasing device (201) releases the thermal energy to the external gaseous or liquid fluid in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 68:
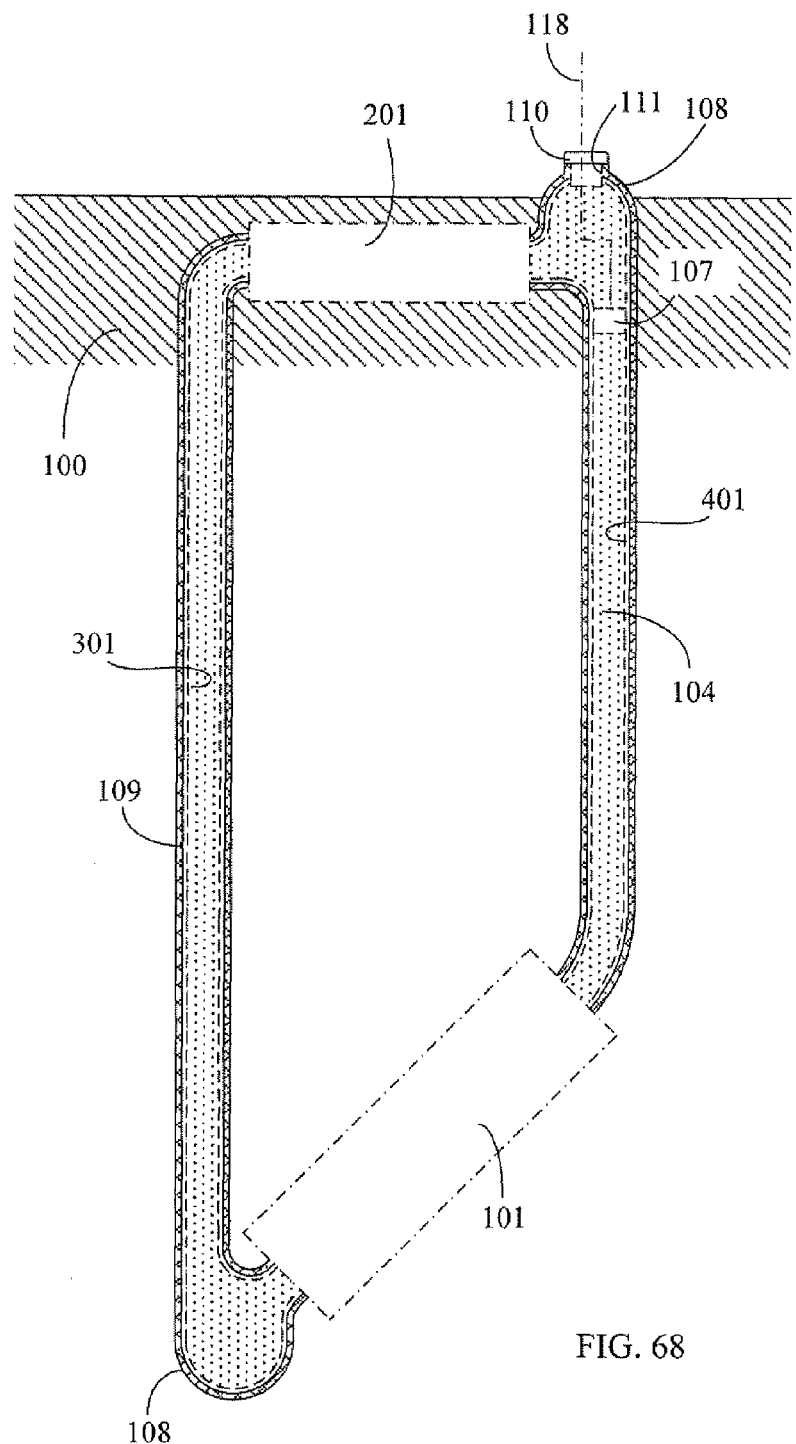
FIG. 68 is a schematic view showing the seventh example of the applied structure and installation means, according to the preset invention.

FIG. 68 is a schematic view showing the seventh example of the applied structure and installation means, according to the preset invention.

As shown in FIG. 68, in the closed-loop temperature equalization device having heat releasing device structured by multiple flowpaths, the heat gaining device (101) is inclined disposed and buried under the natural heat storage body (100), and the heat releasing device (201) is horizontally extended for being installed in the ground or exposed outside the ground or partially exposed outside the ground, wherein the heat releasing surface of the heat releasing device (201) releases the thermal energy to the exterior in multiple directions or in a selected direction, and the closed-type flowpath is configured through the pipeline structure (301) and the pipeline structure (401) for allowing the heat exchange fluid (104) to flow in a closed and circulative means. The auxiliary fluid pump (107) and the auxiliary heating/cooling device (115) can be optionally installed according to actual needs.

Figure 69:
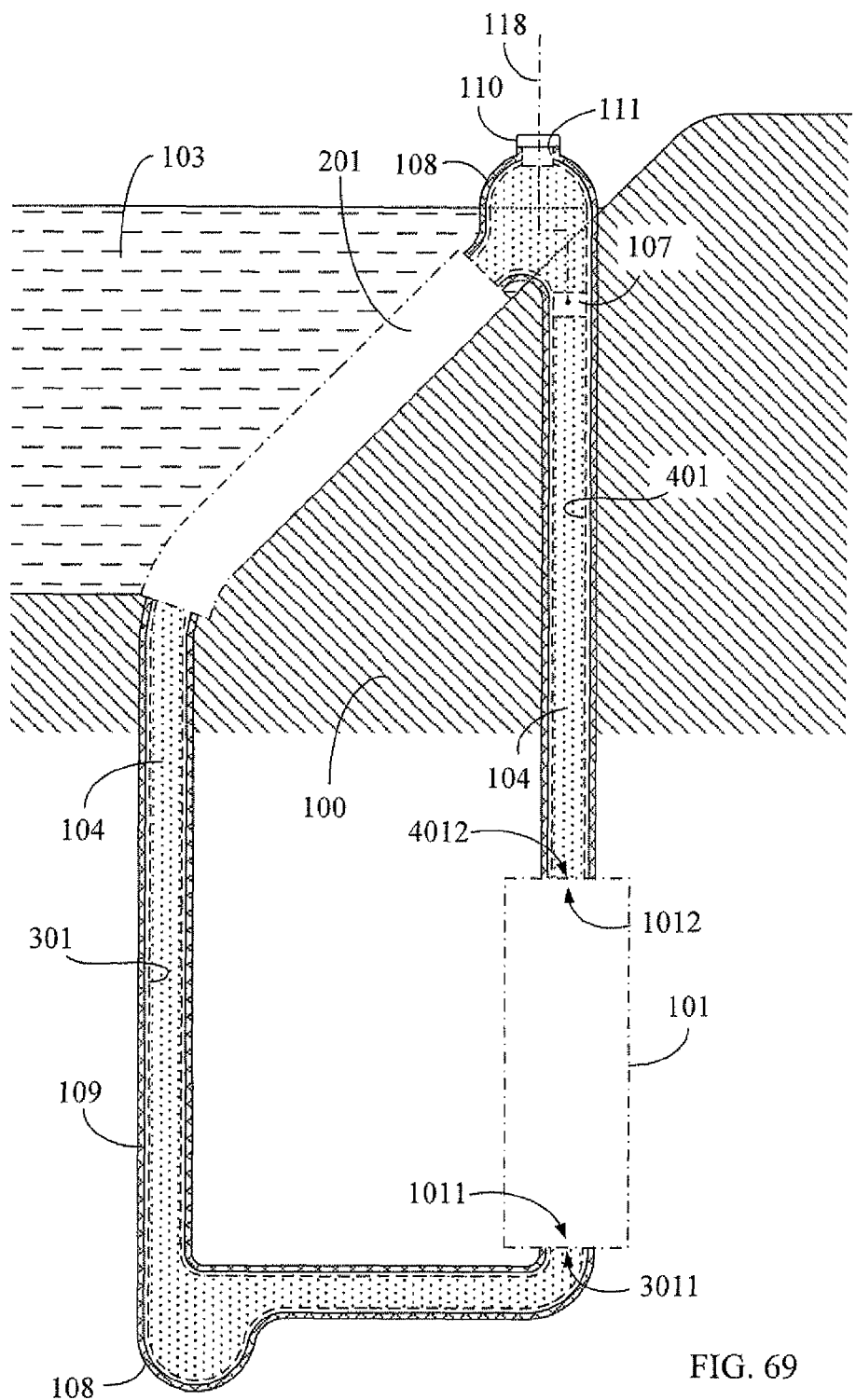
FIG. 69 is a schematic view showing the eighth example of the applied structure and installation means, according to the preset invention.

FIG. 69 is a schematic view showing the eighth example of the applied structure and installation means, according to the preset invention.

As shown in FIG. 69, in the closed-loop temperature equalization device having a heat releasing device structured by multiple flowpaths, the heat gaining device (101) is vertically disposed and buried under the natural heat storage body (100), and the heat releasing device (201) is installed in the ground or exposed outside the ground or partially exposed outside the ground. The heat gaining device (101) and the heat releasing device (201) communicate through the vertical pipeline structure (401), the heat releasing device (201) releases the thermal energy to the external gaseous or liquid fluid in multiple directions or in a selected direction, and passes the upward fluid inlet/outlet port (3011) of the L-shaped pipeline structure (301) provided with the outward-expanding arc-shaped fluid chamber (108) at the bottom turning location, then passes the fluid inlet/outlet port (1011) at the bottom of the heat gaining device (101), then passes to the fluid inlet/outlet port (4012) of the pipeline structure (401) through the fluid inlet/outlet port (1012) at the top of the heat gaining device (101), and passes through the pipeline structure (401) for configuring the closed-type flowpath. This allows the heat exchange fluid (104) to flow in a closed and circulative means. The auxiliary fluid pump (107) and the auxiliary heating/cooling device (115) can be optionally installed according to actual needs.

Figure 70:
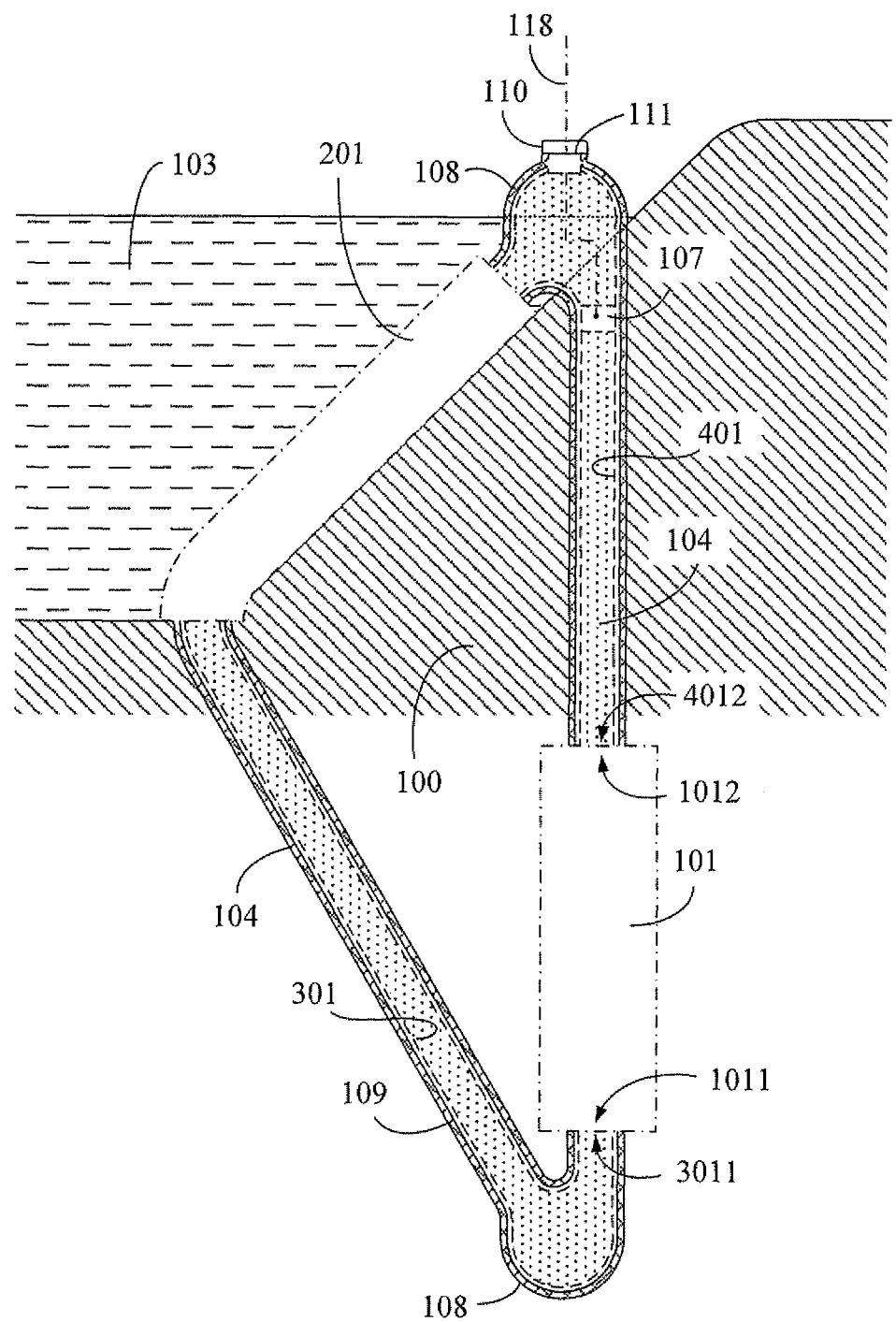
FIG. 70 is a schematic view showing the ninth example of the applied structure and installation means, according to the preset invention.

FIG. 70 is a schematic view showing the ninth example of the applied structure and installation means, according to the preset invention.

As shown in FIG. 70, in the closed-loop temperature equalization device having a heat releasing device structured by multiple flowpaths, the heat gaining device (101) is vertically disposed and buried under the natural heat storage body (100), and the heat releasing device (201) is installed in the ground or exposed outside the ground or partially exposed outside the ground. The heat gaining device (101) and the heat releasing device (201) communicate through the vertical pipeline structure (401). The heat releasing device (201) releases the thermal energy to the external gaseous or liquid fluid in multiple directions or in a selected direction, and downwardly extends to the fluid inlet/outlet port (3011) of the outward-expanding arc-shaped fluid chamber (108) installed at the bottom of the heat gaining device (101) through the inclined pipeline structure (301), then passes the fluid inlet/outlet port (1011) at the bottom of the heat gaining device (101), then is leaded to the fluid inlet/outlet port (4012) of the pipeline structure (401) through the fluid inlet/outlet port (1012) at the top of the heat gaining device (101), and passes through the pipeline structure (401) for configuring the closed-type flowpath which allows the heat exchange fluid (104) to flow in a closed and circulative means. The auxiliary fluid pump (107) and the auxiliary heating/cooling device (115) can be optionally installed according to actual needs.

The aforementioned applied structures and installation means for the closed-loop temperature equalization device having a heat releasing device structured by multiple flowpaths are served as examples. The present invention can be adopted and applied under various environmental conditions based on the aforementioned embodiments and related arts which can be easily understood by skilled people in the arts.

The invention claimed is:

1. A closed loop natural thermal energy releasing system with partial return of a heat exchange fluid (104) and including multiple flowpaths, comprising:
    a heat gaining device (101) installed within a natural thermal energy storage body (100) and arranged to transfer heat between the natural thermal energy storage body (100) and the heat exchange fluid (104) flowing through the heat gaining device (101), wherein said heat gaining device (101) is inclined or vertical and includes a first fluid inlet/outlet port (1011) that is lower than a second fluid inlet/outlet port (1012);
    a heat releasing device (201) in contact with a temperature differentiation body (103) and arranged to transfer heat between the heat exchange fluid (104) and the temperature differentiation body (103);
    a first pipeline structure (301) connected to the first fluid inlet/outlet port (1011) of the heat gaining device (101) and a first fluid inlet/outlet port (2012) of the heat releasing device (201) for carrying a part of the heat exchange fluid (104) from the heat gaining device (101) to the heat releasing device (201);
    a second pipeline structure (401) connected to the second fluid inlet/outlet port (1012) of the heat gaining device (101) and a second fluid inlet/outlet port (2011) of the heat releasing device (201) for carrying the heat exchange fluid (104) between the heat gaining device (101) and the heat releasing device (201);
    and an auxiliary fluid pump (107) located in the circulation flowpath for selectively pumping the heat exchange fluid (104) in a normal flow direction or a reverse flow direction.

2. The closed loop natural thermal energy releasing system as claimed in claim 1, wherein said heat releasing device (201) is inclined such that the first fluid inlet/outlet port (2012) of the heat releasing device (201) is lower than the second fluid inlet/outlet port (2011) of the heat releasing device (201).

3. The closed loop natural thermal energy releasing system as claimed in claim 1, wherein said heat releasing device (201) extends horizontally.

4. The closed loop natural thermal energy releasing system as claimed in claim 1, further comprising an outward-expanding arc-shaped fluid chamber (108) located at an upper end of a top corner of the closed loop system for storing a part of the heat exchange fluid (104) and moderating the flow speed of the heat exchange fluid (104) having thermal energy so as to reduce the flow damping of the closed loop flowpath of the heat exchange fluid (104) thereby facilitating flow circulation of the fluid.

5. The closed loop natural thermal energy releasing system as claimed in claim 4, wherein the outward-expanding arc-shaped fluid chamber (108) disposed at the upper end of the top corner of the closed loop system further comprises a top cover (112), a hinge (113), and a sealing ring (114) for providing access to the pipeline structures.

6. The closed loop natural thermal energy releasing system as claimed in claim 5, further comprising a sealing plug (110)

and an operation port (111) located at the upper end of the top cover (112) for allowing the fluid to be filled in or sucked out and allowing observation and maintenance to be performed.

7. The closed loop natural thermal energy releasing system as claimed in claim 1, further comprising an outward-expanding arc-shaped fluid chamber (108) located at a lower end of a bottom corner of the closed loop system for storing a part of the heat exchange fluid (104) and moderating the flow speed of the heat exchange fluid (104) having thermal energy so as to reduce the flow damping of the closed loop flowpath of the heat exchange fluid (104) thereby facilitating flow circulation of the fluid.

8. The closed loop natural thermal energy releasing system as claimed in claim 1, further comprising an outward-expanding arc-shaped fluid chamber (108) located at one or more corners of the closed loop system for storing a part of the heat exchange fluid (104) and moderating the flow speed of the heat exchange fluid (104) having thermal energy so as to reduce the flow damping of the closed loop flowpath of the heat exchange fluid (104) thereby facilitating flow circulation of the fluid.

9. The closed loop natural thermal energy releasing system as claimed in claim 8, wherein, although thermal energy transmitted to the heat exchange fluid (104) through the heat gaining device (101) is transmitted towards two sides of the heat gaining device (101) through the fluid, the fluid at the side of the heat gaining device (101) where the outward-expanding arc-shaped fluid chamber (108) is installed has a higher heat capacity as a result of the larger volume of the fluid chamber (108) and therefore generates a smaller temperature difference with respect to fluid in the heat gaining device than the fluid on the other side where the outward-expanding arc-shaped fluid chamber (108) is not installed, thereby forming temperature differentiation at two sides of the inlet/outlet ports of the heat gaining device (101) to facilitate flow of the heat exchange fluid (104) upwardly through the second pipeline structure (401), and return of part of the heat exchange fluid (104) through the first fluid piping (103), and wherein the heat gaining device (101) is upwardly inclined or vertical, with the first inlet/outlet port (1011) of the heat gaining device (101) leading to the arc-shaped fluid chamber (108) and first pipeline structure (301) being lower than the second inlet/outlet port (1012) of the heat gaining device (101) leading to the second pipeline structure (401) to facilitate flow of the heat exchange fluid (104) from the heat gaining device (101) into the second pipeline structure (401) and flow of the heat exchange fluid (104) from the first fluid pipe line structure (301) and arc-shaped fluid chamber (108) into the heat gaining device (101) as a result of an effect in which warmer fluid ascends and colder fluid descends.

10. The closed loop natural thermal energy releasing system as claimed in claim 1, wherein the first pipeline structure and the second pipeline structure further comprise a material having heat conductivity, and wherein the exterior of all or part of the first pipeline structure and the second pipeline structure is covered by a heat insulation member (109).

11. The closed loop natural thermal energy releasing system as claimed in claim 1, wherein the first pipeline structure and the second pipeline structure comprise a rectangular, a W-shaped, or a round cross-section.

12. The closed loop natural thermal energy releasing system as claimed in claim 1, wherein the auxiliary fluid pump (107) includes a motor driven by electric power externally supplied through a power wire (118).

13. The closed loop natural thermal energy releasing system as claimed in claim 1, wherein the first pipeline structure and the second pipeline structure comprise a partitioned flowpath.

14. The closed loop natural thermal energy releasing system as claimed in claim 1, further comprising a sealing plug (110) and an operation port (111) located at an upper end of a top corner of the closed loop system for filling in or sucking out the heat exchange fluid (104) and serving as interfaces for observation and maintenance.

15. The closed loop natural thermal energy releasing system as claimed in claim 1, further comprising at least one auxiliary heating/cooling device (115) disposed in the interior or the exterior of the fluid flowpath for enhancing the thermal energy transmitted from the heat releasing device (201) to the temperature differentiation body (103).

16. The closed loop natural thermal energy releasing system as claimed in claim 1, further comprising a heat exchange fluid temperature sensing device (TS201), an environment temperature sensing device (TS202), and an electric energy control unit (ECU200).

17. A closed loop natural thermal energy releasing system with partial return of a heat exchange fluid (104) and including multiple flowpaths, comprising:
  a heat gaining device (101) installed within a natural thermal energy storage body (100) and arranged to transfer heat between the natural thermal energy storage body (100) and the heat exchange fluid (104) flowing through the heat gaining device (101), wherein said heat gaining device (101) is inclined or vertical and includes a first fluid inlet/outlet port (1011) that is lower than a second fluid inlet/outlet port (1012);
  a heat releasing device (201) in contact with a temperature differentiation body (103) and arranged to transfer heat between the heat exchange fluid (104) and the temperature differentiation body (103);
  a first pipeline structure (301) connected to the first fluid inlet/outlet port (1011) of the heat gaining device (101) and a first fluid inlet/outlet port (2012) of the heat releasing device (201) for carrying a part of the heat exchange fluid (104) from the heat gaining device (101) to the heat releasing device (201);
  a second pipeline structure (401) connected to the second fluid inlet/outlet port (1012) of the heat gaining device (101) and a second fluid inlet/outlet port (2011) of the heat releasing device (201) for carrying the heat exchange fluid (104) between the heat gaining device (101) and the heat releasing device (201); and
  at least one auxiliary heating/cooling device (115) disposed in the interior or the exterior of the fluid flowpath for enhancing the thermal energy transmitted from the heat releasing device (201) to the temperature differentiation body (103).

18. The closed loop natural thermal energy releasing system as claimed in claim 17, wherein the auxiliary heating/cooling device (115) is driven by electric power provided from a power wire (116).

* * * * *